(12) United States Patent
Matyjaszewski et al.

(10) Patent No.: US 7,893,173 B2
(45) Date of Patent: Feb. 22, 2011

(54) POLYMERIZATION PROCESS WITH CATALYST REACTIVATION

(75) Inventors: Krzysztof Matyjaszewski, Pittsburgh, PA (US); Wojciech Jakubowski, Pittsburgh, PA (US); James Spanswick, Wheaton, IL (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 11/990,841

(22) PCT Filed: Aug. 28, 2006

(86) PCT No.: PCT/US2006/033792

§ 371 (c)(1),
(2), (4) Date: Jan. 16, 2009

(87) PCT Pub. No.: WO2007/025310

PCT Pub. Date: Mar. 1, 2007

(65) Prior Publication Data

US 2009/0312505 A1 Dec. 17, 2009

Related U.S. Application Data

(60) Provisional application No. 60/711,722, filed on Aug. 26, 2005, provisional application No. 60/814,846, filed on Jun. 19, 2006, provisional application No. 60/814,816, filed on Jun. 19, 2006.

(51) Int. Cl.
*C08F 4/00* (2006.01)
*C08F 2/00* (2006.01)
*C08F 4/04* (2006.01)
(52) U.S. Cl. ............... 526/90; 526/206; 526/219.6
(58) Field of Classification Search .............. 526/90, 526/206, 219.6
See application file for complete search history.

(56) References Cited

U.S. PATENT DOCUMENTS

| | | | |
|---|---|---|---|
| 3,037,004 A | 5/1962 | Simone et al. | |
| 3,096,312 A | 7/1963 | Henry | |
| 3,183,217 A | 5/1965 | Serniuk et al. | |
| 3,350,374 A | 10/1967 | Fetscher et al. | |
| 3,397,186 A | 8/1968 | Edward et al. | |

(Continued)

FOREIGN PATENT DOCUMENTS

CA 2209061 2/1998

(Continued)

OTHER PUBLICATIONS

Acar, et al., Macromolecules 2000, 33, 7700-7706.

(Continued)

*Primary Examiner*—David Wu
*Assistant Examiner*—Elizabeth Eng
(74) *Attorney, Agent, or Firm*—K&L Gates LLP

(57) ABSTRACT

Polymerization processes of the present invention comprise low catalyst concentration. Embodiments include a polymerization process comprising polymerizing free radically (co)polymerizable monomers in a polymerization medium comprising one or more radically (co)polymerizable monomers, a transition metal catalyst complex capable of participating in a one electron redox reaction with an ATRP initiator; a free radical initiator; and an ATRP initiator; (wherein the concentration of transition metal catalyst complex in the polymerization medium is less than 100 ppm). Further embodiments include a polymerization process, comprising polymerizing one or more radically (co)polymerizable monomers in the presence of at least one transition metal catalyst complex; and an ATRP initiator; and a reducing agent; wherein the transition metal catalyst complex is present at less than $10^{-3}$ mole compared to the moles of radically transferable atoms or groups present on the ATRP initiator.

16 Claims, 16 Drawing Sheets

U.S. PATENT DOCUMENTS

| | | |
|---|---|---|
| 3,862,978 A | 1/1975 | Decker et al. |
| 3,959,225 A | 5/1976 | Kuntz |
| 3,963,491 A | 6/1976 | Marsh |
| 4,007,165 A | 2/1977 | MacLeay et al. |
| 4,073,870 A | 2/1978 | Saji et al. |
| 4,145,586 A | 3/1979 | Swann |
| 4,374,751 A | 2/1983 | Dudgeon |
| 4,384,093 A | 5/1983 | Culbertson et al. |
| 4,581,429 A | 4/1986 | Solomon et al. |
| 4,728,706 A | 3/1988 | Farnham et al. |
| 4,806,605 A | 2/1989 | Hertler |
| 4,940,648 A | 7/1990 | Geiger |
| 4,940,760 A | 7/1990 | Boettcher et al. |
| 4,954,416 A | 9/1990 | Wright et al. |
| 4,978,498 A | 12/1990 | Yoshihiro et al. |
| 5,026,813 A | 6/1991 | Meder |
| 5,089,135 A | 2/1992 | Yoneyama et al. |
| 5,102,967 A | 4/1992 | Meder |
| 5,169,914 A | 12/1992 | Kaszas et al. |
| 5,210,109 A | 5/1993 | Tateosian et al. |
| 5,212,043 A | 5/1993 | Yamamoto et al. |
| 5,248,746 A | 9/1993 | Shimokawa et al. |
| 5,254,651 A | 10/1993 | Alexanian et al. |
| 5,281,681 A | 1/1994 | Austin |
| 5,294,678 A | 3/1994 | Tse et al. |
| 5,312,871 A | 5/1994 | Mardare et al. |
| 5,322,912 A | 6/1994 | Georges et al. |
| 5,324,879 A | 6/1994 | Hawthorne |
| 5,331,088 A | 7/1994 | Meister et al. |
| 5,401,804 A | 3/1995 | Georges et al. |
| 5,405,913 A | 4/1995 | Harwood et al. |
| 5,451,647 A | 9/1995 | Faust et al. |
| 5,470,928 A | 11/1995 | Harwood et al. |
| 5,506,312 A | 4/1996 | Arjunan |
| 5,508,353 A | 4/1996 | Liu et al. |
| 5,510,212 A | 4/1996 | Delnick et al. |
| 5,510,307 A | 4/1996 | Narayanan et al. |
| 5,558,954 A | 9/1996 | Morrison |
| 5,610,250 A | 3/1997 | Veregin et al. |
| 5,656,708 A | 8/1997 | Meister |
| 5,668,188 A | 9/1997 | Whinnery et al. |
| 5,700,844 A | 12/1997 | Liao et al. |
| 5,705,577 A | 1/1998 | Rossi et al. |
| 5,708,102 A | 1/1998 | Fryd et al. |
| 5,763,548 A | 6/1998 | Matyjaszewski et al. |
| 5,767,210 A | 6/1998 | Lecomte et al. |
| 5,773,538 A | 6/1998 | Feiring |
| 5,789,487 A | 8/1998 | Matyjaszewski et al. |
| 5,807,937 A | 9/1998 | Matyjaszewski et al. |
| 5,811,500 A | 9/1998 | Dubois et al. |
| 5,833,320 A | 11/1998 | Kaneko et al. |
| 5,854,364 A | 12/1998 | Senninger et al. |
| 5,886,118 A | 3/1999 | Percec |
| 5,891,971 A | 4/1999 | Keoshkerian et al. |
| 5,910,549 A | 6/1999 | Matyjaszewski et al. |
| 5,945,491 A | 8/1999 | Matyjaszewski et al. |
| 5,998,537 A | 12/1999 | Good et al. |
| 6,054,507 A | 4/2000 | Funaki et al. |
| 6,057,042 A | 5/2000 | Shimotsu |
| 6,083,524 A | 7/2000 | Sawhney et al. |
| 6,111,022 A | 8/2000 | Matyjaszewski et al. |
| 6,114,448 A | 9/2000 | Derbes |
| 6,114,482 A | 9/2000 | Senniger et al. |
| 6,121,371 A * | 9/2000 | Matyjaszewski et al. .... 524/804 |
| 6,124,411 A | 9/2000 | Matyjaszewski et al. |
| 6,126,919 A | 10/2000 | Stefely et al. |
| 6,143,848 A | 11/2000 | Lee et al. |
| 6,162,882 A | 12/2000 | Matyjaszewski et al. |
| 6,191,197 B1 | 2/2001 | Wang et al. |
| 6,254,854 B1 | 7/2001 | Edwards et al. |
| 6,255,448 B1 | 7/2001 | Grimaldi et al. |
| 6,288,186 B1 | 9/2001 | Matyjaszewski et al. |
| 6,310,149 B1 | 10/2001 | Haddleton |
| 6,326,455 B2 | 12/2001 | Vassiliou et al. |
| 6,407,187 B1 | 6/2002 | Matyjaszewski et al. |
| 6,512,060 B1 | 1/2003 | Matyjaszewski et al. |
| 6,534,610 B1 | 3/2003 | Wilson et al. |
| 6,538,091 B1 | 3/2003 | Matyjaszewski et al. |
| 6,541,580 B1 | 4/2003 | Matyjaszewski et al. |
| 6,545,095 B1 | 4/2003 | Solomon et al. |
| 6,565,763 B1 | 5/2003 | Asakawa et al. |
| 6,592,991 B1 | 7/2003 | Wiesner et al. |
| 6,624,262 B2 | 9/2003 | Matyjaszewski et al. |
| 6,624,263 B2 | 9/2003 | Matyjaszewski et al. |
| 6,627,314 B2 | 9/2003 | Matyjaszewski et al. |
| 6,670,299 B1 | 12/2003 | Marks et al. |
| 6,672,717 B2 | 1/2004 | Smith |
| 6,686,432 B2 | 2/2004 | Coca et al. |
| 6,692,914 B1 | 2/2004 | Klaerner et al. |
| 6,737,488 B2 | 5/2004 | Vanhoorne et al. |
| 6,759,491 B2 | 7/2004 | Matyjaszewski et al. |
| 6,784,247 B2 | 8/2004 | Rechenberg et al. |
| 6,784,248 B2 | 8/2004 | Coca et al. |
| 6,790,919 B2 | 9/2004 | Matyjaszewski et al. |
| 6,828,025 B2 | 12/2004 | Mukkaram et al. |
| 6,887,962 B2 | 5/2005 | Matyjaszewski et al. |
| 7,018,655 B2 | 3/2006 | Lele et al. |
| 7,019,082 B2 | 3/2006 | Matyjaszewski et al. |
| 7,037,992 B2 | 5/2006 | Wilson et al. |
| 7,049,373 B2 | 5/2006 | Matyjaszewski et al. |
| 7,056,455 B2 | 6/2006 | Matyjaszewski et al. |
| 7,064,151 B1 | 6/2006 | Berge et al. |
| 7,064,166 B2 | 6/2006 | Matyjaszewski et al. |
| 7,105,579 B2 | 9/2006 | Adam et al. |
| 7,125,938 B2 | 10/2006 | Matyjaszewski et al. |
| 7,157,530 B2 | 1/2007 | Matyjaszewski et al. |
| 7,332,550 B2 | 2/2008 | Matyjaszewski et al. |
| 7,572,874 B2 | 8/2009 | Matyjaszewski et al. |
| 7,678,869 B2 | 3/2010 | Matyjaszewski et al. |
| 7,795,355 B2 | 9/2010 | Matyjaszewski et al. |
| 2003/0139547 A1 * | 7/2003 | Matyjaszewski et al. . 526/219.6 |
| 2003/0236361 A1 | 12/2003 | Yeager |
| 2004/0044152 A1 | 3/2004 | Matyjaszewski et al. |
| 2004/0171779 A1 | 9/2004 | Matyjaszewski et al. |
| 2004/0204556 A1 | 10/2004 | Matyjaszewski et al. |
| 2005/0090632 A1 | 4/2005 | Matyjaszewski et al. |
| 2006/0258826 A1 | 11/2006 | Matyjaszewski et al. |
| 2007/0106012 A1 | 5/2007 | Matyjaszewski et al. |
| 2007/0155926 A1 | 7/2007 | Matyjaszewski et al. |
| 2007/0244265 A1 | 10/2007 | Matyjaszewski et al. |
| 2007/0276101 A1 | 11/2007 | Matyjaszewski et al. |
| 2009/0171024 A1 | 7/2009 | Jakubowski et al. |
| 2009/0176951 A1 | 7/2009 | Matyjaszewski et al. |

FOREIGN PATENT DOCUMENTS

| | | |
|---|---|---|
| CN | 1165828 A | 11/1997 |
| EP | 0265091 A1 | 4/1988 |
| EP | 0341012 A2 | 11/1989 |
| EP | 0434438 A | 6/1991 |
| EP | 0457916 A | 11/1991 |
| EP | 0789036 A1 | 8/1997 |
| EP | 0816385 A1 | 1/1998 |
| EP | 0824110 A1 | 2/1998 |
| EP | 0824111 A1 | 2/1998 |
| EP | 0826698 A1 | 3/1998 |
| EP | 0832902 A2 | 4/1998 |
| EP | 0870809 A2 | 10/1998 |
| EP | 0872493 A | 10/1998 |
| EP | 0879832 A1 | 11/1998 |
| EP | 1386935 A | 2/2004 |
| EP | 1469020 A | 10/2004 |
| EP | 1555273 A1 | 7/2005 |
| JP | 6322171 A | 11/1994 |

| | | |
|---|---|---|
| WO | WO 88/00603 A3 | 1/1988 |
| WO | WO 94/13706 A | 6/1994 |
| WO | WO 97/18247 | 5/1997 |
| WO | WO 97/47661 A1 | 12/1997 |
| WO | WO 98/01480 | 1/1998 |
| WO | WO 98/06758 A1 | 2/1998 |
| WO | WO 98/20050 A2 | 5/1998 |
| WO | WO 99/28352 A | 6/1999 |
| WO | WO 00/47634 A1 | 8/2000 |
| WO | WO 00/56795 A1 | 9/2000 |
| WO | WO 00/75198 | 12/2000 |
| WO | WO 01/77197 A3 | 10/2001 |
| WO | WO 03/097107 A | 11/2003 |
| WO | WO 2004/041972 A | 5/2004 |
| WO | WO 2004/060928 A | 7/2004 |
| WO | WO 2005/056621 A1 | 6/2005 |
| WO | WO 2007/025086 A2 | 3/2007 |
| WO | WO 2007/059350 A2 | 5/2007 |
| WO | WO 2008/057163 A2 | 5/2008 |
| WO | WO 2008/148000 A1 | 12/2008 |
| WO | WO 2009/023353 A9 | 2/2009 |
| WO | WO 2009/111725 A1 | 9/2009 |

OTHER PUBLICATIONS

Anderegg, et al., Helv. Chim. Acta 1977, 60, 123.

Annenkov et al., Poly-C-vinyltetrazoles: A New Type of Polyacid, Journal of Polymer Science Part A: Polymer Chemistry, 1993, pp. 1903-1906, vol. 31(7).

Ashford, et al., "First example of the atom transfer radical polymerisation of an acidic monomer: direct synthesis of methacrylic acid copolymers in aqueius media", Chemical Communications—Chemcom, Royal Society of Chemistry, GB (1999), pp. 1285-1286.

Asscher et al., Chlorine-Activation by Redox-Transfer, Part IV, The Addition of Sulphonyl Chlorides to Vinylic Monomers and Other Olefins, Journal of the Chemical Society, 1964, pp. 4962-4971.

Bamford, Comprehensive Polymer Science (First Supplement), eds., Pergamon: Oxford vol. 3., p. 123 (1991).

Baumann, et al., Macromolecular Materials and Engineering (2000), 280/281, 1-6.

Bellus, Pure & Appl. Chem. 57, 1827 (1985).

Bledzki, et al., Makromol. Chem. 184, 745 (1983).

Braunecker, et al., Macromolecules 2005, 38, 4081.

Braunecker, et al., Organometal Chem. 2005, 690, 916.

Brittain et al., Makromol. Chem., Macromol. Symp. 67, pp. 373-386 (1993), "Termination Processes in Group Transfer Polymerization".

Buback, et al. (1995) Macromol. Chem. Phys. 196, 3267-80.

Buback, et al. (2002) Macromol. Chem. Phys. 203, 2570-2582.

Bywater, Makromol. Chem., Macromol. Symp. 67, pp. 339-350 (1993), "Group Transfer Polymerization—A Critical Overview".

Carnahan et al., Synthesis and Characterization of Poly(glycerol-succinic acid) Dendrimers, Macromolecules, 2001, pp. 7648-7655, vol. 34(22).

Carter et al., Polyimide Nanofoams From Phase-Separated Block Copolymers, Electrochemical Society Proceedings, 1997, pp. 32-43, vol. 97(8), Electrochemical Society, Pennington, NJ, US.

Caruso, Nanoengineering of Particle Surfaces—Adv. Mater. 2001, 13, No. 1, Jan. 5, 11-22—Wiley—VCH Verlag GmbH.D-69469 Weinheim, 2001.

Catala, et al., Macromolecules, 1995, 28, 8441.

Chemical Abstracts, vol. 85, 1976, pp. 20.

Chen et al., Pryolytic Behavior and In-Situ Paramagnetism of Star-like C60(CH3)x(PAN)xcopolymers, European Polymer Journal, 1998, pp. 421-429, vol. 34(3-4), Elsevier Science Ltd., Oxford, GB.

Coca et al., Polymerization of Acrylates by Atom Transfer Radical Polymerization. Homopolymerization of 2-Hydroxyethyl Acrylate, Journal of Polymer Science, Part A: Polymer Chemistry, 1998, pp. 1417-1424, vol. 36.

Cohen, et al., Inorg. Chem. 13, 2434 (1974).

Collman et al., "Clicking" Functionality onto Electrode Surfaces, Langmuir, 2004, pp. 1051-1053, vol. 20.

Curran, et al., Comprehensive Organic Synthesis, eds., Pergamon: Oxford vol. 4, p. 715 (1991).

Curran, et al., J. Am. Chem. Soc. 116, 4279 (1994).

Curran, et al., J. Org. Chem., 54, 3140 (1989).

Curran, Synthesis, 489 (1988).

Darkow et al., "Synthesis, Photomodification and Characterization of Homo- and Copolymers with 2,5-bisaryltetrazolyl Pendant Groups", Reactive and Functional Polymers, 1997, pp. 195-207, vol. 32(2).

Davies, "Reactions of L-ascorbic acid with transition metal complexes," Polyhedron, 1992, 11, 285-321.

De Vries, et al., "The Effect of Reducing Monosaccharides on the Atom Transfer Radical Polymerization of Butyl Methacrylate," Macromol. Chem. Phys., 2001, 202, 1645-1648.

Demko et al., A Click Chemistry Approach to Tetrazoles by Huisgen 1,3-Dipolar Cycloaddition: Synthesis of 5-Acyltetrazoles from Azides and Acyl Cyanides, Angewandte Chemie, International Edition, 2004, pp. 2113-2116, vol. 41(12).

Desmarquest, et al., Electrochim. Acta (1968), 13, 1109-1113.

Dreezen, et al., "Nano-Structured Polymer Blends: Phase Structure, Crystallisation Behaviour and Semi-Crystalline Morphology of Phase Separated Binary Blends of Poly(ethyleneoxide) and Poly(ether sulphone)", Polymer, Elsevier Science Publishers B.V., GB, vol. 41, No. 4, Feb. 2000, pp. 1395-1407.

Druliner, Macromolecules, 24, 6079 (1991).

Endo, et al., Macromolecules, 25, 5554 (1992).

Feng, "(Synthesis and Free Radical Polymerization of 2-oxo-3-methylene-5-phenyl-1,4-dioxan". Chinese Journal of Polymer Science, 1993, 11, 2, pp. 153-157).

Fischer, Am. Chem. Soc. 1986, 108, 3925.

Fischer, et al., Acc. Chem. Res. 20, 200-206 (1987).

Fischer, H., Chem. Rev. 2001, 101, 3581-3610.

Frackowiak, et al., "Supercapacitor electrodes from multiwalled carbon nanotubes", Applied Physics Letters, 77, pp. 2421-2423 (2000).

Fukuda, et al, Chem. Letters, 1996, 4, 293.

Fukuda, et al., Macromolecules, 1996, 29, 3050.

Gabaston, et al., "Synthesis of water soluble homopolymers and block copolymers by living free-radical polymerization", Polymr Preprints (American Chemical Society, Division of Polymer Chemistry), 38(1), pp. 719-720 (1997).

Gaynor, et al., Polym. Prep. (Am. Chem. Soc. Polym. Chem. Div.), 36(1), 467 (1995).

Georges, et al., Macromolecules 1993, 26, 2987.

Georges, et al., Macromolecules 1994, 27, 7228.

Georges, et al., Macromolecules, 1993, 26, 5316.

Gilbert & Williams, Reactivity Ratios of Conjugated Dienes Copolymerized in Emulsion at 5°, J. Am. Chem. Soc. 74, (1952), pp. 4114-4118.

Gnanou et al., "Effect of Phenol and Derivatives on Atom Transfer Radical Polymerization in the Presence of Air," Journal Polymer Science, Part A: Polymer Chemistry, 2004, 42, 351-359.

Granel et al., Controlled Radical Polymerization of Methacrylic Monomers in the Presence of Bis(ortho-chelated) Arylnickel (II) Complex and Different Activated Alkyl Halides, Macromolecules, 1996, pp. 8576-8582, vol. 29(27).

Grayson et al., Convergent Dendrons and Dendrimers: From Synthesis to Applications, Chemical Reviews, 2001, pp. 3819-3867, vol. 101(12).

Greszta et al., Gradient Copolymers of Styrene and Acrylonitrille Via Atom Transfer Radical Polymerization, Polymer Preprints, 1997, pp. 709-710, vol. 38(1).

Greszta, et al., Macromolecules, 27, 638 (1994).

Gromada et al., Simultaneous Reverse and Normal Initiation in Atom Transfer Radical Polymerization, Macromolecules, 2001, pp. 7664-7671, 34(22).

Haddleton, et al., "Copper-mediated living radical polymerization utilizing biological and end group modified poly(ethylene-co-butylene) macroinitiators", ACS Symposium Series, 768, (Controlled/Living Radical Polymerization), pp. 182-196 (2000).

Hawker, "Molecular Weight Control by a Living Free Radical Polymerization Process", Journal American Chem. Society, 1994, vol. 116, pp. 11185-11186.

Hawker, et al., Macromolecules, 1996, 29, 2686.

Hayes, et al., J. Am. Chem. Soc. 110, 5533 (1988).

Hedrick et al., (Dendrimer-like Star Block and Amphiphlic Copolymers by Combination of Ring Opening and Atom Transfer Radicat Polymerization. Macromolecules, 1998, 31, 8671-8705.

Helms et al., Dendronized Linear Polymers via "Click Chemistry", Journal of the American Chemical Society, 2004, pp. 15020-15021, vol. 126(46).

Heuts et al., "Atom transfer radical polymerization in the presence of a thiol: more evidence supporting radical intermediates," Macromol. Chem. Phys., 1999, 200, 1380-1385.

Hirao, et al., J. Synth. Org. Chem. (Japan), 52(3), 197 (1994).

Hirao, et al., Syn. Lett. 217 (1990).

Hong, et al., "Synthesis of water-soluble fluorine-containing block copolymers by atom transfer radical polymerization", 25(4), 302 (2001).

Hovestad, et al., Macromolecules 2000, 33, 4048-4052.

Ihre et al., Fast and Convenient Divergent Synthesis of Aliphatic Ester Dendrimers by Anhydride Coupling, Journal of the American Chemical Society, 2001, pp. 5908-5917, vol. 123(25).

Iqbal, et al., Chem. Rev. 94, 519 (1994).

Jakubowski et al., "Activators Regenerated by Electron Transfer for Atom Transfer Radical Polymerization of Styrene," Macromolecules, 2006, 39, 39-45.

J-F Lutz et al,. Synthesis and Properties of Copolymers with Tailored Sequence Distribution by Controlled/Living Radical Polymerization, in ACS Symposium Series, Advances in Controlled/living Radical Polymerizations, American Chemical Society Division of Polymer Chemistry, 2003, Chapter 19, pp. 268-282, vol. 854.

Jo et al., Effects of Various Copper Salts and Additives on Polymerization of Acrylonitrile by Atom Transfer Radical Polymerization, Polymer Preprints, 1997, pp. 699-700, vol. 38(1).

Jo et al., Polyacrylonitrile with Low Polydispersities by Atom Transfer Radical Polymerization, Polymer Preprints, 1997, pp. 697-698, vol. 38(1).

Kamigata, et al., Novel Perfluoroalkylation of Alkenes with Perfluoroalkanesulphonyl Chlorides Catalysed by a Ruthenium (II) Complex, Journal of the Chemical Society, Perkins Transactions 1, 1991, pp. 627-633.

Kato, et al., Macromolecules, 28, 1721 (1995).

Kawaguchi, et al., "Dispersion Polymerization", in Polymer Particles, Masayoshi Okubo, ed., Adv. Polym. Sci., 2005, 175, 299-328.

Kizhnyaev et al., Vinyltetrazoles: Synthesis and Properties, Russian Chemical Reviews, 2003, pp. 143-164, vol. 72(2).

Kolb et al., Click Chemistry: Diverse Chemical Function from a Few Good Reactions, Angewandte Chemie, International Edition, 2001, pp. 2004-2021, vol. 40(11).

Kosower, E.M., Acc Chem. Res. (1971), 4, 193-198.

Kowalewski et al., Advances in Nanostructured Carbons from Block Copolymers Prepared by Controlled Radical Polymerization Techniques, in Controlled Radical Polymerization: From Synthesis to Materials, American Chemical Society Division of Polymer Chemistry, 2005, Chapter 21, pp. 295-310, vol. 944.

Kwak et al., "ARGET ATRP of methyl methacrylate in the presence of nitrogen-based ligands as reducing agents," Polym. Int. 2009, 58, 242-247.

Lazzari, et al., Macromolecular Chemistry and Physics (2005), 206, 1382-1388.

Leduc et al., J. Am. Chem. Soc. 1996, 118, 11111-11118.

Lee, et al., "Synthesis of carboxylic acid functionalized nanoparticles by reversible addition-fragmentation chain transfer (RAFT) miniemulsion polymerization of styrene", Polymer, Elsevier Science Publishers B.V., GB, vol. 46, No. 11, pp. 3661-3668 (2005).

Lewis, et al., Copolymerization VII, Copolymerization of Some Further Monomer Pairs, Apr. 1948, pp. 1527-1529.

Li, et al., "Highly ordered carbon nanotube arrays for electronics applications", Applied Physics Letters, 75 pp. 367-369 (1999).

Li, et al., ASC Polym. Preprints, 1995, 36(1), 469.

Lingane, "Interpretation of the Polarographic Waves of Complex Metal Ions," Chem. Rev. 1941, 29, 1.

Liu et al., "Poly(N-isopropylacrylamide) hydrogels with improved shrinking kinetics by RAFT polymerization", Mar. 22, 2006, Polymer Elsevier Science Publishers, B.V., GB, pp. 2330-2336.

Majoral et al., Dendrimers Containing Heteroatoms (Si, P, B, Ge, or Bi), Chemical Reviews, 1999, pp. 845-880, vol. 99(3).

Makino et al., Controlled Atom Transfer Radical Polymerizations of Methyl Methacrylate Under Micellar Conditions, Polymer Preprints, 1988, pp. 288-289, vol. 39(1).

Mao, et al., "Controlled polymerizations of 2-(dialkylamino)ethyl methacrylates and their block copolymers in protic solvents at ambient temperature via ATRP", Journal of Polymer Science, Part A Polymer Chemistry, 42(20), pp. 5161-5169 (2004).

Maraval et al., "Lego" Chemistry for the Straightforward Synthesis of Dendrimer, Journal of Organic Chemistry, 2003, pp. 6043-6046, vol. 68(15).

Mardare, et al., ACS Polymer Preprints 35(1), 778 (1994).

Mardare, et al., Macromolecules, 27, 645 (1994).

Mardare, et al., Polym. Prep. (ACS), 36(1), 700-701 (1995).

Marestin et al., Nitroxide Mediated Living Radical Polymerization of Styrene in Emulsion, Macromolecules, 1998, pp. 4041-4044, vol. 31(12).

Matsumoto, et al., Synth. Commun. (1985) 15, 515.

Matthews et al., Dendrimers-Branching out from Curiosites into New Technologies, Progress in Polymer Science, 1998, pp. 1-56, vol. 23.

Matyjaszewski ed., Controlled/"Living" Radical Polymerization. Progress in ATRP, NMP, and RAFT, in: ACS Symposium Ser., 2000, Chapter 19, Reverse Atom Transfer Radical Polymerization Using AIBN or BPO as Initiator, pp. 263-275.

Matyjaszewski et al., (Structural Control of Poly(Methyl Methacrylate)-g-poly(Lactic Acid) Graft Copolymers by Atom Transfer Radical Polymerization (ATRP). Macromolecules 2001, 34, 6243-6248.

Matyjaszewski et al., "Controlled/Living Radical Polymerization. Kinetics of the Homogeneous Atom Transfer Radical Polymerization of Styrene," J. Am. Chem. Soc., 1997, 119, 674-680.

Matyjaszewski et al., Atom Transfer Radical Polymerization, Chemical Reviews, 2001, pp. 2921-2990, vol. 101(9).

Matyjaszewski et al., Controlled/"Living" Radical Polymerization of Styrene and Methly Methacrylate Catalyzed by Iron Complexes1, Macromolecules, 1997, pp. 8161-8164, vol. 30(26).

Matyjaszewski et al., Controlled/Living Radical Polymerization: State of the Art in 2002, in ACS Symposium Series, Advances in Controlled/living Radical Polymerizations, American Chemical Society Division of Polymer Chemistry, 2003, Chapter 1, pp. 2-9, vol. 854.

Matyjaszewski et al., Controlled/Living Radical Polymerization: State of the Art in 2005, in Controlled Radical Polymerization: From Synthesis to Materials, American Chemical Society Division of Polymer Chemistry, 2005, Chapter 1, pp. 2-12, vol. 944.

Matyjaszewski et al., Zerovalent Metals in Controlled/"Living" Radical Polymerization, Macromolecules, 1997, pp. 7348-7350, vol. 30(23).

Matyjaszewski, "The Importance of Exchange Reactions in the Controlled/Living Radical Polymerization in the Presence of Alkoxyamines and Transition Metals", Macromolecule Symposium, 1996, vol. 111, pp. 47-61.

Matyjaszewski, "Radical Nature of Cu-Catalyzed Controlled Radical Polymerizations (Atom Transfer Radical Polymerization)," Macromolecules, 1998, 31, 4710-4717.

Matyjaszewski, Controlled Radical Polymerization, American Chemical Society Division of Polymer Chemistry, 1998, ACS Symposium Series, Ch. 1, pp. 2-30. vol. 685.

Matyjaszewski, et al., Macromolecules 34, 5125 (2001).

Matyjaszewski, et al., Tetrahedron (1997), 53, 15321-15329.

McCarthy et al., Grafting Chromatographic Stationary Phase Substrates by Atom Transfer Radical Polymerization, in Controlled Radical Polymerization: From Synthesis to Materials, American Chemical Society Division of Polymer Chemistry, 2005, Chapter 18, pp. 252-268, vol. 944.

Min, et al, "Atom Transfer Radical Dispersion Polymerization of Styrene in Ethanol", Macromolecules, ACS, Washington, DC, US, vol. 40, No. 20, (Oct. 2, 2007), pp. 7217-7221.

Mitani, et al., J. Am Chem. Soc. 105, 6719 (1983).

Nagashima, J. Org. Chem. 57, 1682 (1992).

Nagashima, J. Org. Chem. 58, 464 (1993).

Navon, et al., Inorg. Chem. 1999, 38, 3484.

Nishikawa et al., Evidence for Living Radical Polymerization of Methyl Methacrylate with Ruthenium Complex: Effects of Protic and Radical Compounds and Reinitiation from the Recovered Polymers, Macromolecules, 1997, pp. 2244-2248, vol. 30(8).

Odell, et al., Macromolecules, 1995, 28, 8453.

Odian, Principles of Polymerization, Third Edition, John Wiley & Sons, p. 205-233 (1991).

Orochov et al., Redox-Transfer, Part VI, Determination of Hammet's P-Constant for the Oxidation of Cuprous Chloride by Aromatic Sulphonyl Chlorides, Journal of the Chemical Society (B), (1969), pp. 255-259.

Orochov, et al., J. Chem. Soc., Perkin II, 1000 (1973).

Orr, Thermochemical Aspects of Butadiene-Styrene Copolymerization, 1960, pp. 74-82.

Otsu, et al., Chem. Express 5(10), 801 (1990).

Otsu, et al., Synthesis, Reactivity, and Role of -Vinylbenzyl N,N-Diethyldithiocarbamate as a Monomer-Iniferter in Radical Polymerization, Macromolecules, 1986, pp. 287-290, vol. 19(2).

Pakuka et al., Polymers, Particles, and Surfaces with Hairy Coatings: Synthesis, Structure, Dynamics, and Resulting Properties, in ACS Symposium Series, Advances in Controlled/living Radical Polymerizations, American Chemical Society Division of Polymer Chemistry, 2003, Chapter 26, pp. 366-382, vol. 854.

Paoletti, et al., Inorg. Chem. 1967, 6, 64.

Paoletti, et al., Inorg. Chim. Acta Rev. 1973, 7, 43.

Patten et al., Atom Transfer Radical Polymerization and the Synthesis of Polymeric Materials, Advanced Materials, 1998, pp. 901-915, vol. 10(12).

Patten et al., Polymers with very Low Polydispersities from Atom Transfer Radical Polymerization, 1996, Science, pp. 866-868, vol. 272.

Percec et al., "Living" Radical Polymerization of Styrene Initiated by Arenesulfonyl Chlorides and $Cu^I(bpy)_nCl$, Macromolecules, 1995, pp. 7970-7972, vol. 28(23).

Percec et al., Metal-Catalyzed "Living" Radical Polymerization of Styrene Initiated with Arenesulfonyl Chlorides. From Heterogeneous to Homogeneous Catalyses, Macromolecules, 1996, pp. 3665-3668, vol. 29(10).

Percec et al., Self-Regulated Phase Transfer of $Cu_2O$/bpy, Cu(0)/bpy, and $Cu_2O$(Cu(0)/bpy Catalyzed "Living" Radical Polymerization Initiated with Sulfonyl Chlorides, Macromolecules, 1998, pp. 4053-4056, vol. 31(12).

Pintauer et al., Toward Structural and Mechanistic Understanding of Transition Metal-Catalyzed Atom Transfer Radical Processes, in ACS Symposium Series, Advances in Controlled/living Radical Polymerizations, American Chemical Society Division of Polymer Chemistry, 2003, Chapter 10, pp. 130-147, vol. 854.

Punna et al., Click Chemistry in Polymer Synthesis, Polymer Preprints, 2004, pp. 778-779, vol. 45(1).

Puts, et al., Macromolecules, 1996, 29, 3323.

Qiu et al., Cyclic Voltammetric Studies of Copper Complexes Catalyzing Atom Transfer Radical Polymerization, Macromolecular Chemistry and Physics, 2000, pp. 1625-1631, vol. 201(14).

Queffelec et al., Optimization of Atom Transfer Radical Polymerization Using Cu(I)/Tris(2-(dimethylamino)ethyl)amine as a Catalyst, Macromolecules, 2000, pp. 8629-8639, vol. 33.

Quirk et al., Makromol. Chem., Macromol. Symp. 67, pp. 351-363 (1993), "Mechanistic Aspects of Group Transfer Polymerization".

Richard et al., Acrylate-Based Block Copolymers Prepared by Atom Transfer Radical Polymerization as Matrices for Drug Delivery Applications, in Controlled Radical Polymerization: From Synthesis to Materials, American Chemical Society Division of Polymer Chemistry, 2005, Chapter 17, pp. 234-251, vol. 944.

S.A.F. Bon et al., Controlled Radical Polymerization in Emulsion, Macromolecules, 1997, pp. 324-326, vol. 30(2).

Samuni et al., "On the cytotoxicity of vitamin C and metal ions," European Journal of Biochemistry, 1983, 137. 119-124.

Schubert et al., Design of Effective Systems for Controlled Radical Polymerization of Styrene: Application of 4,4'-Dimethyl and 5,5'-Dimethyl 2,2'-Bipyridine Copper(ii) Complexes, Macromolecular Rapid Communication, 1999, pp. 351-355, vol. 20.

Schulz & Milkovich, Relative Reactivities and Graft Distributions of Polystyrene Macromers in Vinyl Chloride Copolymerization, Polymer International, 1994, pp. 141-149, Great Britain.

Seijas, et al., Tetrahedron, 48(9), 1637 (1992).

Shen, et al., Supported Atom Transfer Radical Polymerization of Methyl Methacrylate Mediated by CuBr-Tetraethyldiethylenetriamine Grafted onto Silica Gel—Journal of Polymer Science: Part A: Polymer Chemistry, vol. 39, 1051-1059 (2001); John Wiley & Sons, Inc.

Srivastava, et al., J. Inorg. Nucl. Chem. (1980), 42, 47.

Stille et al., Synthesis and Copolymerization of Styryl-Substituted Tetrazoles. Thermal Cross-Linking of Copolymers Containing Dipolarophiles and the Tetrazoles as Nitrile Imine Dipole Precursors, Macromolecules, 1972, pp. 377-384, vol. 5(4).

Sumerlin et al., Click Functionalization of Well-Defined Copolymers Prepared by Atom Transfer Radical Polymerization, in Controlled Radical Polymerization: From Synthesis to Materials, American Chemical Society Division of Polymer Chemistry, 2005, Chapter 11, pp. 140-152, vol. 944.

Takeichi et al., Preparation of Porous Carbon Films by the Pyrolysis of Poly(Urethane-imide) Films and Their Pore Characteristics, Carbon, 2001, pp. 257-265, vol. 39(2).

Tang, et al., J. Am. Chem. Soc., 128, 1598-1604 (2006).

Tsarevesky et al., Factors Determining the Performance of Copper-Based Atom Transfer Radical Polymerization Catalysts and Criteria for Rational Catalyst Selection, in Controlled Radical Polymerization: From Synthesis to Materials, American Chemical Society Division of Polymer Chemistry, 2005, Chapter 5, pp. 56-70, vol. 944.

Tsarevsky et al., Well-Defined (Co)polymers with 5-Vinyltetrazole Units via Combination of Atom Transfer Radical (Co)polymerization of Acrylonitrile and "Click Chemistry"-Type Postpolymerization Modification, Macromolecules, 2004, pp. 9308-9313, vol. 37(25).

Udding, et al., J. Org. Chem. 59, 1993 (1994).

Van Gaal et al., "Trends in Redox Potentials of Transition Metal Complexes," Coord. Chem. Rev. 1982, 47, 41.

Veregin, et al., Macromolecules, 1996, 29, 4161.

Vidts, et al., "Design of water-soluble block copolymers containing poly(4-vinylpyridine) by atom transfer radical polymerization", European Polymer Journal, Pergamon Press Ltd, Oxford, GB, vol. 42, No. 1, pp. 43-50 (2006).

Vlcek, "Ligand Based Redox Series," Coord. Chem. Rev. 1982, 43, 39.

Von Werne, et al., Preparation of Structurally Well-Defined Polymer—Nanoparticle Hybrids with Controlled/living Radical Polymerizations—J. Am. Chem. Soc. 1999, 121, 7409-7410.

Wang et al., "Living"/Controlled Radical Polymerization, Transition-Metal-Catalyzed Atom Transfer Radical Polymerization in the Presence of a Conventional Radical Initiator, Macromolecules, 1995, pp. 7572-7573, vol. 28.

Wang et al., Controlled/"Living" Radical Polymerization. Atom Transfer Radical Polymerization in the Presence of Transition-Metal Complexes, Journal of the American Chemical Society, 1995, pp. 5614-5615, vol. 117(20).

Wang et al., Controlled/"Living" Radical Polymerization. Halogen Atom Transfer Radical Polymerization Promoted by a Cu(I)/Cu(II) Redox Process, Macromolecules, 1995, pp. 7901-7910, vol. 28(23).

Wang et al., ESR Study and Radical Observation in Transition Metal-Mediated Polymerization: Unified View of Atom Transfer Radical Polymerization Mechanism, in ACS Symposium Series, Advances in Controlled/living Radical Polymerizations, American Chemical Society Division of Polymer Chemistry, 2003, Chapter 12, pp. 161-179, vol. 854.

Wang, et al., "Facile Synthesis of Acidic Copolymers Via Atom Transfer Radical Polymerization in Aqueous Media at Ambient Temperature", Macromolecules, ACS, Washington, DC, vol. 33, No. 2, (Jan. 25, 2000), pp. 255-257.

Wang, et al., J. Am. Chem. Soc. (1992), 114, 248-255.

Wang, et al., Polym. Prep. (Am. Chem. Soc. Polym. Chem. Div.), 36(1), 465 (1995).

Wayland, et al., Am. Chem. Soc., 116, 7943 (1994).

Webster, Living Polymerization Methods, Science, 1991, pp. 887-893, vol. 25.

Webster, Makromol. Chem., Macromol. Symp. 67, pp. 365-371 (1993), "Mechanism of GTP: Can all of the Available Data be Accommodated?".

Wei et al., Atom Transfer Radical Polymerization of Styrene in the Presence of Iron Complexes, Polymer Preprints, 1997, pp. 231, vol. 38(2).

Wu et al., Efficiency and Fidelity in a Click-Chemistry Route to Triazole Dendrimers by the Copper(I)-Catalyzed Ligation of Azides and Alkynes, Angewandte Chemie, International Edition, 2004, pp. 3928-3932, vol. 43(30).

Xia et al., Controlled/"Living" Radical Polymerization. Homogenous Reverse Atom Transfer Radical Polymerization Using AIBN as the Initiator, Macromolecules, 1997, pp. 7692-7696, vol. 30.

Xia, et al., "Atom Transfer Radical Polymerization of 4-Vinylpyridine", Macromolecules, pp. 3531-3533 (1999).

Zeng, et al., "Synthesis and Characterization of Comb-Branched Polyelectrolytes. 1. Preparation of Cationic Macromonomer of 2-(Dimethylamino)ethyl Methacrylate by Atom Transfer Radical Polymerization", Macromolecules, 33(5), pp. 1628-1635 (2000).

U.S. Appl. No. 09/534,827, filed Mar. 23, 2000.

* cited by examiner

POLYMERIZATION PROCESS WITH CATALYST REACTIVATION

CROSS REFERENCE TO RELATED APPLICATIONS

This application is a U.S. national stage filing under 35 U.S.C. §371 of International Application No. PCT/US2006/033792 filed Aug. 28, 2006 and claims benefit of and priority to U.S. Provisional Application Ser. No. 60/711,722 filed Aug. 26, 2005, U.S. Provisional Application Ser. No. 60/814,846 filed Jun. 19, 2006 and U.S. Provisional Application Ser. No. 60/814,816 filed Jun. 19, 2006.

TECHNICAL FIELD OF THE INVENTION

The present invention is directed to an atom transfer radical polymerization process where the catalyst in the activator state, or catalytic transfer agent, is continuously regenerated.

BACKGROUND OF THE INVENTION

Since their discovery controlled radical polymerization ("CRP") processes have gained increasing research and industrial attention. CRP processes couple the capability of conventional free radical polymerization ("RP") to (co)polymerize a wide range of monomers with the ability to synthesize polymeric materials with predetermined molecular weight ("MW"), low polydispersity ("PDI"), controlled composition, site specific functionality, selected chain topology, and incorporation of biological or inorganic species into the final product.

The three most studied methods of CRP processes are nitroxide mediated polymerization ("NMP"), atom transfer radical polymerization ("ATRP"), and degenerative transfer with dithioesters via reversible addition-fragmentation chain transfer polymerization ("RAFT"). CRP processes typically, but not necessarily, comprise a relatively low stationary concentration of propagating chain ends in relation to dormant chain ends. A dormant chain end comprises a transferable atom or group. The dormant chain end may be converted to a propagating chain end by loss of the transferable atom or group to the transition metal complex in the lower oxidation state. The low concentration of propagating chain ends present during the polymerization process reduces the probability of bimolecular termination reactions, leading to radical polymerization processes that behave as a "living" polymerization process.

The ATRP equilibrium (characterized by $K_{ATRP}$) most frequently involves homolytic cleavage of an alkyl (pseudo) halide bond R—X by a transition metal complex activator $Mt^n/L$ which (reversibly) generates an active propagating alkyl radical R. and the corresponding higher oxidation state metal halide deactivator $Mt^{n+1}X/L$ in a redox reaction Scheme 1.

Scheme 1. Representation of the equilibrium for an embodiment of an ATRP process.

Normal ATRP

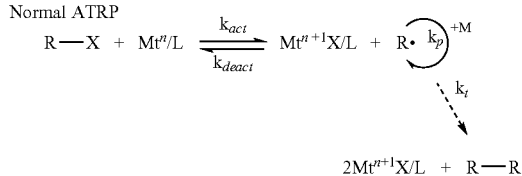

The active R• may then propagate with a vinyl monomer (M), be deactivated in this equilibrium reaction by $Mt^{n+1}X/L$, or terminate by either coupling or disproportionation with another R•. Such termination results in an increase in the amount of deactivator, $Mt^{n+1}X/L$, by two equivalents resulting in an increase in concentration of dormant species as a result of the persistent radical effect. [Fischer, H. Chem. Rev. 2001, 101, 3581-3610.]

In some embodiments of CRP processes, a fast rate of initiation ("$R_i$"), relative to the rate of propagation ("$R_p$"), (For example, where from a process where $R_i << R_p$ to a process where $R_i \sim R_p$) contributes to control of the molecular weight, degree of polymerization ("$DP_n$") and molecular weight distribution. As used herein, $DP_n \sim [M]/[I]_0$, where [M] is the moles of monomer polymerized and $[I]_0$ is the initial concentration of the added initiator. Termination reactions will tend to reduce the control over such properties and since CRP processes are radical based polymerization processes, some termination reactions during a CRP process are unavoidable.

In all radical polymerizations, biradical termination occurs with a rate of termination ("$k_t$") which is dependent on the concentration of radicals ("[P*]") to the power two ($R_t = k_t [P^*]^2$). Therefore, it may be assumed that at the same rate of propagation (the same concentration of radicals), generally the same number of chains would terminate, regardless whether the polymerization process is a RP or a CRP. However, this assumption ignores the diffusion effect of the macromolecule radicals in a CRP. In a RP most chains are terminated by the reaction of a small radical with a growing polymer radical. In the case of SFRP, or ATRP, these initial termination reactions result in an increase in the concentration of dormant species as a result of the persistent radical effect, [Fischer, H. Chem. Rev. 2001, 101, 3581-3610.]

In an RP, all polymer chains are eventually terminated, whereas in CRP the terminated chains constitute only small fraction of all chains (~1 to 10%) while most polymer chains are in the dormant state. The majority of polymer chains in a CRP in the dormant state are capable of reactivation which allows continuation of the polymerization, functionalization, chain extension to form block copolymers, etc. Thus, a CRP behaves as a "living" polymerization process. [Greszta, D. et. al. Macromolecules 1994, 27, 638.] As used herein, "polymer" refers to a macromolecule formed by the chemical union of monomers, typically five or more monomers. The term polymer includes homopolymers and copolymers including random copolymers, statistical copolymers, alternating copolymers, gradient copolymers, periodic copolymers, telechelic polymers and polymers of any topology or architecture including block copolymers, graft polymers, star polymers, bottle-brush polymers, comb polymers, branched or hyperbranched polymers, and such polymers tethered to particle surfaces or flat surfaces as well as other polymer structures.

ATRP is the most frequently used CRP technique with a significant commercial potential for many specialty materials including coatings, sealants, adhesives, dispersants but also materials for health and beauty products, electronics and biomedical applications. The most frequently used ATRP process comprises a reversible halogen atom transfer catalyzed by redox active transition metal compounds, most frequently copper based. ATRP transition metal catalysts typically comprise a transition metal complexed with a ligand. In ATRP, radically polymerizable monomers are polymerized in the presence of a transition metal catalyst. For a list of radically polymerizable monomers, see U.S. Pat. No. 5,763,548, hereby incorporated by reference. It is believed that the transition metal catalyst participates in a redox reaction with at least one of an ATRP initiator and a dormant polymer chain, see Scheme 1. Suitable transition metal catalysts comprise a transition metal and a ligand coordinated to the transition metal. The transition metal catalyst participates in a reversible redox reaction with at least one of an ATRP initiator and a dormant polymer chain. Suitable transition metal catalysts comprise a transition metal and, optionally, at least one ligand coordinated to the transition metal. The activity of the transition metal catalyst depends on the composition of the transition metal and the ligand.

To function as an ATRP transition metal catalyst, the transition metal must have at least two readily accessible oxidation states separated by one electron, a higher oxidation state and a lower oxidation state. The reversible redox reaction results in the transition metal catalyst cycling between the higher oxidation state (the "deactivator state") and a lower oxidation state (the "activator state") while the polymer chains cycle between having propagating chain ends and dormant chain ends. Typically, the transition metal is one of copper, iron, rhodium, nickel, cobalt, palladium, molybdenum, manganese, rhenium, or ruthenium. In some embodiments, the transition metal catalyst comprises a copper halide, and preferably the copper halide is one of Cu(I)Br or Cu(I)Cl. Living/controlled polymerizations typically, but not necessarily, comprise a relatively low stationary concentration of polymers comprising propagating chain ends in relation to polymers having dormant chain ends. When the polymer has a dormant chain end, the chain end comprises the transferable atom or group. The dormant chain end may be converted to a propagating chain end by transfer of the transferable atom or group to the transition metal catalyst. The description of the mechanism of an ATRP is provided for explanation and is not intended to limit the invention. The disclosed mechanism is generally accepted, but different transition metal catalyst may result in different mechanisms. The ligand affects the structure of the catalyst, the solubilizing effect, and catalyst activity. See Catalyst Development www.chem.cmuedu/groups/maty/about/research/05.html, hereby incorporated by reference.

ATRP is considered to be one of the most successful CRP and has been thoroughly described in a series of co-assigned U.S. patents and applications, such as U.S. Pat. Nos. 5,763, 548; 5,807,937; 5,789,487; 5,945,491; 6,111,022; 6,121,371; 6,124,411; 6,162,882; 6,407,187; 6,512,060; 6,538,091; 6,541,580; 6,624,262; 6,624,263; 6,627,314; 6,759,491; and U.S. patent application Ser. Nos. 09/534,827; 09/972,056; 10/034,908; 10/269,556; 10/289,545; 10/638,584; 10/860, 807; 10/684,137; 10/781,061 and 10/992,249 all of which are herein incorporated by reference. ATRP has also been discussed in numerous publications with Matyjaszewski as co-author and reviewed in several book chapters. [*ACS Symp. Ser.*, 1998, 685; *ACS Symp. Ser.*, 2000; 768; *Chem. Rev.* 2001, 101, 2921-2990; *ACS Symp. Ser.*, 2003; 854; *ACS Symp. Ser.*, 2006; 944.] Within these publications similar polymerization processes may be referred to by different names, such as transition metal mediated polymerization or atom transfer polymerization, but the processes may be similar and if involve reaction mechanism of Scheme 1 will be referred to herein as "ATRP". Such publications describe ATRP catalysts including the reducing power of several transition metal ligand combinations and the manner in which an ATRP equilibrium can be adjusted for more or less reactive monomers.

Embodiments of ATRP processes provide advantages over other CRP processes, including the availability wide variety of initiators and macroinitiators, including wafers, inorganic colloids, glass, paper, and bio-active molecules including proteins, DNA, carbohydrates and many commercial polymers may be simply synthesized as initiators; many polymers produced by ATRP allow facile functionalization or transformation of the end groups by replacing terminal halogens with azides, amines, phosphines and other functionalities via nucleophilic substitution, radical addition or other radical combination reactions; an abundance of monomers are polymerizable by ATRP. Such monomers include, but are not limited to, styrenics, (meth)acrylates, acrylonitrile, acrylamides, vinyl chlorides, and other monomers. Embodiments of ATRP allow the production of macromolecules with complex topology such as stars, combs and dendrimers, coupled with the ability to control composition and hence functionality in block, gradient, periodic copolymers etc. and even control polymer tacticity. ATRP may be carried out in bulk, or in the presence of organic solvents or in water under homogeneous or heterogeneous conditions, in ionic liquids, and in supercritical $CO_2$.

However, for certain applications and economic considerations, a low concentration of transition metal catalyst in an ATRP medium may be desired. Several methods have been developed to remove or reduce the amount of transition metals in the process, but these processes may add additional cost to the preparation of polymers by ATRP.

Several methods may be used to provide polymers by ATRP processes with low concentrations of catalysts. Such methods include performing an ATRP process with highly active catalyst that may require a lower concentration of catalyst to maintain the desired polymerization rate, for example, CuBr complexed by $Me_6TREN$ is ~10,000 more active than CuBr complexed by bipyridine ligands; immobilizing the catalysts on solids such as a hybrid catalyst system comprising both immobilized catalyst complexes interacting with small concentrations of soluble catalysts (~10-20 ppm); and several post polymerization methods developed to recover and regenerate catalysts, including separating the catalyst by filtration, adsorption, precipitation or extraction. For example, CuBr/PMDETA complex may be oxidized to Cu(II) species by exposure to air and quantitatively extracted from toluene to water, resulting, in some cases, with less than 1 ppm of catalyst remaining in the polymer. In spite of these advances, there remains a need to reduce the concentration of catalyst in the active polymerization media while maintaining polymer reaction rate and retaining control over MW and PDI.

The most attractive route may be just a simple decrease of the amount of the catalyst, providing that it has a sufficient reactivity. For example, ATRP processes comprising CuBr/$Me_6TREN$ complexes may be carried out at room temperature with much lower concentrations of the copper based catalyst. Regrettably, the amount of transition metal catalyst, such a Cu(I), may not simply be reduced 10,000 fold. Radical termination reactions result in an increase in the concentration of the transition metal catalyst in the deactivator state and irreversible consumption of the catalyst activators. In certain embodiments with certain monomers, the polymerization may stop if the amount of Cu(I) present in the reaction is below 10% of the initiator (as, 1~10% of chains are terminated). The amount of terminated chains depends on the concentration of propagating radicals and rate constant of termination according to equation 1, which describes the number of terminated chains (or loss of Cu(I) activator) in an ATRP.

$$-\Delta[Cu^I] = \Delta[P_t] = k_t[P^\bullet]^2 t \tag{1}$$

The ATRP rate law (Equation 2) indicates that the polymerization rate depends on the ratio of Cu(I) to X—Cu(II) concentration but does NOT depend on the absolute concentration of copper complexes. Thus, in principle, the amount of copper may be reduced without affecting polymerization rate as long as the ratio of activator to deactivator is maintained.

$$R_p = k_p[M][P^*] = k_p[M]K_{eq}[I]_o \frac{[Cu^I]}{[X-Cu^{II}]} \quad (2)$$

Unfortunately, as the reaction progresses the ratio of Cu(I) to X—Cu(II) is reduced through termination reactions and the polymerization rate decreases and eventually, in the absence of a sufficient concentration of the catalyst activator ATRP stops. See Equation 3. Thus, the amount of copper catalyst complexes that have generally been added to an ATRP reaction has exceed that of the expected number of terminated chains (i.e. >10% [I]$_o$) in order to drive the reaction to completion.

$$-\Delta[Cu^I/L] = \Delta[Cu^{II}X/L] = \Delta[P_{dead}] = k_t[P^*]^2 dt \quad (3)$$

Some amount of the deactivation species (i.e. X—Cu(II)) is also needed in the system for a well-controlled polymerization because molecular weight distribution and initial molecular weight depend on the ratio of propagation and deactivation rate constants and concentration of deactivator, according to Equation 4.

$$\frac{M_w}{M_n} = 1 + \frac{1}{DP_n} + \left(\frac{[R-X]_o k_p}{k_{da}[X-Cu^{II}]}\right)\left(\frac{2}{p}-1\right) \quad (4)$$

In a RAFT polymerization process termination reactions are suppressed through the addition of a suitable thiocarbonylthio compound, also known as a dithioester, to an otherwise conventional free radical polymerization; i.e. there is a continuous slow generation of radicals by decomposition of a standard radical initiator in order to drive the reaction forward. Control in such a RAFT process is thought to be achieved through a degenerative chain transfer mechanism in which a propagating radical reacts with the thiocarbonylthio compound to produce an intermediate radical species. This process decreases the instantaneous number of free radicals available for termination reactions that require two free radicals. RAFT (co)polymerization reactions have been discussed in U.S. Pat. Nos. 6,153,705; 6,380,355; 6,642,318 and 6,855,840.

There is a need for a transition metal catalyzed chain transfer polymerization process for free radically (co)polymerizable monomers that uses low concentrations of catalysts.

SUMMARY

Polymerization processes of the present invention comprise low catalyst concentration. Embodiments include a polymerization process comprising polymerizing free radically (co)polymerizable monomers in a polymerization medium comprising one or more radically (co)polymerizable monomers, a transition metal catalyst complex capable of participating in a one electron redox reaction with an ATRP initiator; a free radical initiator; and an ATRP initiator; (wherein the concentration of transition metal catalyst complex in the polymerization medium is less than 100 ppm). Further embodiments include a polymerization process, comprising polymerizing one or more radically (co)polymerizable monomers in the presence of at least one transition metal catalyst complex; and an ATRP initiator; and a reducing agent; wherein the transition metal catalyst complex is present at less than $10^{-3}$ mole compared to the moles of radically transferable atoms or groups present on the ATRP initiator.

DESCRIPTION OF EMBODIMENTS OF THE INVENTION

Figure 1:
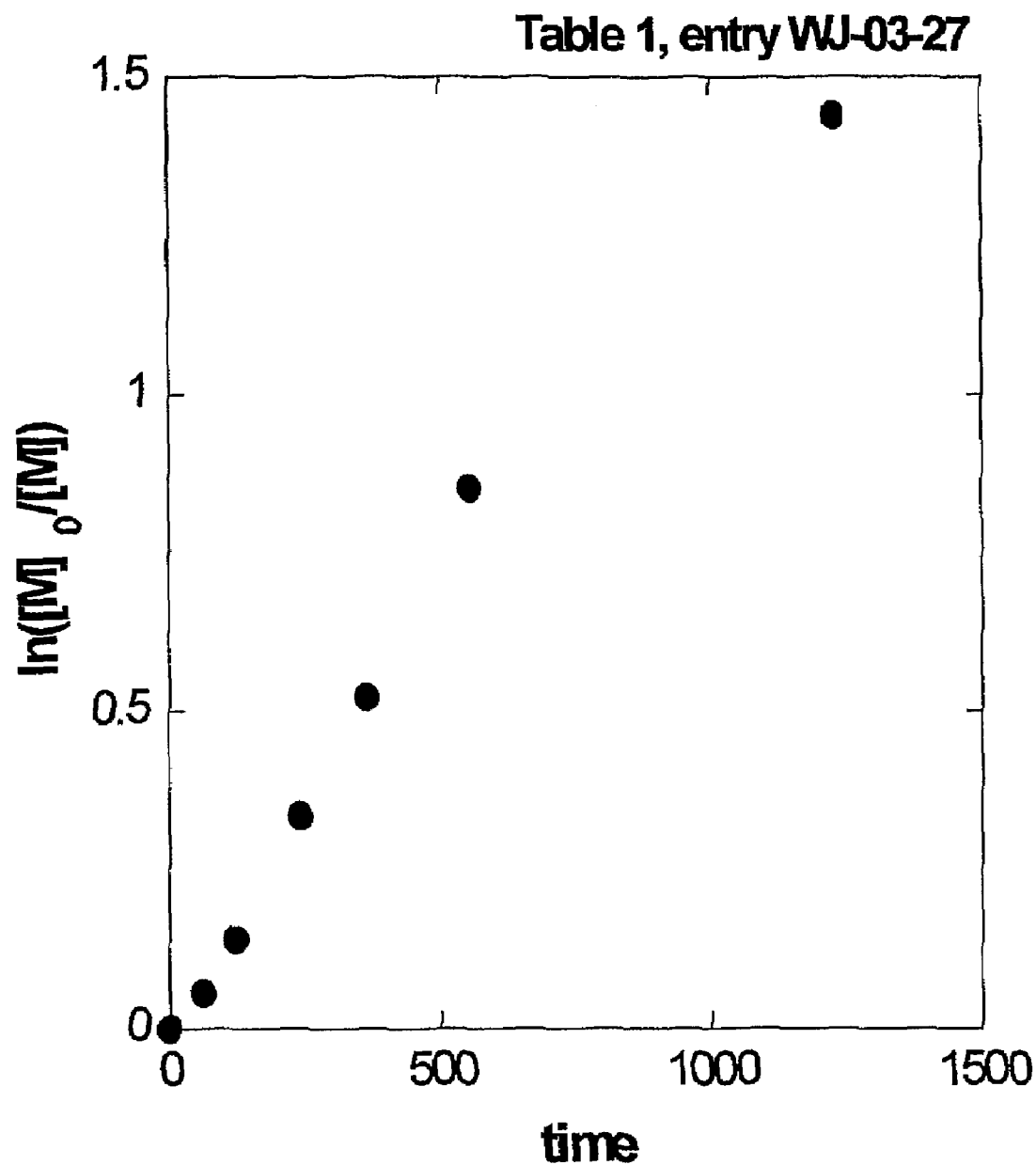
FIG. 1 is a graph of the kinetic data for an embodiment of a polymerization process comprising polymerizing styrene in the presence of 15 ppm of copper with a polymerization medium having the following components, ratios, and conditions: St/EtBrIB/Cu(II)/Me$_6$TREN/Sn(EH)$_2$=200/1/0.003/0.1/0.1; [St]$_0$=5.82 M, T=110° C., in anisole (0.5 equivalents vs. monomer)

The present invention is directed to a polymerization process that regenerate the transition metal in the activator state. Embodiments could be considered to provide a new mechanism for Controlled Radical Polymerization. Embodiments of the ATRP polymerization process comprise a transition metal complex catalyzed halogen transfer polymerization where the transition metal complex is continuously reactivated by reaction with radicals. The radicals may be formed by the decomposition of a free radical initiator or by self initiation reactions.

In one embodiment the present invention could be considered to be a new mechanism for continuous reactivation a transition metal complex catalyzed (pseudo)halogen transfer polymerization where the transition metal complex is continuously reactivated by reaction with formed radicals. This mechanism comprises initiators for continuous activator regeneration ("ICAR"), see Scheme 2.

Scheme 2. A General Representation of an embodiment of the equilibrium for ICAR ATRP.

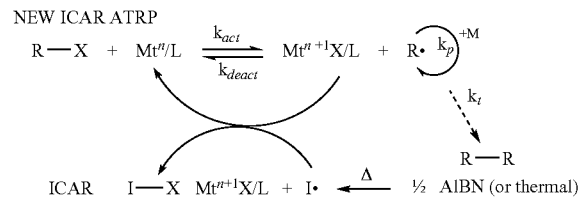

Embodiments of the present invention provide control over radical reactions that may be considered conceptually to combine aspects of ATRP and RAFT. In RAFT, a chain transfer agent is employed to reversibly transfer a labile dithioester end group among propagating radical chains. Embodiments of ICAR ATRP process may be considered to be similar, wherein the role of the dithioester transfer agent in RAFT is replaced in ICAR by the initiator or growing polymer chain end in the presence of low concentrations, ppm amounts, of an ATRP catalyst complex and there is a continuous slow generation of radicals by decomposition of a standard radical initiator in order to drive the reaction forward. Control in a RAFT process is thought to be achieved through a degenerative chain transfer mechanism in which a propagating radical reacts with the thiocarbonylthio compound to produce an intermediate radical species. This process decreases the instantaneous number of free radicals available for termination reactions that require two free radicals. RAFT (co)polymerization reactions have been discussed in U.S. Pat. Nos. 6,153,705; 6,380,355; 6,642,318 and 6,855,840. This process may be correlated to the process of scheme 2, where the transfer of a radically transferable atom is catalyzed by a transition metal complex and the reaction is driven by the presence of radicals formed by decomposition of a free radical initiator.

The advantage of an ATRP process over a RAFT polymerization include the availability of monofunctional and multifunctional ATRP initiators as disclosed in other patents and patent applications with Matyjaszewski as inventor; the exchange reaction in an ATRP process is with a small molecule, (Mt(II)X), not with a polymeric chain end as in RAFT; and the dormant chain end can be readily modified to provide the desired tele-functional groups. Although the invention is exemplified with a halogen a transferable atom or group and copper based transition metal complexes, ATRP process may comprise any radically transferable atom or group and transition metal such as, for example, environmentally friendly iron complexes.

Embodiments of the polymerization process of the present invention are directed towards polymerizing free radically (co)polymerizable monomers in the presence of a polymerization medium comprising at least one transition metal catalyst, or precursor of the active catalytic species, at least one of a free radical initiator and a reducing agent, and an ATRP initiator (RX). ATRP initiators include molecules comprising at least one radically transferable atom or group, including small molecule initiators, polymeric initiators, and polymers in the polymerization medium comprising a dormant chain end that may be reinitiated or reactivated. The polymerization medium may initially comprise a free radical initiator or a reducing agent or the free radical initiator or reducing agent may be added after initiation of the polymerization. After initiation of the polymerization of the radically (co)polymerizable monomers, free radical initiators or reducing agent may be added continuously, sequentially, or all at once into the reaction medium.

In one embodiment, the ATRP process comprises polymerizing free radically polymerizable monomers in a polymerization medium comprising radically polymerizable monomers, a transition metal catalyst, an ATRP initiator, a free radical initiator, wherein the concentration of the transition metal catalyst complex in the polymerization medium is less than 100 ppm. The polymerization medium may further comprise a solvent, or water forming either a homogeneous or heterogeneous polymerization medium. The free radical initiator may be any molecule that may be induced to form free radicals, such as a molecule that forms radicals by thermal, photoinitiated or other decomposition process. Free radical initiators include peroxides, azo compounds, disulfides, and tetrazines. More specifically, free radical initiators include acyl peroxides, acyl peroxides, benzoyl peroxides, alkyl peroxides, cumyl peroxides, tributyl peroxides, hydroperoxides, cumyl hydroperoxide, tributyl hydroperoxide, peresters, tributyl perbenzoate, alkyl sulfonyl peroxides, dialkyl peroxydicarbonates, diperoxyketals, ketone peroxides, 2,2' azobisisobutyronitrile ("AIBN"), 2,2' azobis (2,4-dimethyl pentanenitrile), and 1,1' azobis (cyclohexane-carbonitrile). Additionally, some monomers may decompose to form radicals, such as styrene and styrene derivatives, therefore the monomer of the polymerization process may also act as the free radical initiator or reducing agent in embodiments of low catalyst ATRP processes. Free radical initiators decompose to form radicals at different rates based on the decomposition stimulus, such as temperature. In certain embodiments, the free radical initiator may be soluble in the polymerization medium.

In certain embodiments, the free radical initiator is selected such that at the temperature of the polymerization reaction the free radical initiator decomposes at a rate that is substantially the same as the rate of termination in the polymerization. The free radical initiator forms free radicals, or the equivalent of free radicals in the reaction medium. See Table 1 for half lives of free radical initiators at various temperatures.

The system therefore behaves essentially as a conventional RP with similar kinetics but with the ATRP initiator acting as a combination "transfer agent"—initiator present at 50 ppm or less, in some polymerization processes less than 10 ppm, Mt(II) or Mt(I) as a transfer catalyst.

In another embodiment, the polymerization process comprises polymerizing free radically polymerizable monomers in a polymerization medium comprising radically polymerizable monomers, a transition metal catalyst, an ATRP initiator, and a reducing agent. The polymerization medium may further comprise a solvent, or water. In such an embodiment, the transition metal complex may be initially in the oxidatively stable higher oxidation state, such as $Cu^{II}$, and reduced to the activator state to initiate the polymerization process. Excess of reducing agent may be added to remove low concentrations oxygen from the system.

The reducing agent may be any reducing agent capable of reducing the transition metal catalyst from a higher oxidation state to a lower oxidation state, thereby reforming the catalyst activator state. Such reducing agents include, but are not limited to, $SO_2$, sulfites, bisulfites, thiosulfites, mercaptans, hydroxylamines, hydrazine ($N_2H_4$), phenylhydrazine (Ph-$NHNH_2$), hydrazones, hydroquinone, food preservatives, flavonoids, beta carotene, vitamin A, α-tocopherols, vitamin E, propyl gallate, octyl gallate, BHA, BHT, propionic acids, ascorbic acid, sorbates, reducing sugars, sugars comprising an aldehyde group glucose, lactose, fructose, dextrose, potassium tartrate, nitrites, nitrites, dextrin, aldehydes, glycine, and transition metal salts. The reducing agent may further be capable of complexing with the transition metal, thereby becoming a ligand.

In a preferred embodiment, the reducing agent does not produce an acid after reducing the transition metal complex from the higher oxidation state to the lower oxidation state, such as hydrazine and phenyl hydrazine. With hydrazines, and substituted hydrazines, the products of oxidation are either nitrogen gas or organic in nature, compared to previous exemplified ARGET systems which predominately employed metal reducing agents for the reduction process in bulk media. [Jakubowski, W.; Min, K.; Matyjaszewski, K. *Macromolecules* 2006, 39, 39-45.] The reducing agent may also scavenge oxidants in the polymerization medium. In certain embodiments, the amount of reducing agent will be determined by the total concentration of the oxidants in the polymerization medium, if any; the amount of termination reactions in the polymerization; and the desired rate of the redox reaction. Typically, the reducing agent will be present

TABLE 1

HALF-LIVES OF FREE RADICAL INITIATORS[a,b]

| Initiator | 50° C. | 60° C. | 70° C. | 85° C. | 100° C. | 115° C. | 130° C. | 145° C. | 155° C. | 175° C. |
|---|---|---|---|---|---|---|---|---|---|---|
| Azobisisobutyronitrile | 74 hr | | 4.8 hr | | 7.2 min | | | | | |
| Benzoyl peroxide | | | 7.3 hr | 1.4 hr | 19.8 min | | | | | |
| Acetyl peroxide | 158 hr | | 8.1 hr | 1.1 hr | | | | | | |
| Lauryl peroxide | 47.7 hr | 12.8 hr | 3.5 hr | 31 min | | | | | | |
| t-Butyl peracetate | | | | 88 hr | 12.5 hr | 1.9 hr | 18 min | | | |
| Cumyl peroxide | | | | | | 13 hr | 1.7 hr | 16.8 min | | |
| t-Butyl peroxide | | | | | 218 hr | 34 hr | 6.4 hr | 1.38 min | | |
| t-Butyl hydroperoxide | | | | | 338 hr | | | | 44.9 hr | 4.81 hr |

[a]Data from Brandrup and Immergut [1989] and Huyser [1970].
[b]t ½ values are for benezene or toluene solutions of the initiators.

in the polymerization medium such that the molar ratio of reducing agent to ATRP initiator is less than 0.1, or in certain embodiments, less than 0.05.

As noted above similar rules for catalyst selection exist in ARGET ATRP as did in Several factors should be considered for catalyst selection in ARGET ATRP.

First, the release of acid during the oxidation of certain reducing agents (as is the case with many organic reducing agents that can be employed in ARGET ATRP, including sugars, phenols or thiophenols, ascorbic acid, etc.) can destabilize copper-based ATRP catalysts derived from amines. Therefore the addition of excess base, or excess ligand or reducing agent acting as a base, will likely be required to trap the acid. The addition of a base may modify the reducing power of the reducing agent. Of course, in the presence of acidic compounds (i.e., in some embodiments of ARGET ATRP), the stability of the complexes depends very strongly upon the basicity of the ligands. A ligand that is not very basic (such as some of the heterodonor ligands) may be advantageous.

Second, the basicity/nucleophilicity of the reducing agent such as $N_2H_4$ and $PhNHNH_2$ may be an issue, particularly in the ARGET ATRP of styrene. The alkyl halide chain end may react with bases resulting in both in a loss of functionality and a consumption of reducing agent.

Third, the dynamics of the redox process between the Cu complexes and reducing agents (and ultimately attainable control) will likely depend upon the ligand used to form the complex with the catalyst (and value of $K_{ATRP}$) that is employed.

In certain embodiments, the reducing agent may be select for a particular polymerization process such that at the polymerization temperature the reducing agent reduces a sufficient quantity of transition metal catalyst in the higher oxidation state to transition metal catalyst in the lower oxidation state to substantially maintain the polymerization rate. For example, at the polymerization temperature the reducing agent reduces the additional amount of transition metal catalyst in the higher oxidation state to substantially maintain the ratio of transition metal catalyst in the higher oxidation state to transition metal catalyst in the lower oxidation state. To substantially maintain such ratio means that the ratio does not vary greater than 20% after initiation of the polymerization.

In embodiments of the polymerization process, such as ICAR ATRP and ARGET ATRP polymerization processes, the concentration of the transition metal catalyst must be present in the polymerization medium and may be less than 100 ppm, less than 50 ppm, or even less than 10 ppm. In contrast to the free radical initiators, the reducing agents do not initiate a new polymer chain after reducing the transition metal catalyst in the higher oxidation state.

In embodiments of the ATRP process, the atom or group transfer transition metal complex may be an efficient deactivator, i.e. efficiently donate the (X) atom or group to the growing active chain. The process will be initially exemplified by the use of a very small amount of Cu, ~10 ppm complexed with a ligand that forms an active ATRP catalyst and is also an effective deactivator, such as tris[2-(dimethylamino)ethyl]amine ("Me$_6$TREN"), tris[(2-pyridyl)methyl]amine ("TPMA"), and H$_6$TREN. Other embodiments include ligands forming less active catalysts such as N,N,N',N'',N''-pentamethyldiethylenetriamine (PMDETA), 4,4'-di-(5-nonyl)-2,2'-dipyridyl (dNbpy) and N-(n-octyl)-2-pyridylmethanimine.

The use of low concentrations of catalyst in an ATRP reaction reduces the impact of catalyst based side reactions that limited the ability to prepare high molecular weight materials in some embodiments. One possible explanation of this limitation may be that the radicals interacted with the catalyst complex. For example, the polystyryl radical may be oxidized to a cation by the $Cu^{II}$ species, thereby limiting formation of well-defined high molecular weight polystyrenes by ATRP. However, since this ICAR ATRP and ARGET ATRP may comprise very small amounts of transition metal in the deactivator state, the synthesis of high molecular weight polymers for all monomers are now much more feasible. In certain embodiments of the polymerization processes of the present invention, excess ligand may be added to the polymerization. Excess ligand is present when the quantity of ligand present in the polymerization medium exceeds the amount of ligand required to complex with the transition metal to form the transition metal catalyst. One skilled in the art would understand the coordination characteristics of each transition metal complex. The amount of excess ligand, or ligand surrogate such as free amine, may be as much as ten times the require amount of ligand. In some polymerization processes lower amounts of ligand may lead to polymers with higher polydispersities. At reduced quantities of ligand the transition metal catalyst may complex with the monomer. The ligand may complex with the monomer such as styrene with other components of the polymerization medium. For example, if tin is used as a reducing agent, sufficient ligand should be added to allow for complex formation with both the reducing agent and the transition metal of the catalyst.

The present invention is also directed to polymers comprising high molecular weight. Embodiments include polystyrene comprising end groups typical of an ATRP process and a molecular weight of greater than 50,000 and polyacrylonitrile comprising end groups typical of an ATRP process and a molecular weight of greater than 50,000. In ATRP processes, the initiator is of the formula R—X, where X is the radically transferable atom or group. After polymerization, a typical polymer formed by ATRP will have the R group on one end and the X group on the other end. The definitions of R and X are defined in United States patents that are incorporated by reference.

In certain embodiments of an ICAR ATRP or ARGET ATRP process, the free radical initiator or the reducing agent controls the rate of polymerization by regenerating the activator catalyst complex while allowing sufficient amounts of the catalyst complex efficiently deactivates the growing chains to remain. In such embodiments, controlled synthesis ($M_w/M_n$<1.2) of polystyrene and poly(alkyl (meth)acrylates) can be performed with catalyst concentrations between 1 and 50 ppm. At such concentrations, catalyst removal or recycling may be unnecessary for many industrial applications, since the color of products are not significantly affected by the such low concentrations of catalysts.

Furthermore, because some of the components of the ATRP equilibrium are not oxidatively stable, special handling procedures are often required to remove all oxidants from the system. Embodiments of the ICAR ATRP and ARGET ATRP process comprise initial use of the oxidatively stable catalyst precursors that can be prepared, stored, and shipped for use in ATRP. The transition metal complex in the activator state may be generated in situ from free radical initiators, a reducing agent, an in situ formed peroxide in the case of acrylate polymerization, or a combination thereof [Acar, A. E.; Yagci, M. B.; Mathias, L. J. *Macromolecules* 2000, 33, 7700-7706] and the oxidatively stable transition metal catalyst, for example $Cu^{II}$ or $Fe^{II}$.

In certain embodiments, the free radical initiator slowly and continuously decomposes to prevent the build up of the persistent radical, or higher oxidation state transition metal complex, formed by termination reactions. This composition of the free radical initiator may be used to maintain a substantially constant rate of polymerization; i.e. keep the ratio of transition metal in the low oxidation state (activator state) to transition metal in the higher oxidation state (deactivator state) relatively constant. In other embodiments, the free radical initiator or reducing agent may be used to increase or decrease the polymerization rate.

In other embodiments, the ATRP polymerization process comprises two different free radical initiators. For example, one free radical initiator may quickly activate the catalyst complex to ensure rapid initiation of the polymerization and the other may slowly act throughout the reaction to reactivate the complex, for example. The self-formed free radical initiator such as present in nitroxide mediated polymerizations with styrene and TEMPO may also be used. [Georges, M. K., Veregin, R. P. N., Kazmaier, P. M., Hamer, G. K.; Macromolecules 26: 2987-2988, 1993.] Free radical initiators may be used in coordination with reducing agents, also.

The following examples exemplify the broad applicability of this novel CRP. In order to obtain consistent kinetics the reagents used in most of the examples were purified however as detailed in some examples this is not a requirement and the reaction can be conducted directly with industrial grade monomers and in the presence of low concentrations of oxygen.

EXAMPLES

Chemicals. Styrene (St) (Aldrich, 99%) and n-butyl acrylate (nBA) (Acros 99+%) were passed through a column filled with neutral alumina, dried over calcium hydride, and distilled under reduced pressure. Tris(2-(dimethylamino)ethyl) amine ($Me_6TREN$) was synthesized following previously reported procedure. Ethyl 2-bromoisobutyrate (EtBrIB) (Acros, 98%), copper(II) chloride (Acros, 99%), tin(II) 2-ethylhexanoate ($Sn(EH)_2$) (Aldrich), anisole (Aldrich, 99%) were used as received.

In order to obtain consistent kinetics, the reagents used in most of the examples were purified, however as detailed in some examples this is not a requirement and the reaction can be conducted directly with industrial grade monomers.

Analysis. Molecular weight and polydispersity were determined by gel permeation chromatography (GPC). The GPC was conducted with a Waters 515 pump and Waters 2414 differential refractometer using PSS columns (Styrogel $10^5$, $10^3$, $10^2$ Å) in THF as an eluent at 35° C. and at a flow rate of 1 mL/min. Linear polystyrene standards were used for calibration. Conversion of styrene were determined using a Shimadzu GC 14-A gas chromatograph equipped with a FID detector using a J&W Scientific 30 m DB WAX Megabore column and anisole as an internal standard. Injector and detector temperatures were kept constant at 250° C. Analysis was carried out isothermally at 60° C. for 2 min followed by an increase of temperature to 140° C. at a heating rate of 40° C./min and holding at 140° C. for 2 min. Conversion was calculated by detecting the decrease of the monomer peak area relative to the peak areas of the standards.

Comparative Examples

Table 2 is shows typical ratio's of reagents used various ATRP processes and in a RAFT polymerization process.

TABLE 2

Typical molar ratios of reagents used in various ATRP processes and a RAFT process

| Polymerization method | M | R-X X = Br, Cl | $Cu^IX$ | $Cu^{II}X$ | Ligand | Reducing agent | AIBN |
|---|---|---|---|---|---|---|---|
| Normal ATRP | 200 | 1 | 1 | — | 1 | — | — |
| Reverse ATRP | 200 | — | — | 1 | 1 | — | 0.5 |
| SR&NI ATRP | 200 | 1 | — | 0.2 | 0.2 | — | 0.1 |
| AGET ATRP | 200 | 1 | — | 0.2 | 0.2 | 0.18 | — |
| ARGET ATRP | 200 | 1 | — | <0.01 | 0.1 | 0.1 | — |
| ICAR ATRP | 200 | 1 | — | <0.01 | 0.01 | — | <0.1 |
| RAFT | 200 | 1 dithioester | — | — | — | — | 0.1 |

As shown in Table 2 significantly less transition metal complex is typically comprised in ARGET ATRP and ICAR ATRP processes than the other listed ATRP process. While similar reagents are used in simultaneous reverse and normal initiation ("SR&NI") ATRP as in ICAR ATRP, ICAR ATRP allows the advantage of the use of much lower concentrations of transition metal catalysts. For more description of SR&NI ATRP, see U.S. Pat. No. 6,759,491.

The following examples show that a controlled radical polymerization is possible with low levels of transition metal catalysts, or catalytic halogen transfer agents, providing polymers with known chain end functionality. PREDICI simulations were conducted on embodiments of ICAR ATRP and ARGET ATRP process and the simulations confirmed applicability of the process parameters and provided further understanding of the parameters of the process.

In the following examples, the polymerization of styrene with 5 ppm of $CuCl_2/Me_6TREN$ and 500 ppm of $Sn(EH)_2$ resulted in the formation of essentially colorless high molecular weight polystyrene with $M_n$=12,500 ($M_{n,th}$=12,600) and $M_w/M_n$=1.28. When the polymerization was carried out with 1 ppm of $CuCl_2/Me_6TREN$, the molecular weight of the resulting polymer was still well controlled $M_n$=7200 ($M_{n,th}$=9,000) but polydispersities were higher, $M_w/M_n$=1.64. The polymerization of n-butyl acrylate was conducted with 50 ppm of $CuCl_2/Me_6TREN$ and 500 ppm of $Sn(EH)_2$ forming poly(butyl acrylate) with $M_n$=19,400 ($M_{n,th}$=18,100) and $M_w/M_n$=1.26.

These examples show that a controlled radical polymerization is possible with low levels of transition metal catalysts, or catalytic halogen transfer agents, providing polymers with known chain end functionality.

Example 1

General Procedure for Activators ReGenerated by Electron Transfer ("ARGET") ATRP of Styrene (with Number Average Degree of Polymerization ($DP_n$) of 200 and at 50 ppm of Cu)

Degassed styrene (5.0 ml, 44 mmol) and anisole (1.5 ml) were transferred via degassed syringes to dry, thoroughly purged by flushing with nitrogen Schlenk flask. Next, $CuCl_2$ (0.29 mg, $0.22 \times 10^{-2}$ mmol)/$Me_6TREN$ (0.57 μl, 0.22×

$10^{-2}$ mmol) complex in degassed anisole (0.5 ml) was added. Mixture was stirred for 10 minutes and then purged solution of $Sn(EH)_2$ (7.0 μl, $2.2 \times 10^{-2}$ mmol) and $Me_6TREN$ (5.7 μl, $2.2 \times 10^{-2}$ mmol) in anisole (0.5 ml) was added. At the end EtBrIB (32.1 μl, $21.9 \times 10^{-2}$ mmol) initiator was added. An initial sample was taken and the sealed flask was placed in thermostated oil bath at 110° C. The samples were taken at timed intervals and analyzed by gas chromatography and gel permeation chromatography. The polymerization was stopped after 7.6 h by opening the flask and exposing the catalyst to air. $M_{n,\ GPC}=12700$, $M_w/M_n=1.11$, conversion=59%.

Example 2

General Procedure for ARGET ATRP of Styrene Under Air ($DP_n$=200, 50 ppm of Cu)

Styrene (5.0 ml, 44 mmol) and anisole (1.5 ml) were added to open Schlenk flask. Next, $CuCl_2$ (0.29 mg, $0.22 \times 10^{-2}$ mmol)/$Me_6TREN$ (0.57 μl, $0.22 \times 10^{-2}$ mmol) complex in anisole (0.5 ml) was added. Mixture was stirred for 10 minutes and then solution of $Sn(EH)_2$ (7.0 μl, $2.2 \times 10^{-2}$ mmol) and $Me_6TREN$ (1.7 μl, $0.7 \times 10^{-2}$ mmol) in anisole (0.5 ml) was added. At the end EtBrIB (29.7 μl, $20.3 \times 10^{-2}$ mmol) initiator was added. Next, Schlenk flask was closed sealed and, after taking initial sample, placed in thermostated oil bath at 110° C. The samples were taken at timed intervals and analyzed by gas chromatography and gel permeation chromatography. The polymerization was stopped after 20 h ($M_{n,\ GPC}=15900$, $M_w/M_n=1.28$, conversion=76%) by opening the flask and exposing the catalyst to air.

Example 3

Preparation of Block Copolymers: PS-PnBA and PnBA-PS

An embodiment of ARGET ATRP was used for preparation of block copolymers. Copolymers PS-PnBA styrene and PnBA-PS were synthesized using previously specified conditions for polymerization of styrene (WJ-03-27) and n-butyl acrylate (WJ-03-53) in the presence of reducing agent $Sn(EH)_2$. The conditions and results for all the reactions are presented in Table 3. The polystyrene macroinitiator was prepared (WJ-03-55) by polymerization of styrene in the presence of 15 ppm of Cu. As in experiment WJ-03-27, a well controlled polymerization was observed demonstrating that results are reproducible.

Polystyrene with Mw=16000 and PDI=1.18 was precipitated and then used as macroinitiator in an ARGET ATRP of nBA (WJ-03-56). Chain extension of PS with nBA was performed in the presence of 50 ppm of Cu species. As expected from the results on homopolymerization of nBA (WJ-03-53) the reaction was less controlled than with styrene, although molecular weights were close to theoretical values the PDI increased through reaction from 1.18 to 1.33.

A similar synthetic strategy was used for preparation of PnBA-PS block copolymer. First PnBA macroinitiator was obtained (WJ-03-57) and then chain extended by formation of a PS block (WJ-03-59). In this case polymerization of nBA resulted in macroinitiator PnBA with Mw=17600 and PDI=1.32 (WJ-03-57) and since the polymerization of styrene is much better controlled this resulted in a decrease in the PDI of the final block copolymer to 1.18 (WJ-03-59). In all reactions monomodal distribution of MW was observed, molecular weights were close to theoretical values.

Polymerization of nBA at 10 ppm in the presence of reducing agent $Sn(EH)_2$ was carried out. From the tables it can be seen that molecular weights were close to theoretical values and a PDI>1.50 was observed.

TABLE 3

Conditions and results for ARGET ATRP of Styrene and n-butylacrylate.

| Label | In | Cu [ppm] | $CuCl_2$ | $Me_6TREN$ | AIBN | $Sn(EH)_2$ | Time (min) | Conv. (%) | $M_{n,theo}$[b] | $M_{n,GPC}$ | $M_w/M_n$ |
|---|---|---|---|---|---|---|---|---|---|---|---|
| WJ-03-27[a] | 1 | 15 | 0.003 | 0.1 | — | 0.1 | 1230 | 0.76 | 15250 | 17100 | 1.18 |
| WJ-03-53[c] | 1 | 50 | 0.0078 | 0.1 | — | 0.1 | 370 | 0.91 | 18100 | 19400 | 1.26 |
| WJ-03-55[a] | EtBrIB | 15 | 0.003 | 0.1 | — | 0.1 | 1180 | 0.77 | 15500 | 16000 | 1.18 |
| WJ-03-56[c] | PS WJ-03-55 | 50 | 0.0078 | 0.1 | — | 0.1 | 1260 | 0.59 | 27800 | 26300 | 1.33 |
| WJ-03-57[c] | EtBrIB | 50 | 0.0078 | 0.1 | — | 0.1 | 240 | 0.76 | 15200 | 17600 | 1.32 |
| WJ-03-58[c] | EtBrIB | 10 | 0.0016 | 0.1 | — | 0.1 | 520 | 0.93 | 18600 | 18700 | 1.54 |
| WJ-03-59[a] | PnBA WJ-03-57 | 15 | 0.003 | 0.1 | — | 0.1 | 1845 | 0.88 | 33800 | 32900 | 1.18 |

[a] $[St]_0/[In]_0 = 200$; $[St]_0 = 5.82$ M; T = 110° C., in anisole (0.5 volume equivalent vs. monomer);

[b] $M_{n,theo} = ([M]_0/[In]_0) \times$ conversion)

[c] $[nBA]_0/[In]_0 = 160$; $[St]_0 = 5.88$ M; T = 60° C., in anisole (0.2 volume equivalent vs. monomer);

TABLE 4

Experimental conditions and properties of PS prepared by ARGET ATRP - effect of amount of copper.[a]

| Entry | Molar ratios | | | | | Cu [ppm] | Time (min) | Conv. (%) | $M_{n,theo}$[b] | $M_{n,GPC}$ | $M_w/M_n$ |
|---|---|---|---|---|---|---|---|---|---|---|---|
| | St | EtBrIB | $CuCl_2$ | $Me_6TREN$ | $Sn(EH)_2$ | | | | | | |
| WJ-03-05 | 200 | 1 | 0.1 | 0.1 | 0.1 | 500 | 1020 | 67 | 14000 | 17000 | 1.12 |
| WJ-03-08 | 200 | 1 | 0.01 | 0.1 | 0.1 | 50 | 460 | 59 | 12300 | 12700 | 1.11 |
| WJ-03-27 | 200 | 1 | 0.003 | 0.1 | 0.1 | 15 | 1230 | 76 | 15300 | 17100 | 1.18 |
| WJ-03-24 | 200 | 1 | 0.001 | 0.03 | 0.1 | 5 | 1440 | 45 | 9000 | 7200 | 1.28 |
| WJ-03-28 | 200 | 1 | 0.0002 | 0.1 | 0.1 | 1 | 1230 | 63 | 12600 | 12500 | 1.64 |
| WJ-03-14 | 1000 | 1 | 0.1 | 0.1 | 0.1 | 100 | 2630 | 69 | 68900 | 71800 | 1.18 |
| WJ-03-15 | 1000 | 1 | 0.01 | 0.1 | 0.1 | 10 | 1590 | 64 | 64000 | 63000 | 1.17 |

[a] $[St]_0 = 5.82$ M; T = 110° C., in anisole (0.5 volume equivalent vs. monomer);
[b] $M_{n,theo} = ([M]_0/[EtBrIB]_0) \times$ conversion.

Discussion of Results

Several examples of an ATRP process comprising a reducing agent were performed and are summarized in Table 4. The concentration of the transition metal catalyst was varied in the first four experiments. At 1 ppm transition metal catalyst complex, $CuCl_2/Me_6TREN$, in the polymerization medium, polystyrene was prepared with the characteristics of a polymer prepared by a CRP process. The polymerization processes formed substantially colorless polystyrene.

Figure 2:
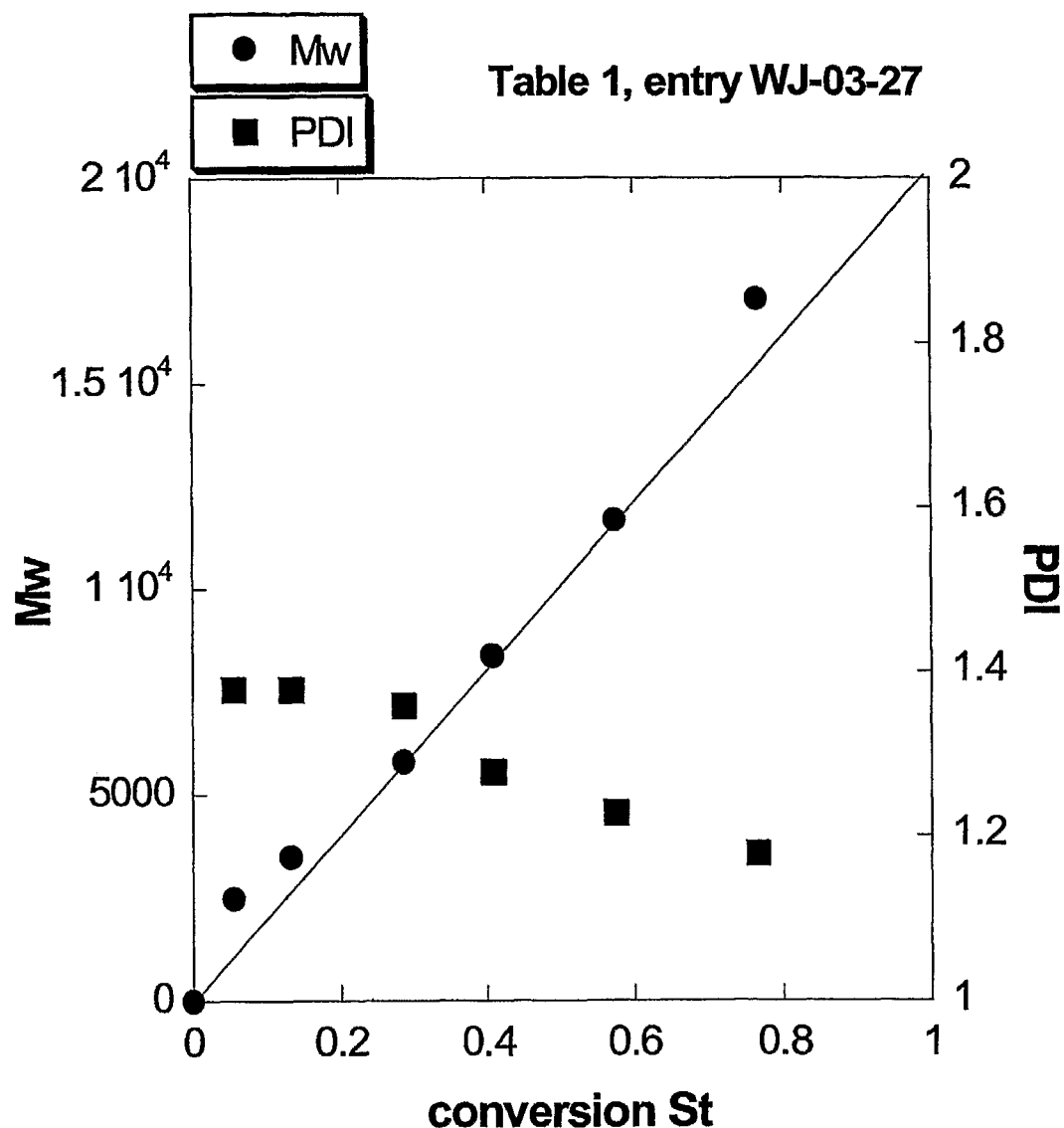
FIG. 2. is a graph of the molecular weight and polydispersity of a polystyrene formed as a function of conversion formed in the embodiment of FIG. 1.
Figure 3:
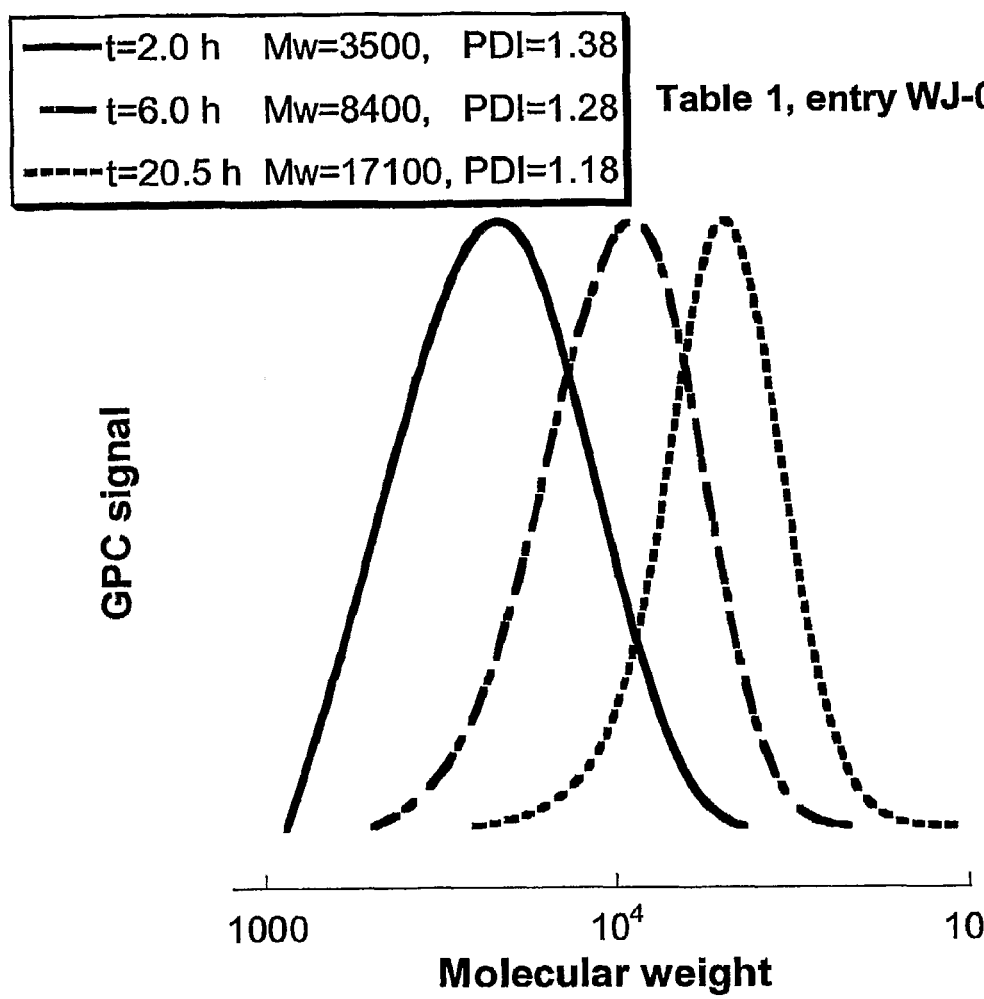
FIG. 3 is a graph showing the evolution of molecular weight by GPC traces during the embodiment of the polymerization process of FIG. 1.

FIG. 1 is a kinetic plot of data obtained during the ATRP polymerization process comprising polymerizing styrene in the presence of 15 ppm of a copper/$Me_6$TREN catalyst and a reducing agent $Sn(EH)_2$, and an ATRP initiator, EtBrIB, wherein the $Sn(EH)_2$ corresponds to 10% of the ATRP initiator (Tables 3 and 4, entry WJ-03-27). FIG. 1 shows that the rate of polymerization was constant with only a slight decrease after 500 minutes. The molecular weight and PDI curves in FIG. 2 indicates excellent control over the polymerization process. FIG. 3 shows smooth shift of entire molecular weight distribution towards higher molecular weights. However when the concentration of transition metal catalyst, or catalytic transfer agent, is reduced below 5 ppm of copper under these conditions (or without Cu) uncontrolled polymerization is observed (Table 4, entry WJ-03-28). Note however that the reaction with 5 ppm transition metal halogen transfer catalyst (Table 4, entry WJ-03-24) does produce a polymer with low PDI.

Figure 4:
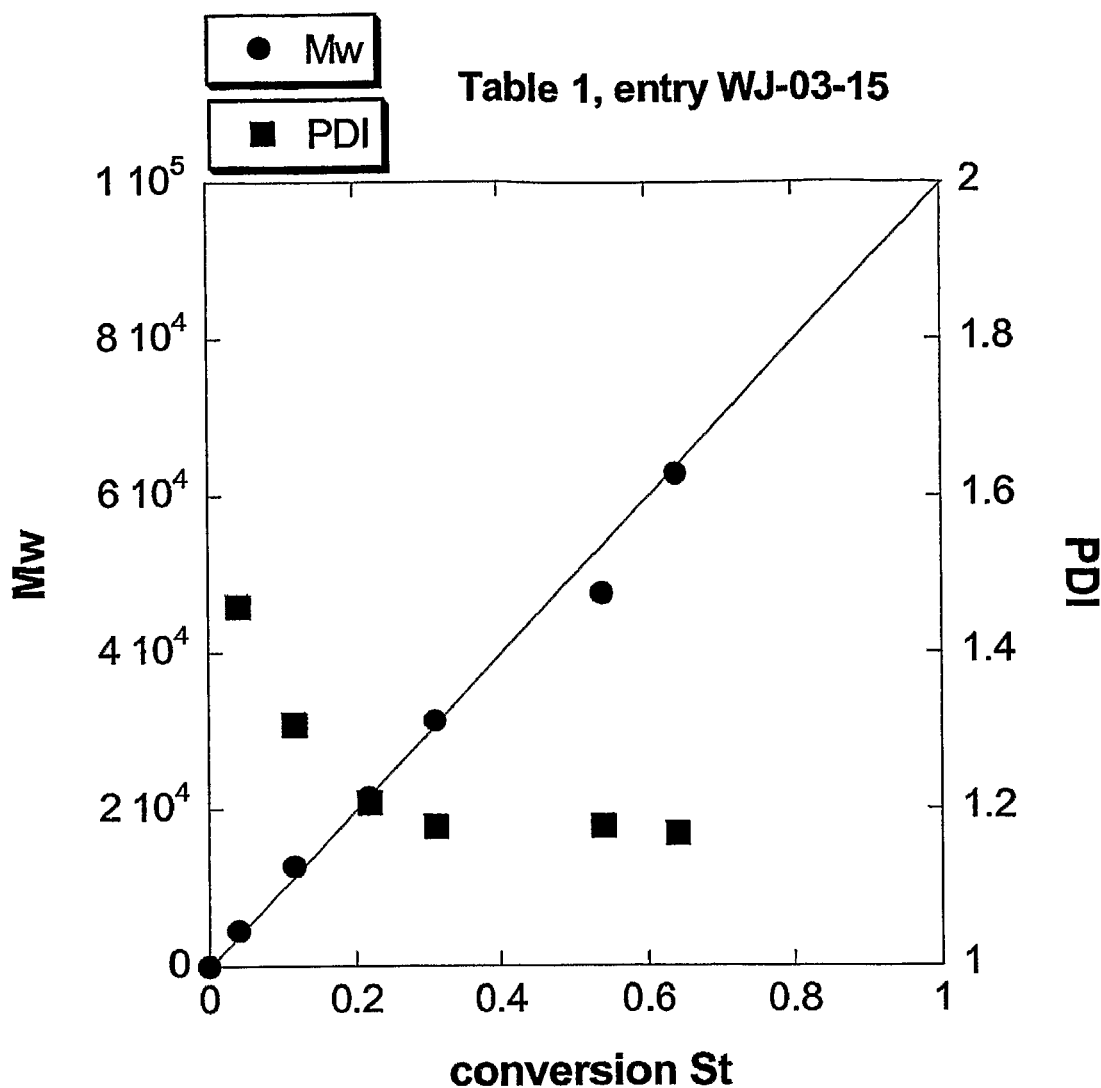
FIG. 4 is a graph of the evolution of molecular weight and polydispersity of polystyrene as a function of conversion in an ARGET ATRP process comprising polymerizing styrene in the presence of 10 ppm of copper with a polymerization medium having the following components, ratios, and conditions: St/EtBrIB/Cu(II)/Me$_6$TREN/Sn(EH)$_2$=1000/1/0.003/0.1/0.1; [St]$_0$=5.82 M, T=110° C., in anisole (0.5 equivalents vs. monomer)
Figure 5:
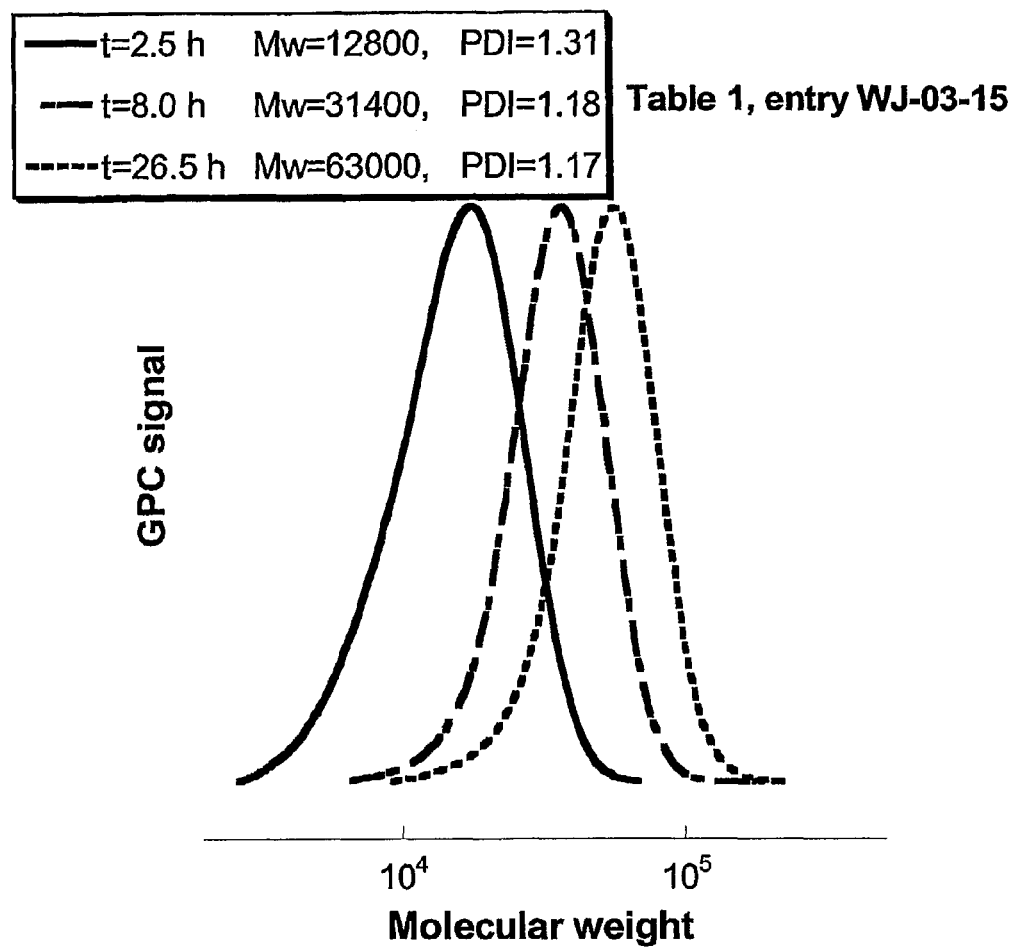
FIG. 5. is a graph of the evolution of molecular weight by GPC traces during the embodiment of the polymerization process of FIG. 4.

One of the limitations of ATRP is that unlike RAFT the reactions have not been able to prepare very high molecular weight copolymers. One possible explanation is that the radicals could interact with the catalyst complex. E.g. the polystyryl radical can be oxidized to a cation by the Cu(II) species and this may be the main side reaction limiting formation of well-defined high molecular weight polystyrenes by ATRP. However, since the continuous activation process can now be run with very small amounts of Cu(II) species the synthesis of high molecular weight polystyrenes are now much more feasible. FIGS. 4 and 5 demonstrate application of ARGET to formation of higher molecular weight polystyrenes. The amount of Cu was reduced down to 10 ppm with preservation of an appropriate level of control (Table 4, entry WJ-03-15). FIG. 5 illustrates some tailing towards lower molecular weight due to termination reactions, but overall control is still excellent.

When a stoichiometric amount of $Me_6TREN$ to Cu was used, less control was observed. Only low molecular weight oligomers were formed (Table 5, entry WJ-03-06). This suggests changing of polymerization mechanisms from radical to cationic. It is possible that formed stronger Lewis acids $SnCl_2$ $(EH)_2$ can catalyze a cationic process, it is also possible that they can undergo metathesis and generate even stronger Lewis acids; $SnCl_4$ or $SnCl_3EH$. These

TABLE 5

Experimental conditions and properties of PS prepared by ARGET ATRP - effect of ligand.[a]

| Entry | Molar ratios | | | | | Cu [ppm] | Time (min) | Conv. (%) | $M_{n,theo}$[b] | $M_{n,GPC}$ | $M_w/M_n$ |
|---|---|---|---|---|---|---|---|---|---|---|---|
| | St | EtBrIB | $CuCl_2$ | $Me_6TREN$ | $Sn(EH)_2$ | | | | | | |
| WJ-03-08 | 200 | 1 | 0.01 | 0.1 | 0.1 | 50 | 460 | 59 | 12300 | 12700 | 1.11 |
| WJ-03-07 | 200 | 1 | 0.01 | 0.03 | 0.1 | 50 | 460 | 34 | 7100 | 6900 | 1.20 |
| WJ-03-06 | 200 | 1 | 0.01 | 0.01 | 0.1 | 50 | 1000 | 44 | 9200 | oligomers | — |

[a] $[St]_0 = 5.82$ M; T = 110° C., in anisole (0.5 volume equivalent vs. monomer);
[b] $M_{n,theo} = ([M]_0/[EtBrIB]_0) \times$ conversion.
[a] $[St]_0 = 5.82$ M; T = 110° C., in anisole (0.5 volume equivalent vs. monomer);
[b] $[St]_0 = 5.82$ M; T = 60° C., in anisole (0.5 volume equivalent vs. monomer);
[c] $[nBA]_0 = 5.88$ M; T = 60° C., in anisole (0.2 volume equivalent vs. monomer);
[d] $[St]_0 = 5.82$ M; T = 110° C., in anisole (0.5 volume equivalent vs. monomer), reaction under air;
[e] $M_{n,theo} = ([M]_0/[EtBrIB]_0) \times$ conversion.

Lewis acids may also destroy the active Cu/Me$_6$TREN species by direct complexation with the ligand. In certain embodiments, a small excess of ligand, or ligand surrogate, should be used.

The kinetic plot from the polymerization of styrene with 15 ppm of copper targeting DP=200 at two different temperatures 60 and 110° C. (Table 6, entry WJ-03-27 and WJ-03-46) indicates that the rate of polymerization is faster at 110° C., although both reactions are well controlled.

A successful polymerization of n-butyl acrylate was also performed in the presence of 50 ppm of copper. As expected, polymerization of the acrylate was much faster than for styrene at similar conditions (Table 6, entry WJ-03-08 and WJ-03-53).

Cu(I)/Me$_6$TREN complexes are easily oxidized by air. However, the resulting Cu(II) species can be still regenerated to Cu(I) state by the action of a reducing agent, such as Sn(EH)$_2$. Thus, in one experiment (Table 6, entry WJ-03-09 and WJ-03-13) no nitrogen purging was conducted but an excess of Sn(EH)$_2$ was added to the reaction medium. A short induction period was observed but then polymerization started and good control over molecular weight and polydispersities was observed.

The minimal amount of active ATRP catalyst also depends on the particular system, for styrene polymerization the transition metal catalyst may be to a few ppm, significantly lower than in any other reported ATRP process. The examples of ARGET ATRP detailed herein demonstrate a significant improvement over traditional ATRP, since it can be carried out with drastically reduced amount of Cu species and FDA approved Sn(EH)$_2$ or other environmentally sound reducing agents (sugars, ascorbic acid).

Example 4

Development of Initiators for Continuous Activator Regeneration (ICAR) ATRP

In the set of examples described above the catalyst complex was reactivated by addition of a reducing agent however other approaches, closer to present industrial practice for RP, for reactivation of the lower oxidation state transition metal complex have now been shown to also work. The polymerization medium comprises a significantly lower catalyst concentration, for example many times less than the total number of polymer chains formed in the polymerization, in order that

TABLE 6

Experimental conditions and properties of PS and PnBA prepared by ARGET ATRP - effect of monomer, temperature and air.

| Entry | Molar ratios | | | | | Cu [ppm] | Time (min) | Conv. (%) | $M_{n,theo}^e$ | $M_{n,GPC}$ | $M_w/M_n$ |
|---|---|---|---|---|---|---|---|---|---|---|---|
| | M | EtBrIB | CuCl$_2$ | Me$_6$TREN | Sn(EH)$_2$ | | | | | | |
| WJ-03-27$^a$ | 200 | 1 | 0.003 | 0.1 | 0.1 | 15 | 1230 | 76 | 15300 | 17100 | 1.18 |
| WJ-03-46$^b$ | 200 | 1 | 0.003 | 0.1 | 0.1 | 15 | 3150 | 0.24 | 4800 | 4500 | 1.18 |
| WJ-03-08$^a$ | 200 | 1 | 0.01 | 0.1 | 0.1 | 50 | 460 | 59 | 12300 | 12700 | 1.11 |
| WJ-03-53$^c$ | 160 | 1 | 0.0078 | 0.1 | 0.1 | 50 | 370 | 91 | 18100 | 19400 | 1.26 |
| WJ-03-07$^a$ | 200 | 1 | 0.01 | 0.03 | 0.1 | 50 | 460 | 34 | 7100 | 6900 | 1.20 |
| WJ-03-13$^d$ | 200 | 1 | 0.01 | 0.03 | 0.1 | 50 | 1415 | 76 | 15200 | 15900 | 1.28 |
| WJ-03-09$^d$ | 200 | 1 | 0.01 | 0.1 | 0.1 | 50 | 1380 | 75 | 15000 | 16200 | 1.45 |

The amount of transition metal catalyst complex species in ATRP can be reduced down to a few ppm without losing control of polymerization, if an appropriate amount of reducing agent is used to account for oxidation of the catalyst as a result of terminated chains. There are several requirements for an efficient reaction in the presence of a reducing agent:

- The redox process should occur without generation of initiating radicals.
- Reducing agent may also be involved in atom transfer process (this would generate dual catalytic system, e.g. bimetallic catalysis), however, the sufficient amount of quickly deactivation species (i.e., X—Cu(II)) is needed for control. Molecular weight distribution and initial molecular weight, both depend on the ratio of propagation to deactivation rates, according to equations: 2 and 3.
- The position of equilibrium between reducing species and ATRP true catalyst should allow for a sufficient amount of Cu(II) species and sets the overall rate of ATRP.
- The concentration of reducing agent should account for [Cu(II)] sufficient amount of transition metal species to be activated, amount of air or some other radical traps present in the system, and the amount of terminated chains. When Sn(EH)$_2$ species are used as the reducing agent this concentration is ~50 ppm but depends on the particular reaction conditions.

the reaction can continue the radical initiator has to continuously generate radicals at a rate comparable to radicals consumed by termination reactions. The radicals can be formed by any reaction mechanisms. Indeed, as shown below, in the case of styrene polymerization this is the mechanism that actually operates, but it was analysis of the above results that led to this unexpected recognition.

From all previous data on ARGET ATRP of styrene it could be observed, that the overall rate of polymerization did not change with varying amounts of Cu, ligand or Sn(EH)$_2$. Due to the high temperature (110° C.), which was used in all previous experiments, this indicated that the rate of polymerization was controlled by thermal production of radicals from the monomer. [Odian, "Principles of Polymerization" 4$^{th}$ edition, page 226] The rate of polymerization is controlled by thermal initiation of styrene. Styrene based radicals can form independently to reduce Cu(II) to Cu(I) and regenerate the active catalyst. Therefore polymerizations were conducted with a low concentration of catalyst without the presence of a reducing agent. The regeneration of Cu(I) activator species, which can be lost due to termination reactions (e.g. radical coupling), was performed by two different methods:

generation of radicals by thermal initiation from styrene monomer (polymerization at 110° C.)

generation of radicals by thermal decomposition of AIBN (polymerization at 60° C.)

In both cases, radicals are produced slowly throughout the reaction and are able to continuously reduce Cu(II) to Cu(I), so that the activator complex was continuously regenerated. The conditions employed for these initial reactions and the results are presented in Tables 5-6. In first experiments (WJ-03-30, 31, 32), styrene was polymerized with 3 ppm of added Cu species and radicals were produced by thermal initiation of styrene. The results show that the reactions were not controlled and a high molecular weight product with high PDI was obtained. The relatively uncontrolled character of the polymerization could be due to too low a concentration of ligand, which allows the copper to be complexed by monomer leading to loss of active metal catalyst complex (Cu(I)/ligand), as the ligand was involved in side reactions. Consequently, in next two reactions (WJ-03-36, 37) amount of ligand was increased. Styrene was polymerized in the presence of 50 and 5 ppm of Cu species respectively. $CuCl_2$/$Me_6TREN$ was used as catalyst complex and ratio of In/Cu/ligand was 1/0.01/0.1 and 1/0.001/0.1. The results showed that the polymerization in the presence of 50 ppm Cu species was well controlled, molecular weights were close to theoretical values and low PDI (1.17) was observed. In reaction WJ-03-37 with only 5 ppm of Cu species much higher PDI (1.63) was observed and molecular weights were higher than the theoretical values. This suggests that the concentration of radicals was initially too high and all of Cu(II) species were reduced to Cu(I). This leads to higher molecular weights since the amount of deactivator Cu(II) is too small to efficiently deactivate the growing polymer chains. In order too obtain controlled ATRP one should increase the effective amount of Cu(II) species in the system. This can be accomplished either by increasing the initial amount of Cu(II) species in the system or by decreasing the temperature. At lower temperature less Cu(II) species will be reduced to Cu(I) since concentration of radicals produced in the thermal process will be lower.

In the next series of experiments (See Table 8) styrene was polymerized with 15 ppm of Cu species present in the reaction and radicals were produced by thermal decomposition of AIBN. In the first reactions (WJ-03-33, 34, 35) styrene was polymerized at 60° C. in the presence of AIBN and/or reducing agent $Sn(EH)_2$. In experiment WJ-03-33 AIBN and $Sn(EH)_2$ were used together. The polymerization was slow but low PDI (<1.4) was observed and MW were close to calculated values. The next reaction, WJ-03-34, was performed only in the presence of $Sn(EH)_2$. The results shows that polymerization was relatively well controlled, molecular weigh is were close to theoretical values and low PDI (1.30) was observed but the rate of the reaction was slightly slower than the previous one when AIBN and $Sn(EH)_2$ were used together. In reaction WJ-03-35 styrene was polymerized in the presence of AIBN without any added reducing agent. The polymerization was initially controlled but after 20 h a bimodal distribution of MW could be observed. This could be due to loss of active complex from the system due to complexation of the ligand with the monomer, which is present in large excess compared to the transition metal.

In the following set of experiments a higher amount of ligand was used and the amount of AIBN added to the reaction was varied to increase the rate of polymerization. $CuCl_2$/$Me_6TREN$ was used as catalyst complex and the ratio of In/Cu/ligand was 1/0.003/0.1 while the concentration of AIBN was varied from 0.01 to 0.1 equivalents vs. initiator. In all reactions a monomodal distribution of MW was observed. Molecular weights were close to theoretical values, but slightly higher PDIs (>1.4) were observed. Increasing the concentration of added AIBN from 0.01 to 0.1 equivalents vs. ATRP initiator resulted in an increased rate of polymerization but reactions were still very slow.

Example 5

Polymerization of Styrene in the Presence of AIBN

ATRP with low catalyst concentration was performed without the presence of added reducing agent. The regeneration of Cu(I) species, which can be lost due to termination reactions (e.g. radical coupling), was performed by generation of radicals by thermal decomposition of AIBN (polymerization at 60° C.). In this case, radicals are produced slowly through whole reaction time and are able to reduce Cu(II) to Cu(I), so that active complex can be regenerated. The conditions and results for all the reactions are presented in Table 9.

TABLE 8

Conditions and results for ATRP of St initiated by AIBN at low catalyst concentration[a]

| Label | EtBrIB | Cu [ppm] | $CuCl_2$ | $Me_6TREN$ | AIBN | $Sn(EH)_2$ | Time (min) | Conv. (%) | $M_{n,theo}$[b] | $M_{n,GPC}$ | $M_w/M_n$ |
|---|---|---|---|---|---|---|---|---|---|---|---|
| WJ-03-27 | 1 | 15 | 0.003 | 0.1 | — | 0.1 | 1230 | 0.76 | 15250 | 17100 | 1.18 |
| WJ-03-33 | 1 | 15 | 0.003 | 0.02 | 0.01 | 0.02 | 4635 | 0.19 | 3720 | 4100 | 1.36 |
| WJ-03-34 | 1 | 15 | 0.003 | 0.02 | — | 0.02 | 4600 | 0.12 | 2360 | 2590 | 1.30 |
| WJ-03-35 | 1 | 15 | 0.003 | 0.003 | 0.01 | — | 4570 | 0.19 | 3560 | 37200 | 1.40 |
| WJ-03-38 | 1 | 15 | 0.003 | 0.1 | 0.01 | — | 7200 | 0.26 | 5200 | 3800 | 1.51 |
| WJ-03-39 | 1 | 15 | 0.003 | 0.1 | 0.05 | — | 7200 | 0.28 | 5500 | 5100 | 1.44 |
| WJ-03-40 | 1 | 15 | 0.003 | 0.1 | 0.1 | — | 7200 | 0.56 | 11200 | 9800 | 1.38 |

[a] $[St]_0/[EtBrIB]_0 = 200$; $[St]_0 = 5.82$ M; T = 60° C., in anisole (0.5 volume equivalent vs. monomer);
[b] $M_{n,theo} = ([M]_0/[EtBrIB]_0) \times$ conversion

TABLE 9

Conditions and results for ATRP of St initiated by AIBN at low catalyst concentration

| Label | EtBrIB | Cu [ppm] | $CuCl_2$ | $Me_6TREN$ | AIBN | $Sn(EH)_2$ | Time (min) | Conv. (%) | $M_{n,theo}$[b] | $M_{n,GPC}$ | $M_w/M_n$ |
|---|---|---|---|---|---|---|---|---|---|---|---|
| WJ-03-40[a] | 1 | 15 | 0.003 | 0.1 | 0.1 | — | 7200 | 0.56 | 11200 | 9800 | 1.38 |
| WJ-03-60 | 1 | 50 | 0.01 CuCl | 0.1 | 0.1 | — | 2760 | 0.40 | 8000 | 7600 | 1.19 |

TABLE 9-continued

Conditions and results for ATRP of St initiated by AIBN at low catalyst concentration

| Label | EtBrIB | Cu [ppm] | CuCl$_2$ | Me$_6$TREN | AIBN | Sn(EH)$_2$ | Time (min) | Conv. (%) | M$_{n,theo}$[b] | M$_{n,GPC}$ | M$_w$/M$_n$ |
|---|---|---|---|---|---|---|---|---|---|---|---|
| WJ-03-61 | 1 | 50 | 0.01 | 0.1 | 0.1 | — | 2760 | 0.41 | 8200 | 7700 | 1.26 |
| WJ-03-62 | 1 | 50 | 0.01 | 0.01 | 0.1 | — | 2760 | 0.44 | 8700 | 7900 | 1.12 |

[a][St]$_0$/[EtBrIB]$_0$ = 200; [St]$_0$ = 5.82 M; T = 60° C., in anisole (0.5 volume equivalent vs. monomer);
[b]M$_{n,theo}$ = ([M]$_0$/[EtBrIB]$_0$) × conversion In the last two experiments in Table 9 (Runs WJ-03-61 and 62) the amount of ligand, Me$_6$TREN, was varied with a constant concentration of 50 ppm of Cu present in the polymerization of styrene. The ratio of In:Cu:ligand in the first and second reactions were 1:0.01:0.01 and 1:0.01:0.1 respectively. In reaction WJ-03-62 no excess of ligand was used while in experiment WJ-03-61 the polymerization of styrene was performed in the presence of 10 fold excess of ligand. The molecular weights were close to theoretical values and low PDI was observed for both runs. This suggests that no excess of ligand is needed since the excess ligand could participate in side reactions and influence the final PDI. This is the contrary to the experience with ARGET ATRP where an excess of ligand may be needed, due to possible complexation with the reducing agent Sn(EH)$_2$ or its products Sn(EH)$_2$Cl$_2$, SnCl$_4$.

In reactions WJ-03-60 polymerization of styrene was performed starting with 50 ppm of the Cu(I) complex formed in the presence of excess ligand. It can be seen that the results from this reaction are slightly improved compared to reaction where Cu(II) was used (WJ-03-61). Molecular weights were close to theoretical values and a lower PDI (<1.20) was observed. There are two possible reasons for this result:

(i) The equilibrium between Cu(I) and Cu(II) species in the system may form faster when Cu(I) species are used, and thus better control of polymerization can be obtained. When starting from Cu(II) species and using AIBN to activate the polymerization (according to Predici) a lot of Cu(I) is generated at the beginning stage of the reaction and high molecular weight polymers are obtained, since there is not enough Cu(II) in the system to deactivate growing chains.

(ii) Cu(I) is more soluble than Cu(II) with Me$_6$TREN ligand, thus during the transfer of active complex from preparation flask to the Schenk flask some of Cu(II) species which are not fully soluble in the transfer medium are lost. Therefore the real value of Cu species in the reaction medium can be different, higher when Cu(I) is used.

Figure 6:
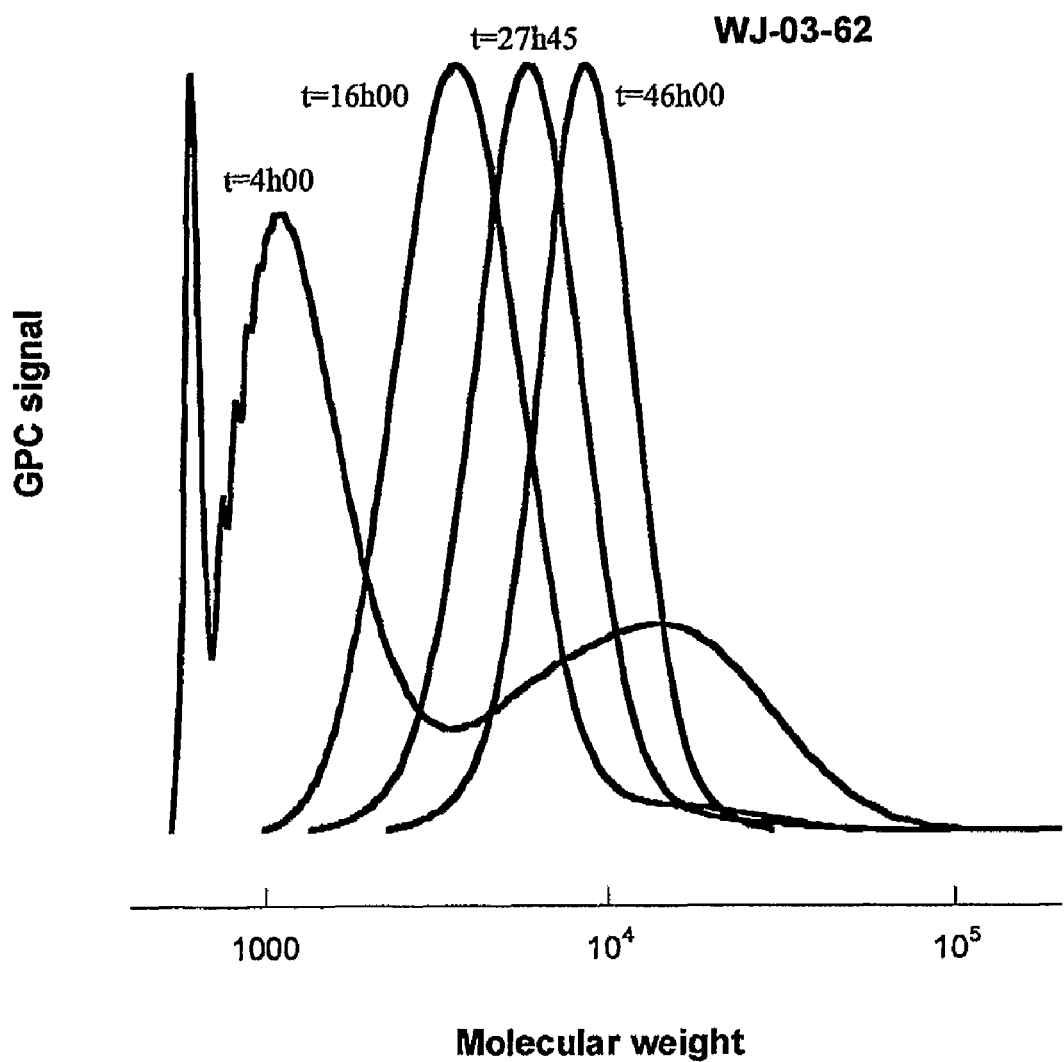
FIG. 6 is a graph of the GPC curves showing the presence of a small amount of terminated polymer chains which were initiated by radicals produced from thermal decomposition of AIBN at beginning of activation procedure before being overwhelmed by the bulk of the polymer prepared by CRP.

All three experiments (WJ-03-60, 61 and 62) bimodal distribution of molecular weight was observed at the earliest stage of the reaction. At low conversion, 3%, a small fraction of high molecular weight polymer was observed. This is probably a product of terminated chains which were initiated by radicals produced from the direct thermal decomposition of AIBN which would indicate that the concentration of radicals at the beginning stage of reaction can be high enough not only to quickly reduce Cu(II) to Cu(I) but also initiate new polymer chains. The fraction of terminated chains is small and disappears into the baseline of later GPC traces over time, due to overlapping with the intense signal from main polymer product; FIG. 6.

The polymerization rates for all three reactions are the same and independent of the amount of copper, Cu(I) or Cu(II) species, used at the beginning of the reaction or the amount of ligand added. This proves that the reaction is thermally controlled by thermal decomposition of AIBN. In embodiments of the polymerization process a sequential or gradual addition of the initiator will overcome the initial excess of radicals leading to lower level of uncontrolled polymerization.

Example 6

Synthesis of a PSt-b-PnBA Block Copolymer by ICAR and ARGET ATRP

A PSt-Br macroinitiator (M$_w$=11000, M$_w$/M$_n$=1.12) (0.5 g, 4.5×10$^{-2}$ mmol), which was prepared by an embodiment of ICAR ATRP, was dissolved in BA monomer (2.80 ml, 19.6 mmol) in a 10 mL Schlenk flask and bubbled with nitrogen for 15 minutes. Next, a solution of CuCl$_2$ (0.13 mg, 1.00×10$^{-3}$ mmol)/Me$_6$TREN (1.32 µl, 5.00×10$^{-3}$ mmol) complex in deoxygenated DMF (0.7 ml) was added. The resulting mixture was stirred for 10 minutes before a purged solution of PhNHNH$_2$ (0.49 µl, 5.00×10$^{-3}$ mmol) in anisole (0.5 ml) was added. An initial sample was taken and the sealed flask was placed in a thermostated oil bath at 60° C. Samples were taken at timed intervals over 48.5 hours and analyzed by GC and GPC (M$_{n, GPC}$=65300, M$_w$/M$_n$=1.19, conversion=82%).

A clean shift in molecular weight indicates successful chain extension of the PS-macroinitiator prepared by ICAR and formation of a block copolymer and thereby confirms the "livingness" of the macroinitiator prepared by an embodiment of ICAR ATRP.

Example 7

Selection of Ligand

Several factors should be considered when attempting to optimize the reaction and select the appropriate conditions ICAR ATRP and AGET ATRP processes which are conducted with low concentrations of transition metal catalysts.

First, control over molecular weight distributions in ATRP is at least in part dependent upon absolute deactivator concentration. The rate constant of deactivation of a given catalyst can be calculated from equation 4. In preferred embodiments of ICAR ATRP and AGET ATRP, the polymerization process may comprise complexes with high values of K$_{ATRP}$ (resulting in sufficiently high concentrations of Cu$^{II}$ in solution) and relatively fast deactivation rates. (i.e. above 10$^{-8}$ or even preferably above 10$^{-7}$; [Tang, W., Tsarevsky, N. V. & Matyjaszewski, K.; *J. Am. Chem. Soc.* 128, 1598-1604.])

Second, in preferred embodiments of ICAR ATRP and AGET ATRP, the polymerization process may comprise catalyst that does not dissociate appreciably under the polymerization conditions. The dissociation problem may be compounded by competitive complexation between the monomer and the ligand to the metal, as the monomer is present in very large excess compared to the catalyst in these reactions.

Third, at very low concentrations of transition metal complex employed in ICAR ATRP, it was not immediately clear whether radical concentration, and consequently rate of polymerization, would be governed by $K_{ATRP}$ (as in normal ATRP) or by the rate of new radical generation (as in RAFT).

In the initial runs listed in Table 10, four ATRP catalysts with a broad range of $K_{ATRP}$ values were selected to exemplify the scope of embodiments of the ICAR ATRP process. These included the $CuCl_2$ complexes of tris[2-(dimethylamino)ethyl]amine ($Me_6TREN$), tris[(2-pyridyl)methyl]amine (TPMA), N,N,N',N'',N''-pentamethyldiethylenetriamine (PMDETA), and 4,4'-di-(5-nonyl)-2,2'-dipyridyl (dNbpy). ICAR ATRP of St was first conducted at low temperature (60° C.) where organic radicals were produced solely by the slow decomposition of azobisisobutyronitrile (AIBN) (0.1 eq vs. ethyl 2-bromoisobutyrate (EtBrIB) initiator) in the presence of 50 ppm of $CuCl_2/L$ complexes (entries 1-4, Table 10). Interestingly, rates of polymerization differ by less than a factor of two among reactions catalyzed by $CuCl_2/L$ complexes of $Me_6TREN$, TPMA, PMDETA, and dNbpy. This was initially surprising given that values of $K_{ATRP}$, which govern radical concentration and the rate of polymerization under normal and SR&NI ATRP conditions, for these four complexes differ by more than four orders of magnitude in a "standard" ATRP.

trolled, since initiation efficiency is high, and consequently terminal functionality is present in the majority of polymer chains. The broader PDI is a consequence of slower rate of deactivation. The polymers can be further chain extended and/or functionalized. The materials are not "dead" nor were they prepared in a totally uncontrolled reaction but remain "living" and will display different rheology and perhaps even different physical properties, particularly for block copolymers with segment(s) displaying broader PDI.

Figure 7:
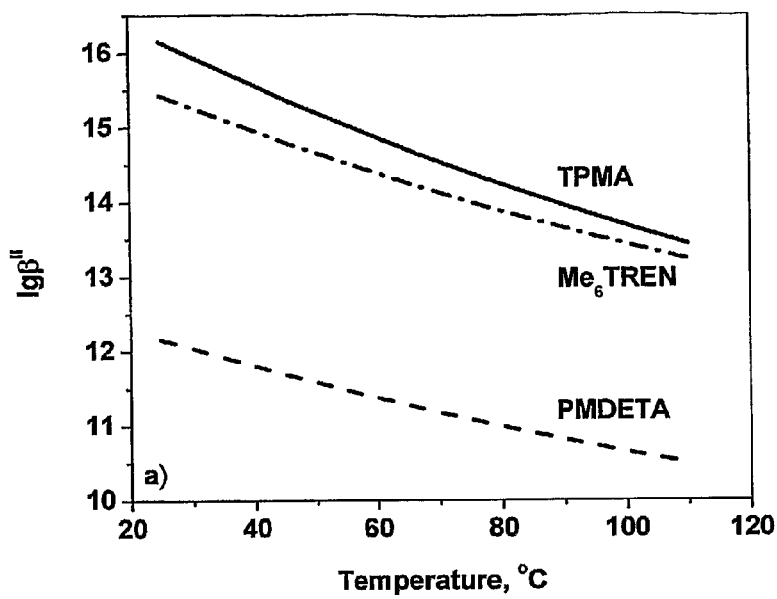
FIG. 7 is a graph of showing the temperature dependence of the conditional stability constant of Cu$^{II}$L ATRP catalysts with various ligands including TPMA, Me$_6$TREN, and PMDETA.

Such observations concerning attainable control can also be rationalized based on the stability of these complexes towards dissociation at high dilution and high temperature. The stability of $Cu^{II}$ complexes of PMDETA, $Me_6TREN$, and TPMA in aqueous media over a range of temperatures are illustrated in FIG. 7 and can be used as a general guide for ligand selection in these systems. [Paoletti, P. & Ciampolini, M. (1967) *Inorg. Chem.* 6, 64; Anderegg, G., Hubmann, E., Podder, N. G. & Wenk, F. (1977) *Helv. Chim. Acta* 60, 123.] These stability constants suggest that such a significant degree of dissociation of the CuCl and $CuCl_2$/PMDETA complexes would ultimately result in a lower absolute value of deactivator concentration, helping to explain the observed poor control over $M_w/M_n$ in this system (entry 3, Table 10). Conversely polymerizations mediated by $CuCl_2/Me_6TREN$ and $CuCl_2$/TPMA were very well controlled in terms of molecular weight distribution ($M_w/M_n$=1.1). The observed molecular weights were only slightly lower than theoretical values. This lower than theoretical molecular weight is a

TABLE 10

ICAR ATRP of Styrene

| Entry | Temp. (° C.) | Monomer/ Initiator/Cu | [Cu] ppm | Ligand/ Ratio to Cu | AIBN/ Initiator | Time (min) | Conv. (%) | $M_{n,theo}$ | $M_{n,GPC}$ | $M_w/M_n$ |
|---|---|---|---|---|---|---|---|---|---|---|
| 1 | 60 | 200 St/1/0.01 | 50 | $Me_6TREN/1$ | 0.1 | 2760 | 44 | 8700 | 7900 | 1.12 |
| 2 | 60 | 200 St/1/0.01 | 50 | TPMA/1 | 0.1 | 2880 | 39 | 7800 | 6800 | 1.09 |
| 3 | 60 | 200 St/1/0.01 | 50 | PMDETA/1 | 0.1 | 2880 | 29 | 5600 | 4500 | 1.62 |
| 4 | 60 | 200 St/1/0.01 | 50 | dNbpy/2 | 0.1 | 2940 | 36 | 7200 | 5600 | 1.68 |
| 5 | 70 | 200 St/1/0.01 | 50 | $Me_6TREN/1$ | 0.1 | 2400 | 47 | 9500 | 7600 | 1.11 |
| 6 | 70 | 200 St/1/0.01 | 50 | $Me_6TREN/1$ | 0.2 | 2500 | 60 | 11,900 | 10,000 | 1.15 |
| 7 | 70 | 200 St/1/0.01 | 50 | $Me_6TREN/1$ | 0.4 | 1140 | 66 | 13,200 | 10,100 | 1.22 |
| 8 | 110 | 200 St/1/0.01 | 50 | $Me_6TREN/10$ | — | 1775 | 65 | 12,900 | 11,000 | 1.25 |
| 9 | 110 | 200 St/1/0.01 | 50 | TPMA/10 | — | 1930 | 49 | 9800 | 9600 | 1.13 |
| 10 | 110 | 200 St/1/0.002 | 10 | TPMA/50 | — | 1720 | 42 | 8400 | 7600 | 1.38 |
| 11 | 110 | 200 St/1/0.0002 | 1 | TPMA/500 | — | 1700 | 55 | 11,000 | 8400 | 1.72 |

$[St]_0/[EtBrIB]_0$ = 200; $[St]_0$ = 5.82 M; 50% anisole by volume.

While polymerizations mediated by $CuCl_2/Me_6TREN$ and $CuCl_2$/TPMA were very well controlled in terms of molecular weight and $M_w/M_n$ (entries 1 & 2, Table 10), control over $M_w/M_n$ was significantly poorer in the polymerization mediated by $CuCl_2$/PMDETA and $CuCl_2$/dNbpy (entries 3 & 4). T is behavior is consistent with the fact that these two complexes have the lowest of the four values of $K_{ATRP}$.

An experiment conducted later with an even less active ATRP catalyst complex, N-(n-octyl)-2-pyridylmethanimine, frequently used for the bulk polymerization of more active methacrylate monomers, [Hovestad, N. J.; et. al.: *Macromolecules* 2000, 33, 4048-4052.] with a molar ratio of reagents: St:I:Cu:L:AIBN=200:1:0.01:0.02:0.1 was even less controlled, especially at the beginning stage of reaction, resulting in even higher PDI (1.9) even though, as with PMDETA and dNbpy, absolute molecular weight control quite was good ($M_{n,theo}$ 8,000; $M_{n,GPC}$ 6900).

Figure 8:
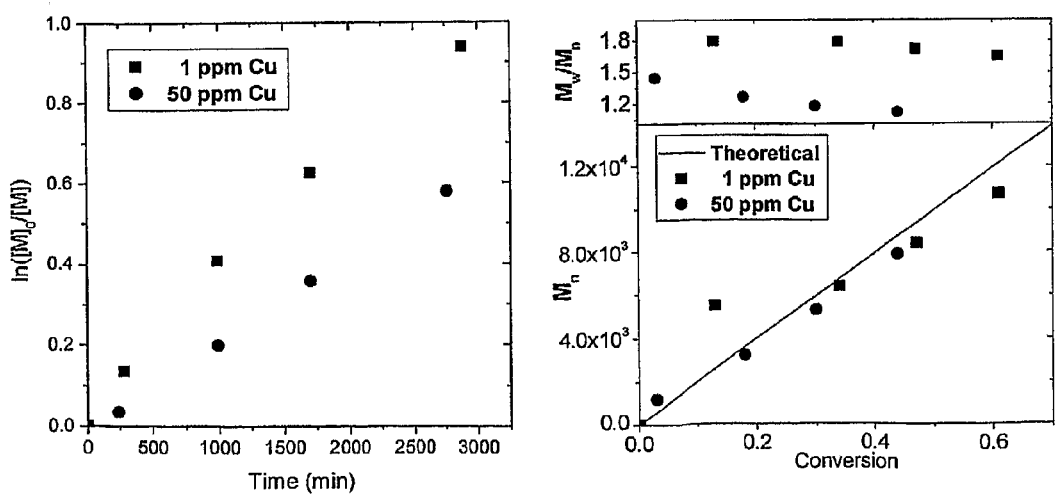
FIG. 8 is graphs of the kinetic data and molecular weight and M$_w$/M$_n$ data as a function of conversion in an embodiment of ICAR ATRP process comprising styrene with 50 ppm and 1 ppm of Cu and the following reaction conditions: St/EtBrIB/CuCl$_2$/Me$_6$TREN/AIBN=200/1/0.01/0.01/0.1; St/EtBrIB/CuCl$_2$/TPMA/AIBN=200/1/0.0002/0.1/0.1 [St]$_0$=5.82 M, 60° C., 50% anisole by volume (entries 1 & 10, Table 4)

This would indicate that values for $K_{ATRP}$ directly influence molecular weight distribution and all reactions are conlikely result of the constant generation of new chains throughout the polymerization inherent in this ICAR ATRP process. Representative examples of the evolution of molecular weight with conversion and the linear first order kinetics obtained in ICAR under these conditions are shown in FIG. 8.

The rates of polymerization differ by less than a factor of two among reactions catalyzed by $CuCl_2$ complexes of $Me_6TREN$, TPMA, and PMDETA (entries 1-3, Table 10), suggesting $K_{ATRP}$ may not play a significant role in determining polymerization rate. However, control over molecular weight distribution was significantly lower in the polymerization mediated by $CuCl_2$/PMDETA. This behavior can be rationalized based on the stability of these complexes towards dissociation at high dilution. The fraction of non-dissociated Cu complex can be calculated from equation (5) knowing the stability constant ($\beta^j$) and total concentration of the complex ($[Cu^j/L]_0$, where j is the Cu oxidation state and L is the ligand).

$$\frac{[Cu^j/L]}{[Cu^j/L]_0} = 1 - \frac{\sqrt{1+4\beta^j[Cu^j/L]_0} - 1}{2\beta^j[Cu^j/L]_0} \quad (5)$$

According to the above dependence, for 90% of the catalyst to remain in solution at a total concentration of $10^{-6}$ M (the present lower limit for ICAR or ARGET), the catalyst should have a stability constant larger than $10^8$. This should be true for both the $Cu^I$ and $Cu^{II}$ states of the catalyst. From this perspective, ligands such as PMDETA displaying a value of $\beta^j < 10^8$ at room temperature [Navon, N.; et al; *Inorg. Chem.* 1999, 38, 3484] are not suitable for ICAR or ARGET ATRP if narrow molecular weight distribution is desired. However this can be relaxed if broader molecular weight distribution is acceptable or even desired for certain applications.

The stability constants for a large number of Cu complexes with various N-based ligands are available in the literature. [Paoletti, P.; Ciampolini, M. *Inorg. Chem.* 1967, 6, 64: Anderegg, G.; Hubmann, E.; Podder, N. G.; Wenk, F. *Helv. Chim. Acta* 1977, 60, 123.] These values have been determined primarily in aqueous solutions at 25° C. but can still be used as a general guide for ligand selection and all suitable transition metal complexes formed with ligands displaying a $\beta^j > 10^8$ at room temperature are herein incorporated as potentially suitable complexes for ICAR ATRP targeting narrow $M_w/M_n$.

Figure 14:
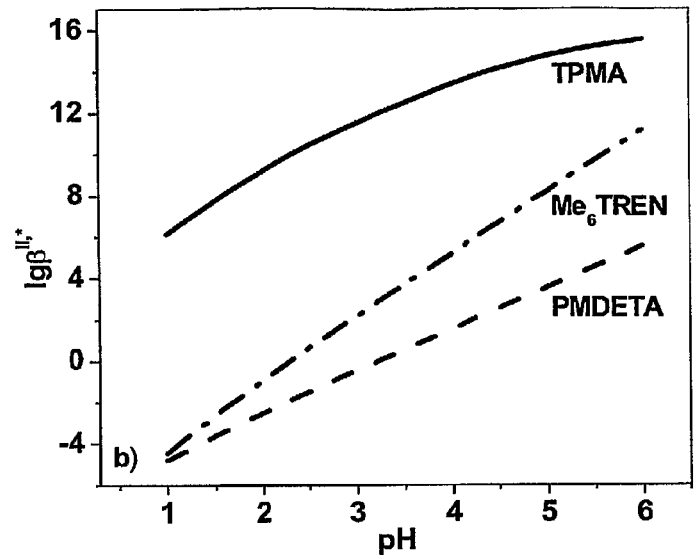
FIG. 14 is a graph of the pH Dependence of the conditional stability constant of $Cu^{II}L$ ATRP catalysts.

Furthermore, polymerizations in this study carried out at high temperatures (60-110° C.) indicate destabilization of the ATRP catalysts at these temperatures and this should also be accounted for. The thermochemistry of polyamine complexes of metal ions, including $Cu^{II}$, has been extensively studied. [Paoletti, P.; Fabbrizzi, L.; Barbucci, R. *Inorg. Chim. Acta Rev.* 1973, 7, 43] The enthalpies of formation of $Cu^{II}$ polyamine complexes are in the range of $-10$ to $-20$ kcal/mol, and a temperature increase from 25 to 110° C. should lead to a decrease in the stability constant by 2-3 orders of magnitude. As discussed in these references the temperature dependence of the stability of the $Cu^{II}$ complexes of PMDETA, Me$_6$TREN, and TPMA is illustrated in FIG. 14 which shows that the stability constant of $Cu^{II}$/PMDETA complexes is considerably lower than that of copper complexes formed with Me$_6$TREN or TPMA, which is consistent with the polymerization results in Table 10. Significant dissociation of the CuCl and CuCl$_2$/PMDETA complexes would ultimately result in a lower absolute value of deactivator concentration in the polymerization medium and consequently poorer control over $M_w/M_n$.

Additionally, the coordination of various polar monomers such as St and (meth)acrylates to the $Cu^I$/PMDETA complex with non-coordinating anions has recently been reported. [Braunecker, W. A.; et. al; *J. Organometal. Chem.* 2005, 690, 916; and *Macromolecules* 2005, 38, 4081.] While this complexation is comparatively weak the high concentration of monomer present in bulk, and even solution polymerization processes especially at low ppm catalyst concentration, result in competitive complexation which could lead to a further destabilization of the catalyst.

Additional experiments and kinetic simulations (vide infra) explore the possibility that:

1) the rate of polymerization and radical concentration under ICAR ATRP conditions are actually controlled by the rate of free radical initiator decomposition and, 2) that the relative concentration of $Cu^I$ and $Cu^{II}$ present in the reaction medium conform accordingly, as dictated by the value for $K_{ATRP}$.

Example 8

Varying Concentration of Free Radical Initiator and Transition Metal

Among the controlled polymerizations conducted at 60° C., that mediated by CuCl$_2$/Me$_6$TREN was (marginally) the fastest; however, it was still rather slow, ~50% conversion in 2 days. In experiments 5, 6 and 7 in Table 10 the temperature was increased to 70° C. and several reactions were performed varying the amount of AIBN versus alkyl halide initiator. All three of these reactions mediated by CuCl$_2$/Me$_6$TREN were well controlled. Increasing the amount of AIBN from 0.1 to 0.4 equivalents resulted in just a slight increase in $M_w/M_n$ (from 1.1 to 1.2), likely due to the higher number of terminated chains resulting from a higher radical concentration produced in the early stages of the reaction. However, the rate of polymerization clearly increased with increasing concentration of free radical initiator.

At higher temperatures (110° C.), where the complexes are more prone to dissociate, a 10 fold excess of ligand compared to Cu was employed to help suppress dissociation. AIBN was not needed at this temperature for the polymerization of styrene as the radical reducing agents, or catalyst activators, were regenerated by thermal initiation of St. In accordance with the relative stabilities of the two complexes the polymerization mediated by CuCl$_2$/TPMA was better controlled than that mediated by CuCl$_2$/Me$_6$TREN (in terms of polydispersity) under these conditions. Therefore, CuCl$_2$/TPMA was employed in an additional series of reactions to investigate the lower limits of catalyst concentration necessary for a controlled reaction. The Cu concentration was decreased from 50 ppm to 10 and then to just 1 ppm (entries 10 and 11, Table 10). While a slight curvature was observed in the first order kinetics of these polymerizations (indicating the radical concentration is not constant throughout the reactions) as expected from equation 3, the decreased amount of Cu resulted in broader molecular weight distributions ($M_w/M_n$~1.4 and 1.7 for 10 and 1 ppm of Cu, respectively). FIG. 8 illustrates the control attainable with 1 ppm of Cu catalyst and compares the result to that obtained with 50 ppm catalyst. When 1 ppm Cu was present molecular weights are slightly higher than theoretical values at very low conversion. However, quite impressively, just 1 ppm of Cu in the presence of excess TPMA was ultimately sufficient to control molecular weight and the terminal functionality in the ICAR ATRP of St although the molecular weight distribution was broader.

Example 9

Polymerization of BA and MMA

ICAR ATRP of MMA was then attempted in the presence of AIBN and 50 ppm Cu. The reaction was initiated by EtBPA in the presence of 0.01 equivalents of CuCl$_2$/Me$_6$TREN at 60° C. The results are reported as in Table 11. Polymerization was not as well controlled as in analogous reactions of St (entry 1, Table 10). However, CuCl$_2$/TPMA proved very efficient in mediating the controlled polymerization of MMA. Observed molecular weights agreed well with theoretical values, linear first order kinetics are observed, and narrow molecular weight distributions were attained ($M_w/M_n$~1.2).

Both CuCl$_2$/Me$_6$TREN and CuCl$_2$/TPMA were employed in the polymerization of BA initiated by EtBrIB. Acceptable polydispersities ($M_w/M_n$~1.4) and good control over molecular weights were attained in both polymerizations (entries 3 & 4, Table 11).

Figure 9:
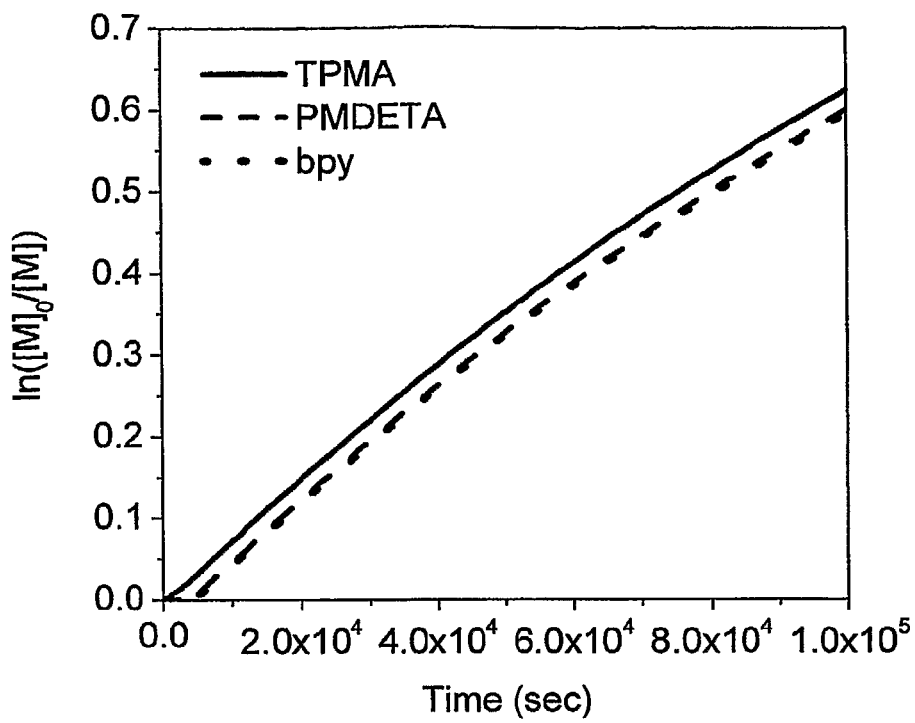
FIG. 9 is a graph of data from a Predici computer simulation of first order kinetic plot for embodiments of ICAR ATRP processes comprising styrene, various ligands including TPMA, PMDETA, or bpy, and 50 ppm of Cu.
Figure 10:
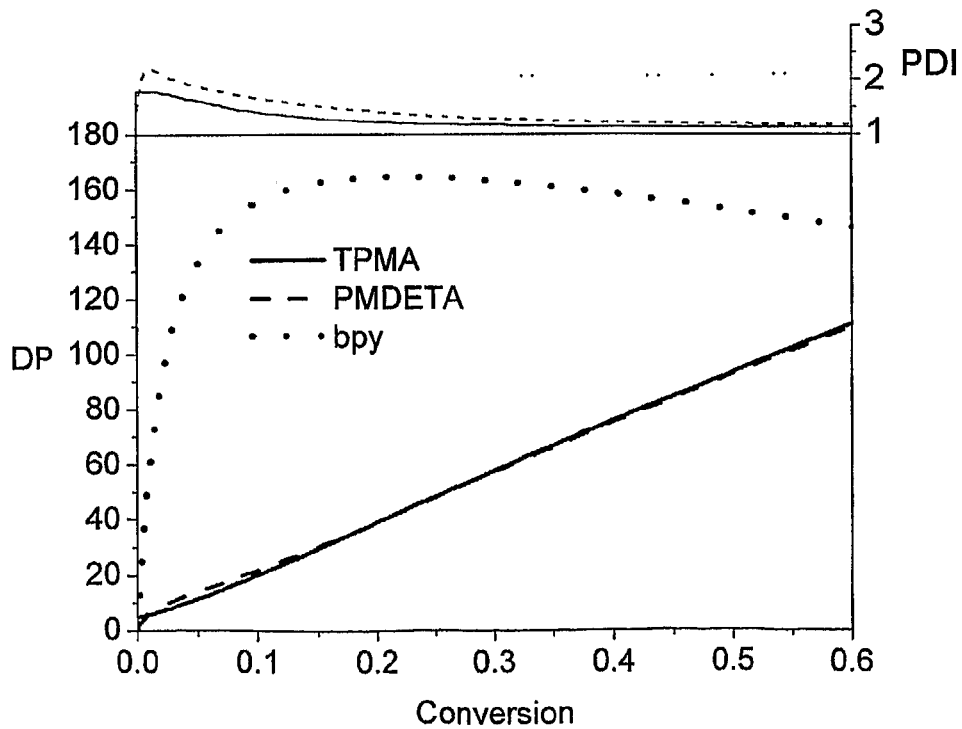
FIG. 10 is a graph of data from a Predici computer simulation of the molecular weight and polydisperisty evolution in embodiments of ICAR ATRP processes comprising styrene, various ligands including TPMA, PMDETA, or bpy, and 50 ppm of Cu.
Figure 11:
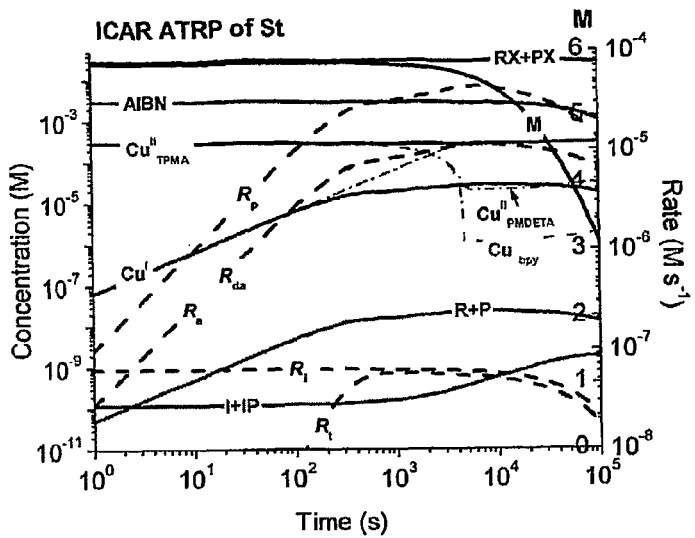
FIG. 11 is graph of the kinetic data from Predici computer simulations for embodiments of ICAR ATRP processes comprising styrene, various ligands including TPMA, PMDETA, or bpy, 50 ppm of Cu, and AIBN as the free radical initiator.

These experiments provided sufficient information to allow the system to be modeled.

ies since they represent a broad range of $K_{ATRP}$ values. FIGS. 9-11 illustrate the results of these simulations for the ICAR polymerization of styrene. According to these simulations, the polymerization rates for all three complexes are essentially the same (FIG. 9), and the first order kinetic plots are

TABLE 11

PBA prepared by ARGET ATRP under various conditions.

| Entry | Monomer/ Initiator | $CuCl_2$ [ppm] | Ligand/ Ratio to Cu | RA/ Ratio to Cu | Time (min) | Conv. | $M_{n,theo}$ | $M_{n,GPC}$ | $M_w/M_n$ |
|---|---|---|---|---|---|---|---|---|---|
| 1 | 200/1/0.01 | 50 | $Me_6TREN/10$ | $PhNHNH_2/10$ | 1098 | 78 | 19,994 | 26,100 | 1.23 |
| 2 | 200/1/0.01 | 50 | $Me_6TREN/3$ | $PhNHNH_2/10$ | 1098 | 33[a] | 8500 | 20,200 | 2.3 |
| 3 | 200/1/0.01 | 50 | TPMA/10 | $PhNHNH_2/10$ | 3780 | 59 | 15,124 | 16,700 | 1.27 |
| 4 | 200/1/0.01 | 50 | TPMA/3 | $PhNHNH_2/10$ | 1300 | 32[a] | 8202 | 8100 | 1.57 |
| 5 | 200/1/0.01 | 50 | PMDETA/10 | $PhNHNH_2/10$ | | | No Rxn | | |
| 6 | 200/1/0.1 | 500 | PMDETA/10 | $PhNHNH_2/10$ | 1230 | 64 | 16,405 | 25,481 | 1.70 |
| 7 | 156/1/0.007 | 50 | $Me_6TREN/10$ | — | 1240 | 86 | 17,100 | 21,600 | 1.83 |
| 8 | 156/1/0.007 | 50 | $Me_6TREN/10$ | $NH_2NH_2/5$ | 1950 | 90 | 17,800 | 20,520 | 1.20 |
| 9 | 156/1/0.007 | 50 | $Me_6TREN/10$ | $NH_2NH_2/10$ | 1940 | 95 | 19,000 | 21,220 | 1.22 |
| 10 | 156/1/0.007 | 50 | $Me_6TREN/10$ | $NH_2NH_2/100$ | 1200 | 96 | 19,100 | 19,970 | 1.26 |
| 11 | 156/1/0.007 | 50 | TPMA/10 | $NH_2NH_2/5$ | 2520 | 41 | 8270 | 8690 | 1.32 |
| 12 | 156/1/0.007 | 50 | TPMA/10 | $NH_2NH_2/10$ | 2520 | 60 | 11,840 | 12,490 | 1.25 |
| 13 | 156/1/0.007 | 50 | TPMA/3 | $NH_2NH_2/5$ | 1200 | 28[a] | 5650 | 5540 | 1.37 |
| 14 | 156/1/0.007 | 50 | TPMA/3 | $NH_2NH_2/10$ | 1200 | 21[a] | 4320 | 4730 | 1.40 |
| 15[b] | 200/1/0.01 | 50 | TPMA/3 | MPO/10 | | | No Rxn | | |
| 16[b] | 200/1/0.01 | 50 | TPMA/3 | MPO/200 | 1920 | 16[a] | 3200 | 4300 | 1.33 |

$[BA]_0$ = 5.88 M; 60° C., ~20% anisole by volume;
$M_{n,theo}$ = $([M]_0/[In]_0)$ × conversion.
[a]Polymerization did not occur past this limited conversion
[b]90° C.

Example 10

Kinetic Modeling

The Predici program (version 6.3.1) was used for all kinetic modeling. It employs an adaptive Rothe method as a numerical strategy for the time discretization. The concentrations of all species can be followed with time. Each actual calculation took 3-5 min to complete on a personal computer. The modeling was conducted in order to obtain a clear picture of the kinetics of ICAR ATRP and determine whether the rate of polymerization in ICAR is governed by $K_{ATRP}$ or by the rate of AIBN decomposition. (AIBN is being used herein as an exemplary free radical initiator and it is believed that any free radical initiator can be used. One would just insert the appropriate rate of decomposition into the formulae.) The multitude of parameters necessary for these simulations and typical rate constants for three $CuBr_2/L$ complexes (with bipyridine (bpy), PMDETA, and TPMA) are shown in Table 12. These three catalysts were chosen for the modeling stud- (nearly) linear. This suggests that the concentration of radicals remain almost constant during the polymerization. The polymerization rate and radical concentration in ICAR ATRP does not appear to depend on the choice of catalyst or value of $K_{ATRP}$.

However, while the polymerization rate does not depend on the choice of catalyst, control over molecular weight and molecular weight distribution are catalyst dependent. As shown in FIG. 10, when TPMA is used as the ligand (meaning a catalyst complex displaying appropriate values of activation and deactivation rate constants were employed in the simulations), polydispersity is low throughout the reaction (<1.5) and approaches 1 at high conversion. Molecular weights increase linearly with conversion and are approximately equal to theoretical values. Similar results are observed with PMDETA, although polydispersity is slightly higher than in the reaction with TPMA. However, polydiperisty and molecular weights are less controlled when $CuBr_2/(bpy)_2$ is employed as the ligand to form the catalyst complex.

TABLE 12

Parameters and reaction conditions employed in Predici simulations of ICAR ATRP of St

| | | Value ($M^{-1} s^{-1}$) | | |
|---|---|---|---|---|
| Step | Rate constant | TPMA | PMDETA | bpy |
| $I_2 \rightarrow I + I$ | $k_{dc}$ | | 1.1E-5 ($s^{-1}$) | |
| $X-Cu^{II} + I \rightarrow Cu^I + IX$ | $k_{a2}$ | | 1E6 | |
| $R-X + Cu^I \leftrightarrow R + X-Cu^{II}$ | $k_{act0}$ | 15 | 0.65 | 0.03 |
| | $k_{deact0}$ | $1.9 \times 10^6$ | $1.1 \times 10^7$ | $8.3 \times 10^6$ |
| $R + R \rightarrow R-R$ | $k_{t0}$ | | $2.5 \times 10^9$ | |
| $I + I \rightarrow I-I$ | | | | |
| $I + R \rightarrow I-R$ | | | | |

TABLE 12-continued

Parameters and reaction conditions employed in Predici simulations of ICAR ATRP of St

| Step | Rate constant | Value (M$^{-1}$ s$^{-1}$) | | |
|---|---|---|---|---|
| | | TPMA | PMDETA | bpy |
| R + M → P(1) | $k_{i1}$ | | 1.35E4 | |
| I + M → IP(1) | $k_{i2}$ | | 4900 | |
| P(s) + M → P(s + 1) | $k_p$ | | 340 | |
| IP(s) + M → IP(s + 1) | | | | |
| PX(s) + Cu$^I$ → P(s) + X—Cu$^{II}$ | $k_{act}$ | 15 | 0.65 | 0.03 |
| IPX(s) + Cu$^I$ → IP(s) + X—Cu$^{II}$ | | | | |
| P(s) + X–Cu$^{II}$ → PX(s) + Cu$^I$ | $k_{deact}$ | $1.9 \times 10^6$ | $1.1 \times 10^7$ | $8.3 \times 10^6$ |
| IP(s) + X–Cu$^{II}$ → IPX(s) + Cu$^I$ | | | | |
| P(s) + P(r) → D-ATRP(s + r) | $k_{tc}$ | | $1 \times 10^8$ | |
| IP(s) + IP(r) → D-AIBN(s + r) | | | | |
| P(s) + IP(r) → D-cross(s + r) | | | | |
| P(s) + P(r) → D-ATRP(s) + DATRP(r) | $k_{td}$ | | $1 \times 10^7$ | |
| IP(s) + IP(r) → D-AIBN(s) + DAIBN(r) | | | | |
| P(s) + IP(r) → D-cross(s) + Dcross(r) | | | | |

DP = 200, 50 ppm of Cu, [St] = 5.82 M, 60° C.;
I$_2$ = AIBN;
RX = EtBrIB;
M = St. St/EtBrIB/X—Cu$^{II}$/AIBN = 200/1/0.01/0.1;
t$_{50\%}$ = 1.8E5 s
Source of the values of rate constants (60° C.):

$k_{dc}$: the decomposition rate constant for AIBN at 60° C. [Bamford, C. H. & Tipper, C. F. H. (1976) Comprehensive Chemical Kinetics, Vol. 14A: Free Radical Polymerization (American Elsevier, New York).]
$k_{d2}$: the deactivation rate constant for free radical with X—Cu$^{II}$ species, estimated from $k_{deact}$ for ATRP ($10^{-5} \sim 10^{-8}$ M$^{-1}$ s$^{-1}$) [Matyjaszewski, K., Paik, H. -j., Zhou, P. & Diamanti, S. J. (2001) Macromolecules 34, 5125.]
$k_{act0}$, $k_{act}$: the activation rate constant for ATRP, measured at 35° C. and extrapolated to 60° C. [Tang, W., Tsarevsky, N. V. & Matyjaszewski, K. (2006) J. Am. Chem. Soc. 128, 1598-1604.]
$k_{deact0}$, $k_{deact}$: the deactivation rate constant for ATRP, calculated from $k_{act}/K_{ATRP}$ at 35° C. and extrapolated to 60° C. [Tang, W., Tsarevsky, N. V. & Matyjaszewski, K. (2006) J. Am. Chem. Soc. 128, 1598-1604.]
$k_{t0}$: the termination rate constant for small molecular radicals. [Fischer, H, et.al. Acc. Chem. Res. (1987) 20, 200-206: and Angew. Chem., Int. Ed. (2001) 40, 1340-1371.
$k_{i1}$ and $k_{i2}$: the rate constant for addition of radicals from EBIB ($k_{i1}$) and AIBN ($k_{i2}$) to styrene. Values are calculated at 60° C. from the frequency factor and activation energy taken from the literature [Fischer, H. & Radom, L. Angew. Chem., Int. Ed. (2001)40, 1340-1371.]
$k_p$: the addition and propagation rate constant. $k_p$ is taken from the literature [Buback, M., et. al.: (1995) Macromol. Chem. Phys. 196, 3267-80.]
$k_{tc}$, $k_{td}$: the termination rate constant for polymeric radicals, the combination rate constant ($k_{tc}$) and disproportion rate constant ($k_{td}$). Values estimated from the literature [Buback, M., et. al.: (2002) Macromol. Chem. Phys. 203, 2570-2582.]

To better illustrate all intricacies of the ICAR ATRP system, kinetic plots were constructed, FIG. 11, where the rates of evolution and concentrations of all species are illustrated on a double-logarithmic scale in the same figure (for CuBr$_2$/TPMA). It can be seen that the dormant species (the initial ATRP initiator, R—X, and the formed polymeric dormant species) remain constant throughout the reaction, which gives rise to a linear increase in molecular weight with monomer conversion, and further indicates that most of the chain end functionality survives throughout the reaction. The ATRP quasi-equilibrium (R$_a$≈R$_{da}$ throughout entire time span) was reached almost immediately (far before polymerization starts) due to the initial presence of the Cu$^{II}$ species. Once this state is reached, the concentration of radicals, Cu$^I$, and Cu$^{II}$ remain essentially constant, and the termination rate (R$_t$) approaches the decomposition rate of AIBN (R$_i$). The radical concentration can be estimated by setting R$_i$=R$_t$, i.e., 2k$_{dc}$[I$_2$]=2k$_t$[R]$_s^2$.

$$[R]_s = \sqrt{\frac{k_{dc}[I_2]}{k_t}} \approx \sqrt{\frac{k_{dc}[I_2]_0}{k_t}}, \quad (7)$$

Equation (7) shows how the radical concentration (and hence, the polymerization rate) under steady state conditions is primarily dependent on the AIBN decomposition rate constant, its concentration, and the radical termination rate constant. Radical concentration should therefore not be governed by the choice of ATRP catalyst, K$_{ATRP}$, or the initial concentration of Cu$^{II}$ species. This further suggests that polymerization rates can be adjusted with the choice of an appropriate free radical initiator. These predictions are in relatively good agreement with experimental observations, where apparent rates of polymerization in CuCl$_2$/Me$_6$TREN, TPMA and PMDETA mediated polymerizations (entries 1, 2, & 3, Table 10) are very similar.

While polymerization rates are controlled by the decomposition rate of the free radical initiator in ICAR ATRP (as they are in RAFT and free radical polymerizations), control over polymer molecular weights and molecular weight distribution are still governed by the ATRP equilibrium reactions. The ratio of polymerization rate to the deactivation rate, i.e., (k$_p$[M])/(k$_{da}$[Cu$^{II}$]), represents the number of monomer units that will add to an actively propagating radical chain before it is deactivated to the dormant state. This provides a qualitative method to estimate how well a given catalyst can control the molecular weight distribution in a polymerization (as will be illustrated below). Since such a small amount of Cu catalyst is employed in ICAR ATRP, catalysts with large values of K$_{ATRP}$ (higher concentration of Cu$^{II}$) and fast deactivation rate constants will minimize this ratio, allowing for more uniform polymer chain growth, i.e. less monomer units added at each activation step, hence ultimately better control. Cu complexes with TPMA have a large value of K$_{ATRP}$ (~7.9× 10$^{-6}$ at 60° C.). While the K$_{ATRP}$ of Cu/PMDETA complex is much lower (~5.9×10⁻⁸ at 60° C.), the deactivation rate constant ($k_{da}$) for Cu/PMDETA is approximately six times larger than that of TPMA, which compensates for the product of $k_{da}[Cu^{II}]$. The Cu catalyst formed with bpy is the least active among the three complexes in this discussion, with $K_{ATRP}$ (~3.6×10⁻⁹) and a relatively small $k_{da}$ (8.3×10⁶ M⁻¹ s⁻¹). The concentration of $Cu^{II}$ species present at quasi-steady state can be estimated from the ATRP equilibrium.

$$K_{ATRP} = \frac{[Cu^{II}][R]}{[Cu^I][RX]} \approx \frac{[Cu^{II}][R]}{([Cu^{II}]_0 - [Cu^I])[RX]_0} \quad (8)$$

and where $[R]_s$ is estimated from equation (7), $$[Cu^{II}] = [Cu^{II}]_0\left(1 - \frac{1}{\left(K_{ATRP}\frac{[RX]_0}{[R]_s} + 1\right)}\right) \quad (9)$$

As calculated from equation (9), and illustrated in FIG. 11, with their respective values of $K_{ATRP}$, 90% of the total concentration of Cu in the quasi-steady state exists in the $Cu^{II}$ oxidation state for complexes with TPMA. This can be compared with just 7% for PMDETA and 0.3% for bpy. The ratios of $(k_p[M])/(k_{da}[Cu^{II}])$ at the quasi-steady state can be calculated from equation (7) and (9) and indicate that approximately 4.0, 9.3, and 230 monomer units will add to a propagating chain every time it is activated by Cu/L complexes formed with TPMA, PMDETA, and bpy, ligands respectively. These values are qualitatively consistent with the attainable control illustrated in FIG. 11 for each system. The experimental value of $M_w/M_n$ for the ICAR polymerization of St mediated by Cu complexed with TPMA is also in good agreement with $M_w/M_n$ shown in FIG. 6. However, in ICAR systems employing PMDETA as the ligand, control is overestimated in FIG. 6 as complex stability is not taken into account in these simulations.

Within this application the concept of Initiators for Continuous Activator Regeneration in ATRP was introduced. ICAR ATRP allows use of 50 ppm or less of Cu catalyst to mediate well-controlled polymerizations of several radically (co)polymerizable monomers providing polymers with $M_w/M_n$<1.2 with this technique. Other monomers disclosed in incorporated references would also work.

The rational for selection of suitable Cu complexing ligands has been discussed in detail, primarily in regards to the value of $K_{ATRP}$ for a given catalyst but also with respect to complex stability at high dilution and at elevated temperatures. For these reasons, it was determined that Me₆TREN and TPMA were more suitable ligands than PMDETA and dNbpy in ICAR ATRP at low Cu catalyst concentrations; however, other ligands meeting the criteria discussed herein would also be expected to work. Indeed this provides a model for examination of potential ligands to predetermine whether they would be suitable for use in New ERA ATRP preparation of materials meeting targeted applications.

Experimental data as well as simulations confirmed that the rate of polymerization in ICAR is governed by the rate of free radical initiator decomposition (as in RAFT) while control is ultimately determined by $K_{ATRP}$ and the rate of deactivation (as in ATRP).

Halogen Exchange

In further embodiments, ICAR ATRP and ARGET processes comprise a halogen exchange process. Halogen exchange processes comprise switching the radically transferable atom or group in a polymerization process to another radically transferable atom or group. In an example of halogen exchange process, the catalyst employed for the second step of a block polymerization is chlorine based while that employed for the first polymerization step was bromine based. The halogen on the growing chain end was converted to a chlorine soon after the macroinitiator was activated thereby, in the case of bromine to chlorine, slowing down the rate of propagation of the second polymerization to more closely to match the rate of initiation, for example. This cannot be accomplished when the ratio of catalyst to end group on the macroinitiator is significantly less than 1:1 and certainly not when less than 10%.

Two approaches were taken to resolve this issue.

One was a polymerization process comprising adding of a halogen containing salt to interact with the transition metal catalyst complex and converting the radically transferable atom or group, such as the bromine counterion/ligand to a chlorine counterion/ligand, for example. Organic and inorganic salts with the desired halide counterion were examined and a preferred salt is lithium chloride.

Figure 12:
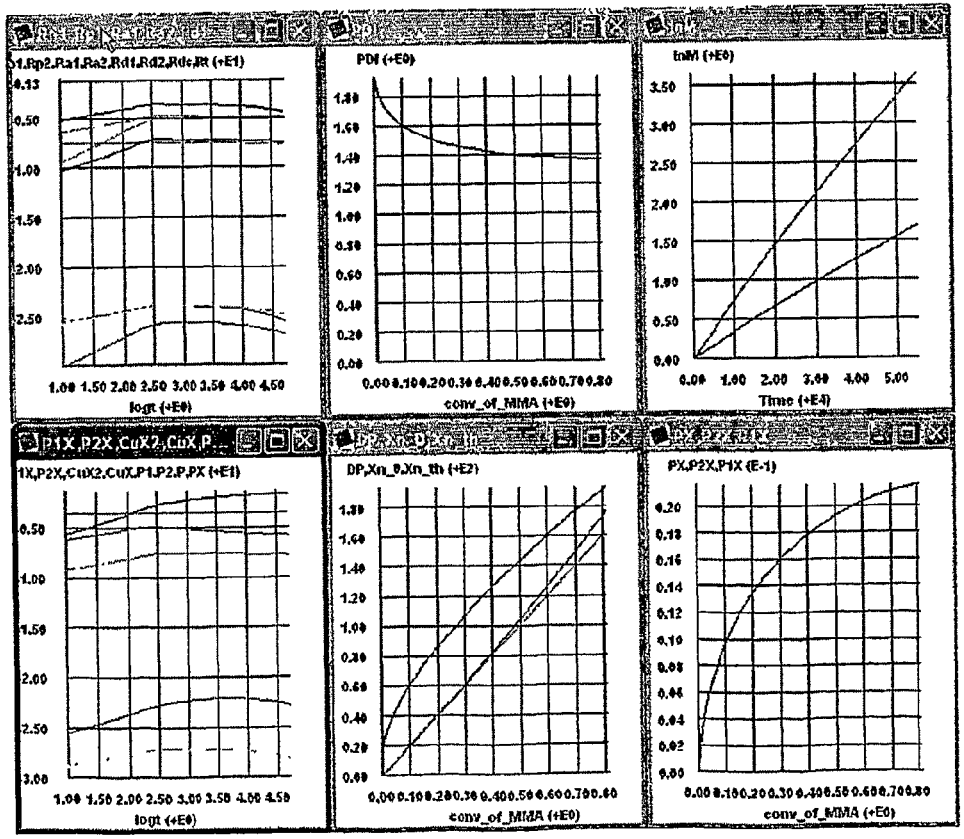
FIG. 12 are graphs of data from Predici computer simulations of the ICAR ATRP homopolymerization process comprising MMA (6E-20 of St) with the following polymerization conditions: Monomer:Initiator:CuII:AIBN=200:1:0.01:0.1, [Monomer]=6 M.
Figure 13:
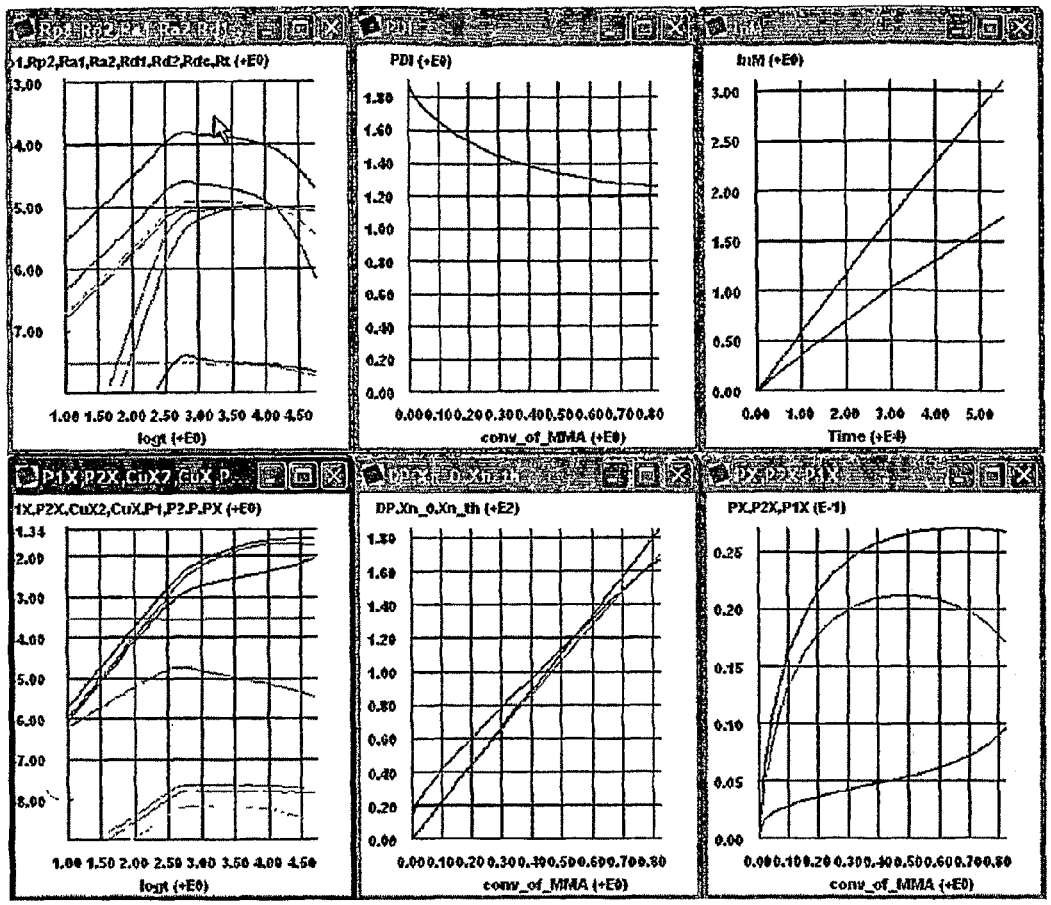
FIG. 13 are graphs of data from Predici computer simulations of the ICAR ATRP homopolymerization process comprising MMA and 20% styrene under the following polymerization conditions: Monomer:Initiator:CuII:AIBN=200:1: 0.01:0.1, [Monomer]=6 M.

Another approach was a copolymerization process for either ICAR ATRP or ARGET ATRP comprising forming the second block with a different monomer, such as, for example, styrene which could be copolymerized with either acrylonitrile or a methacrylate and in the end group on the dormant growing polymer chain predominately comprised a styrene unit then the macromolecule could be controllably reactivated. This system was modeled by Predici and the results can be summarized as follows:

- The $k_{deact}$ (2E6) for MMA in the simulation is 10 times smaller than before. This gives uncontrolled ICAR ATRP of MMA. Also, the $k_{act}$ for MMA is 2 times smaller. (FIG. 12)
- Addition of styrene to the copolymerization process significantly increase the level of control over polymerization as seen in both DP and PDI. The addition of more styrene leads to better results, which is reasonable since polymerization of styrene is more controllable than MMA.
- Kinetically, to have a better control, one would expect the chain end to be preferentially capped with styrene as much as possible. That is to say, more chains that are terminated P2X ("2" refers to St) is preferable. While 5% of St is not enough to provide control when 20% of styrene is added to the copolymerization most of the chain ends (~90%) becomes styrene units. This is good enough for the control on DP but PDI is fairly broad at 1.25. More St is needed if one wants to have lower PDI. (FIG. 8)
- The conclusion is that more styrene gives better control, and a minimum 10% of St is needed to have a better control in such an embodiment.

An embodiment of ARGET ATRP process comprised adding acrylonitrile to the polymerization of acrylate. The following polymerization conditions were performed: PBA-Br:Sty: AN:CuCl₂:Me₆TREN:Sn(EH)₂=1:2000:1300:0.1:1:1 in anisole (1 vol equiv of monomers) at 80° C. $Mn_{NMR}$ 250,000; PDI 1.22.

Example 11

Expanding Range of Exemplified Reducing Agents

Several variables were examined in the ARGET ATRP processes comprising butyl acrylate (Table 11). In the first six experiments, the relative concentration of ligand to Cu is varied to trap evolving acid throughout the BA polymerization. The effect of the concentration of reducing agent on attainable control is investigated in the next eight experiments. The final two experiments employ another reducing agent, 4-methoxyphenol (MPO), which is much less reducing than the hydrazine derivatives, to mediate ARGET reactions. Optimized conditions were then extended to the excess reducing agent ATRP processes of MMA and St.

Mechanism of the Reduction Process and Relevance for Selected Reducing Agents.

Desmarquest studied the mechanism and kinetics of reduction of $CuCl_2$ by hydrazine. [Desmarquest, J. P.; Bloch, O. Electrochim. Acta 1968, 13, 1109-1113]. The final product of oxidation of hydrazine is molecular nitrogen and each step of this multi-step process is accompanied by liberation of acid. The rate-determining step is the reversible transfer of the first electron from $N_2H_4$ to the metal center leading to formation of the radical intermediate $N_2H_3$; it is characterized by rate constants $k_1=8\times10^{-4}$ $M^{-1}$ $s^{-1}$ and $k_{-1}=3\times10^3$ $M^{-1}$ $s^{-1}$. The oxidation of $PhNHNH_2$ leads to the formation of PHN=NH, again with the release of acid. [Kosower, E. M. Acc. Chem. Res. 1971, 4, 193-198.] However the studies of those redox processes are complicated by the fact that both $N_2H_4$ and $PhNHNH_2$ form complexes with the $Cu^{II}$ ions. [Srivastava, A. K.; Varsbney, A. L.; Jain, P. C. J. Inorg. Nucl. Chem. 1980, 42, 47.] Competitive complexation with ligand will also have implications on the stability of the catalyst towards dissociation, and excess ligand may be required in ARGET ATRP at concentrations where it is not required in ICAR ATRP. Retrospectively the role of trialkylamines in activating a catalyst complex disclosed in incorporated patents based on application Ser. No. 09/369,157 may be due to the reducing properties of the amine and would therefore account for the faster reaction producing broader MWD.

The oxidation of MPO and its derivatives by $CuCl_2$ has also been studied. [Matsumoto, M.; Kobayashi, H. Synth. Commun. 1985, 15, 515.] The major product is p-benzoquinone, but a small amount of o-chlorinated phenol is also formed. Although the kinetics of the reduction process have not been studied in detail, it was demonstrated that reduction of $CuCl_2$ by MPO is relatively slow at ambient temperature.

Selection of the Ligand/Ligand Concentration.

The first six entries in Table 11 illustrate the dramatic difference in the level of attainable control over molecular weight distribution of poly(butyl acrylate) depending on the ligand employed (PMDETA, $Me_6TREN$, or TPMA) and the concentration of the ligand relative to Cu. PDI, $(M_w/M_n)$, for example, was much lower at similar conversions in a reaction employing a 3 fold excess of TPMA to 50 ppm of $CuCl_2$ compared to the analogous reaction with $Me_6TREN$ ($M_w/M_n$=1.57 vs. 2.3, entries 2 & 4, Table 11). However, in both of these reactions, monomer conversion was limited to just 35%. No polymerization was observed after the first 24 hours in these reactions activated by a single addition of phenylhydrazine. Similar results (in terms of conversion limited to <35%) were observed for analogous reactions with hydrazine and a 3 fold excess of TPMA to Cu (entries 12 & 13, Table 11). When a larger excess, such as 10 fold, of free ligand was used, polymerization reached much higher conversions. In reactions mediated by 1:10 $CuCl_2/Me_6TREN$ and $CuCl_2/TPMA$, molecular weight distributions were very well controlled ($M_w/M_n$=1.2-1.3, entries 1 & 3, Table 11). Observed molecular weights were also in good agreement with theoretical values, particularly in the case of TPMA.

However, no reaction was observed when a 10 fold excess of PMDETA to 50 ppm Cu was employed. Even when 500 ppm Cu was used with PMDETA, control over molecular weights and molecular weight distribution was worse (entries 5 & 6, Table 11). The behavior of the three complexes can in part be rationalized based on their stability towards dissociation which may be further compounded by the fact that these reducing agents can complex with the catalyst. The observation that, 50 ppm of $CuCl_2/PMDETA$ can mediate an ICAR ATRP while it cannot mediate an ARGET ATRP can be attributed to the stability of the ligand towards protonation in the presence of acid. Addition of a base should overcome this. Therefore, further embodiments of the polymerization process comprise adding a base to the polymerization medium.

Stability was quantitatively determined by both the value of $\beta^j$ and the basicity of the ligand L. In the presence of an acid, the stability of the complex decreases by a factor of $\alpha_L$ (taking into account the amount of protonation or other side reactions of L) to a new value, termed the conditional stability constant $\beta^{j,*}$. If any of the reaction components (monomer, solvent, polymer, reducing agent or the product of its oxidation, designated by A) reacts with the copper ions, the stability of $Cu^j/L$ decreases additionally by a factor of $\alpha_{Cu^j}$ taking into account these side reactions with A (characterized by stability constants $\beta^j_{Cu^j A_m}$), according to eq (5). [Schwarzenbach, G. Die Komplexometrische Titration, 2nd ed.; Enke: Stuttgart, 1956. and Ringbom, A. Complexation in Analytical Chemistry; Interscience: New York, 1963.]

$$\beta^{j,*} = \frac{\beta^j}{\alpha_L \alpha_{Cu^j}} \quad (5)$$

$$\alpha_L = 1 + \frac{[H^+]}{K_{a,r}} + \frac{[H^+]^2}{K_{a,r}K_{a,r-1}} + \ldots + \frac{[H^+]}{K_{a,r}K_{a,r-1} \ldots K_{a,1}}$$

$$\alpha_{Cu^j} = 1 + \beta^j_{Cu^j A}[A] + \beta^j_{Cu^j A_2}[A]^2 + \ldots + \beta^j_{Cu^j A_m}[A]^m$$

In the presence of side reaction, the amount of catalyst actually present in the system can be calculated using equation (6) but with the new conditional stability constant $\beta^{j,*}$ instead of $\beta^j$.

$$\frac{[Cu^j/L]}{[Cu^j/L]_0} = 1 - \frac{\sqrt{1+4\beta^j[Cu^j/L]_0}-1}{2\beta^j[Cu^j/L]_0} \quad (6)$$

FIG. 14 illustrates the pH dependence of the stability of the $Cu^{II}$ complexes of PMDETA, $Me_6TREN$, and TPMA, calculated from equation 5 (knowing the protonation constants which are available in literature) and shows that the complexes of basic ligands are very much destabilized in acidic media, especially when their stability constants in the absence of protonation (FIG. 7) are relatively low (e.g., the $Cu^{II}$ complex of PMDETA). FIG. 7 also illustrates why PMDETA is less applicable for ARGET ATRP than the other ligands. Further the complex of the basic $Me_6TREN$ is markedly more destabilized in acidic media than that of the less basic ligand TPMA. From the point of view of temperature and pH stability, TPMA appears a preferred ligand for ARGET reactions where one of the byproducts of the reducing reaction is an acid.

Varying Concentrations of Reducing Agent and Cu.

The reducing agent will be quickly be consumed if too little is used, and too much might lead to fast and uncontrolled polymerizations or unwanted side reactions with the catalyst Amine based ligands can also act as reducing agents. [Wang, F.; Sayre, L. M. J. Am. Chem. Soc. 1992, 114, 248-255.] The results of BA ARGET ATRP in the presence of varied amounts of $N_2H_4$ reducing agent are also presented Table 11.

Figure 15:
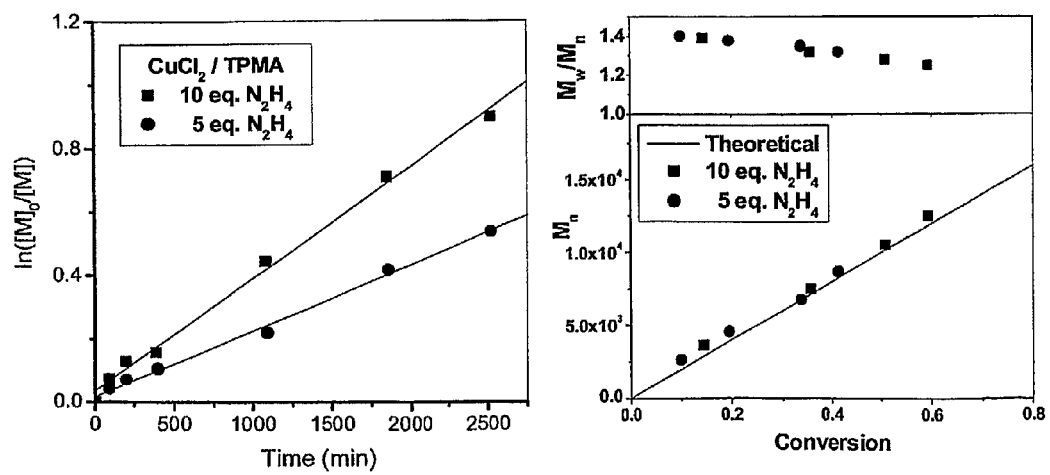
FIG. 15 are graphs of the kinetic data of an embodiment of a $CuCl_2$/TPMA mediated ARGET ATRP of BA, variable $N_2H_4$ reducing agent. $[BA]_0$:$[EtBrIB]_0$:$[CuCl_2]_0$:$[TPMA]_0$: $[N_2H_4]_0$=200:1.28:0.01:0.1:0.05 or 0.1; $[BA]_0$=5.88 M; 60° C., 20% anisole by volume.

In a control experiment, a 10 fold excess of Me$_6$TREN (with four tertiary amine groups capable of reducing CuI) was used in the absence of any other reducing agent (entry 7, Table 11). Polymerization was initiated under these conditions in the presence of alkyl halide, suggesting that Me$_6$TREN can reduce Cu$^{II}$ (M$_w$/M$_n$>1.8 at 86% conversion). Control over M$_w$/M$_n$ is much better in the presence of an added reducing agent, N$_2$H$_4$. First order linear kinetics are also observed when a 10 fold excess of TPMA to Cu is used in the presence of a 5 fold excess of N$_2$H$_4$ in a new ERA ATRP of BA. The rate of polymerization increases with increasing concentration of N$_2$H$_4$, and first order kinetics remain linear (FIG. 15).

Figure 16:
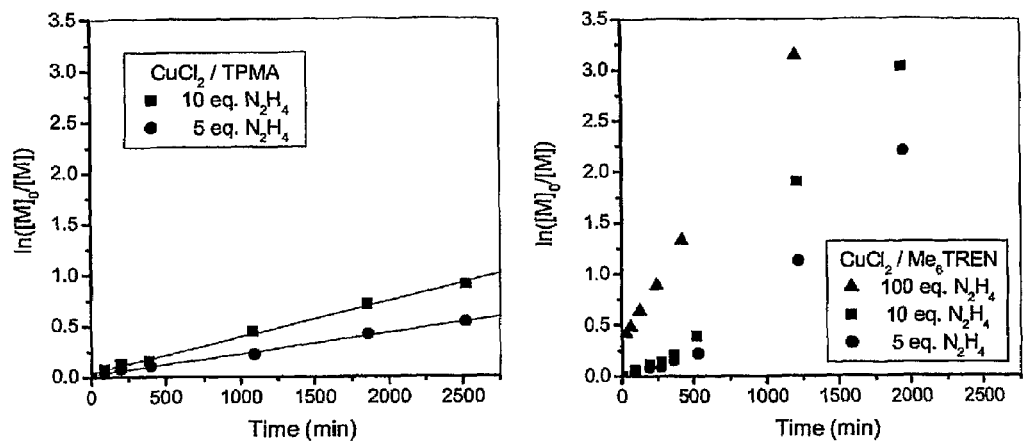
FIG. 16 are graphs of the kinetic data of two embodiments of a polymerization process wherein (Left) $CuCl_2$/TPMA and (Right) $CuCl_2$/Me$_6$TREN are transition metal catalysts in ARGET ATRP of BA with $N_2H_4$ as the reducing agent in different concentrations under the following polymerization conditions [BA]$_0$:[EtBrIB]$_0$:[CuCl$_2$]$_0$:[Ligand]$_0$:[N$_2$H$_4$]$_0$= 200:1:0.01:0.1:0.05, 0.1 or 1.0; [BA]$_0$=5.88 M; 60° C., 20% anisole by volume.

Rates of polymerization similarly increase with increasing concentration of reducing agent when a 10 fold excess of Me$_6$TREN to Cu is employed. However, while good control is achieved over molecular weights and polydispersity, linear first order kinetics are not observed in the presence of a 5, 10, or 100 fold excess of N$_2$H$_4$ (entries 7, 8, & 9, Table 11, FIG. 16). While all five of these polymerizations are well controlled in terms of narrow molecular weight distribution, steadily increasing molecular weights, and initiation efficiencies near 100%, the kinetics of the CuCl$_2$/Me$_6$TREN mediated system are not easily explained. These observations may be a function of the lower relative stability of Cu complexes with Me$_6$TREN vs. TPMA.

Examination of Other Reducing Agents.

In addition to hydrazines, another class of organic reducing agent was investigated with MPO. When 10 equivalents of this reducing agent were employed with CuCl$_2$/TPMA in the ARGET ATRP of BA at 90° C., no polymerization was observed. With the use of 200 equivalents of MPO, 16% conversion was reached in 32 hours (although PDI was relatively low, entries 15 & 16, Table 11). The inefficiency of MPO as a reducing agent (in terms of polymerization rate) compared to hydrazine and phenylhydrazine is fully consistent with the voltammetric data for these organic complexes; literature values for the oxidation waves of phenols are typically one full volt more positive than the oxidation waves of hydrazine derivatives in acetonitrile. [Sawyer, D. T.; Sobkowiak, A.; Roberts, J. J. L.; Eds. *Electrochemistry for Chemists: Second Edition*; Wiley: New York, 1995.]

Figure 17:
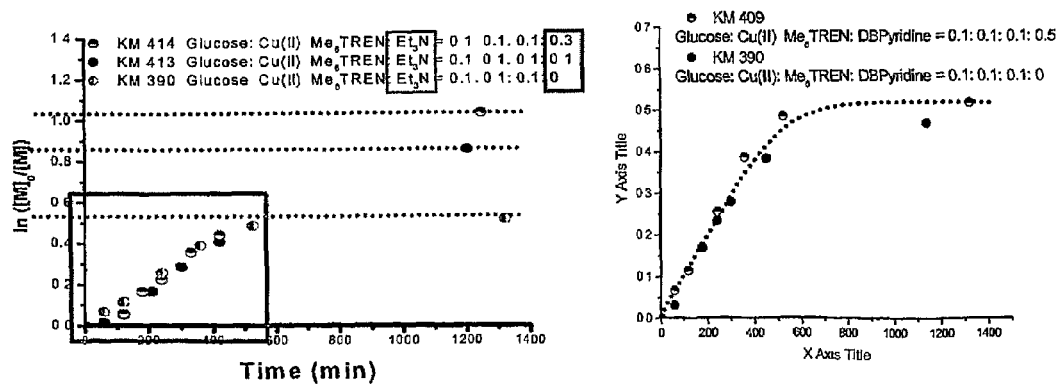
FIG. 17 are semilogarithmic kinetic plots (a) and a graph of the dependence of molecular weights (closed symbols) and molecular weight distributions (open symbols) (b) for ATRP of styrene and acrylonitrile.

Reducing agents such as glucose were also examined. The polymerization process with glucose as the reducing agent stopped after 500 minutes or so. The kinetic plots and the molecular weight curves showed that each time ATRP stopped at 8-9 hours and then thermal initiated conventional radical polymerization of styrene took place, see FIG. 17. Addition of a base can potentially extend the conversion of a polymerization with glucose as a reducing agent by diminishing the protonation of ligand and in fact triethylamine was effective. In addition, increasing the concentration of ligand also resulted in higher conversion. Another base, 1,4-di-tert-butyl-pyridine was probably to weak to affect protonation and the polymerization but the polymerization process still stopped prior to high conversion.

Figure 18:
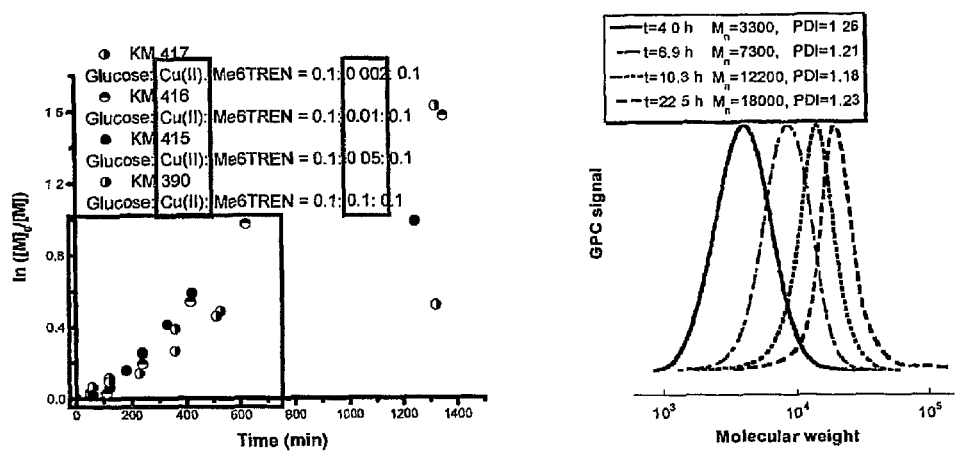
FIG. 18 Evolution of SEC traces for ATRP of styrene and acrylonitrile with Me$_6$TREN as a ligand (Table 7a, entry 1)

In these polymerizations the concentration of Cu$^{II}$ was not at an extremely low level. In fact the stability constant of Me$_6$TREN and Cu is not very high which makes the concentration of ligand very important when [Cu] is low. When the concentration of ligand remained constant, the polymerization rate did not change too much with the change of [Cu$^{II}$]. An ARGET ATRP with styrene as monomer and glucose as reducing agent the concentration of Cu(II) can be reduced to 10 ppm or below and the polymerization was observed to be under control; FIG. 18.

ARGET ATRP Processes Comprising Methyl Methacrylate (MMA) and Styrene.

ARGET ATRP processes comprising MMA initiated by EtBrIB at 60° C. resulted in observed molecular weights higher than theoretical values with M$_w$/M$_n$ about 1.6 (entries 1 & 2, Table 12a). Better control was observed in the ARGET ATRP of MMA employing Sn(EH)$_2$ as a reducing agent. Polymerization of St was initiated by EtBriB at 90° C. (where thermal initiation should not be significant) in the presence of a 10 fold excess of PbNHNH$_2$ and ligand to 50 ppm of Cu. These reactions were fairly well controlled (M$_w$/M$_n$ about 1.3, entries 3 & 4, Table 12a). However, polymerization reached limited conversions when phenylhydrazine was employed as the reducing agent. This could be due to the instability of phenylhydrazine in the presence of air or UV light making it incompatible with strong oxidizing agents.

No styrene polymerization was observed in the presence of hydrazine. To confirm suspicions that the alkyl halide chain end was reacting with hydrazine and consuming the reducing agent in polymerizations of styrene, a model kinetic study was conducted with a low molecular weight analogue of bromine-terminated polystyrene, namely 1-phenylethyl bromide (1-PhEtBr), with both N$_2$H$_4$ and PhNHNH$_2$. The nucleophilic substitution was followed by $^1$H NMR in DMSO-d$_6$, where it was determined that the reaction with N$_2$H$_4$ was markedly faster than with the less basic PhNHNH$_2$. While nucleophilic substitution reactions will be slower in less polar solvents (DMF/monomer) than in DMSO, these results provide a satisfactory explanation for the aforementioned observations. In the presence of N$_2$H$_4$, the alkyl bromide oligomeric initiator reacts very rapidly with the reducing agent and consumes it at an early stage of the reaction. As a result, essentially no polymerization is observed. When PhNHNH$_2$ is employed, the model reaction indicates the substitution reaction is much slower, which is consistent with the observations that polymerization does Occur but gradually slows down and stops before monomer conversion has been completed. While derivatives of hydrazine are obviously not well suited for polymerization of styrene earlier results indicate that Sn(EH)$_2$ or glucose would be a more appropriate reducing agent in St ARGET ATRP indicating that one has to consider all side reactions when selecting the reducing agent. A series of MMA polymerizations were conducted with different initiators in order to determine whether there would be a big difference in degree of control over the polymerization. ARGET ATRP of MMA was controlled when very active initiators like BrPN was employed leading to polymers with low PDI and molecular weights close to theoretical values. (Table 12b)

TABLE 12a

PMMA and PS prepared by ARGET ATRP.

| Entry | Temp. ° C. | Monomer/Initiator/Cu | CuCl$_2$ [ppm] | Ligand/ Ratio to Cu | RA/ Ratio to Cu | Time (min) | Conv. (%) | M$_{n,theo}$ | M$_{n,GPC}$ | M$_w$/M$_n$ |
|---|---|---|---|---|---|---|---|---|---|---|
| 1 | 60 | 200 MMA/1 EtBrIB/0.01 | 50 | Me$_6$TREN/10 | NH$_2$NH$_2$/10 | 1200 | 20 | 4030 | 13,160 | 1.61 |
| 2 | 60 | 200 MMA/1 EtBrIB/0.01 | 50 | Me$_6$TREN/10 | PhNHNH$_2$/10 | 1155 | 66 | 13,140 | 25,480 | 1.60 |
| 3 | 90 | 200 St/1 EtBrIB/0.01 | 50 | TPMA/10 | PhNHNH$_2$/10 | 1620 | 5 | 1000 | 1100 | 1.40 |

TABLE 12a-continued

PMMA and PS prepared by ARGET ATRP.

| Entry | Temp. °C. | Monomer/Initiator/Cu | CuCl$_2$ [ppm] | Ligand/ Ratio to Cu | RA/ Ratio to Cu | Time (min) | Conv. (%) | M$_{n,theo}$ | M$_{n,GPC}$ | M$_w$/M$_n$ |
|---|---|---|---|---|---|---|---|---|---|---|
| 4 | 90 | 200 St/1 EtBrIB/0.01 | 50 | Me$_6$TREN/10 | PhNHNH$_2$/10 | 2820 | 37 | 7400 | 7100 | 1.27 |
| 5 | 90 | 200 St/1 EtBrIB/0.01 | 50 | TPMA/10 | NH$_2$NH$_2$/10 | | | | NoRxn | |

[St]$_0$ = 5.82 M, 50% DMF by volume;
[MMA]$_0$ = 6.23 M; 50% DMF by volume;
M$_{n,theo}$ = ([M]$_0$/[In]$_0$) × conversion TABLE 12b Experimental conditions and properties of PMMA prepared by ARGET ATRP.$^a$

| Label | MMA | In | Cu [ppm] | CuCl$_2$ | ligand | Sn(EH)$_2$ | Time (min) | Conv. (%) | M$_{n,theo}$$^b$ | M$_{n,GPC}$ | M$_w$/M$_n$ |
|---|---|---|---|---|---|---|---|---|---|---|---|
| WJ-05-02 | 200 | 1 PEBr | 50 | 0.01 | 0.06 TPMA | 0.1 | 300 | 0.82 | 16500 | 41500 | 1.35 |
| WJ-05-04 | 200 | 1 PEBr | 50 | 0.01 | 0.06 TPMA | 0.1 | 300 | 0.78 | 16000 | 47800 | 1.31 |
| WJ-04-86 | 200 | 1 EtBP | 50 | 0.01 | 0.06 TPMA | 0.1 | 240 | 0.79 | 15800 | 55700 | 1.33 |
| WJ-04-88 | 200 | 1 BrPN | 50 | 0.01 | 0.06 TPMA | 0.1 | 360 | 0.86 | 17200 | 16600 | 1.18 |

$^a$[MMA]$_0$/[In]$_0$ = 200; [MMA]$_0$ = 5.84 M; T = 90° C., in anisole (0.5 volume equivalent vs. monomer);
$^b$M$_{n,theo}$ = ([M]$_0$/[In]$_0$) × conversion ARGET ATRP Process Comprising MAO as a Reducing Reagent In order to determine if the Cu$^{(II)}$/bpy complex could be reduced by methyl aluminoxane (MAO) all three reagents were added sequentially to a sealed flask, the reaction color changed from green to dark brown indicating MAO reduced Cu$^{(II)}$ (green) to Cu$^{(I)}$ (dark brown). Two ARGET ATRP processes were conducted comprising MAO as reducing agent. The results are shown below.

| Reaction conditions$^{a)}$ | | | | | | |
|---|---|---|---|---|---|---|
| BA/EtBriB/Cu$^{(II)}$/TPMA/MAO | Cu ppm | Time (h) | Conv. (%) | Mn$_{th}$ | Mn$_{GPC}$ | Mw/Mn |
| A) 200/1/1/2/1 | 5000 | 3 | 79 | 20,200 | 21,000 | 1.32 |
| B) 200/1/0.1/0.2/1 | 500 | 5 | 85 | 21,700 | 22,700 | 1.1 |

$^{a)}$BA; butyl acrylate, EtBrIB; ethyl 2-bromoisobutyrate, temperature; 60° C., Anisole was used as an internal standard (10 vol. % of BA)

With the lower level of copper the reaction was better controlled and followed linear increase in conversion with time with final molecular weight close to theoretical values and showed quite narrow (PDI=1.10 in 85% conversion). These results indicate that MAO is a good reducing reagent for ARGET ATRP and should work with reduced amounts of Cu and MAO.

Example 12

Synthesis of PSt-b-PBA Prepared by ICAR and ARGET ATRP

A polymerization process comprising a ratio of reagents [St]$_0$:[EtBrIB]$_0$:[CuCl$_2$]$_0$:[TPMA]$_0$=200:1:0.01:0.01; [St]$_0$=5.82 M; was conducted at 60° C. in 50% anisole by volume providing a macroinitiator of 11100 molecular weight and M$_w$/M$_n$ 1.12. This macroinitiator was then extended with BA using ARGET ATRP, to minimize the production of new chains, employing [BA]$_0$:[PSt]$_0$:[CuCl$_2$]$_0$:[Me$_6$TREN]$_0$:[PhNHNH$_2$]$_0$=400:1:0.02:0.1:0.1; [BA]$_0$=5.88 M; and a reaction temperature of 60° C., in the presence of 20% DMF by volume. Both polymerizations were carried out with 50 ppm of copper catalyst. Chain extension of the polystyrene macroinitiator with BA using ARGET ATRP with 50 ppm of copper proved very efficient and the final block copolymer had M$_{n,GPC}$=65300, M$_{n,th}$=52900, M$_w$/M$_n$=1.19. GPC traces of the polymers were monomodal after each synthetic step and illustrates the utility of these techniques in the production of block copolymers.

Example 13

(Co)Polymerization of Different Monomers and Exemplification of Ability to Prepare High MW Polymers ATRP processes with low concentration of copper catalyst, as low as or lower than 10 ppm, in the polymerization medium may suppress some of the side reactions associated with one or both oxidations states of the transition metal complex and allow higher molecular weight copolymers to be prepared. This example demonstrates this advantage of low catalyst concentrations.

Control Run: Copolymerization of Styrene and Acrylonitrile by ATRP (Amounts Entry 2 in Table 13a).

A Schlenk flask was charged with Me$_6$TREN ligand (7.2 µl, 0.031 mmol) and copper (II) bromide (0.64 mg, 2.87 µmol), then anisole (5.52 ml) was added and the contents stirred. When the system became homogeneous styrene (4.0 ml, 0.0349 mmol), acrylonitrile (1.52 ml, 0.0231 mmol) and ethyl 2-bromoisobutyrate (8.12 µl, 0.0553 mmol) were added to the flask. After three freeze-pump-thaw cycles the flask was filled with nitrogen, then while the mixture was immersed in liquid nitrogen, 4.11 mg (0.0287 mmol) of CuBr was added. The flask was sealed with a glass stopper, evacuated, and back-filled with nitrogen four times. After melting the reaction mixture and warming the contents of the flask to room temperature, the initial sample was taken and the sealed flask was placed in a thermostated oil bath at 80° C. Samples were taken at timed intervals and analyzed by gas chromatography (GC) and gel permeation chromatography (GPC) to follow the progress of the reaction. The polymerization was stopped by opening the flask and exposing the catalyst to air. The overall polydispersity of the polymer for both catalytic systems was low, especially at the moderate stages of the copolymerization, indicating good control over the reaction.

Considerations of ARGET ATRP of SAN: Copolymerization of Styrene and Acrylonitrile by ARGET ATRP (Amounts Appropriate for Entry 4 in Table 13b)

Styrene (4.0 ml, 0.0349 mmol), acrylonitrile (1.52 ml, 0.0231 mmol) and anisole (4.22 ml) were added to a dry Schlenk flask. Then a solution of CuCl$_2$ complex (0.223 mg, 1.66 µmol)/Me$_6$TREN (0.38 µl, 1.66 µmol) in anisole (0.8 ml) and the EBiB (8.12 µl, 0.0533 mmol) initiator were added. The resulting mixture was degassed by four freeze-pump-thaw cycles. After melting the mixture, a purged solution of Sn(EH)$_2$ (8.95 µl, 0.0278 mmol) and Me$_6$TREN (6.36 µl, 0.0278 mmol) in anisole (0.5 ml) was added. An initial sample was taken and the sealed flask was placed in thermostated oil bath at 80° C. Samples were taken at timed intervals and analyzed by gas chromatography (GC) and gel permeation chromatography (GPC) to follow the progress of the reaction. The polymerization was stopped by opening the flask and exposing the catalyst to air.

The azeotropic feed ratio of styrene and acrylonitrile was used for all experiments. In order to examine some of the effects of catalyst complexes on the reaction two catalytic systems were used for the synthesis of SAN by ATRP; copper (I) bromide complexes with dNbpy and Me$_6$TREN respectively. Since Cu$^I$ complexes with dNbpy are approximately 10,000 times less active than Me$_6$TREN based copper complexes a significantly greater amount of dNbpy/Cu$^I$ catalyst was used in Table 13a entry 2 than the concentration of Me$_6$TREN based complex used in entry 1 in order to provide a sufficiently fast polymerization rate. Furthermore in the case of the reaction using Me$_6$TREN as complexing agent 10% of deactivator was added to increase initiator efficiency due to the persistent radical effect.

A preferred ATRP catalyst possesses a low affinity for alkyl radicals and hydrogen atoms on alkyl groups in order to suppress the contribution of side reactions in the transition metal mediated polymerization. In the case of copper-mediated ATRP of styrene loss of terminal halogen functionality by elimination of HX results in loss of chain functionality and consequently loss of control over the reaction. [Matyjaszewski, K.; Davis, K.; Patten, T. E.; Wei, M. *Tetrahedron* 1997, 53, 15321-15329.] Studies with model compounds demonstrated that the elimination reaction was induced by the presence of the copper$^{II}$ complex. This process was even more pronounced in bromine mediated ATRP than in chlorine transfer systems and was more noticeable in the presence of polar compounds. In the case of a SAN copolymerization the highly polar nature of arylonitrile monomer exacerbates this specific side reaction. Another side reaction is due to a one electron oxidation of the polymeric radical by the copper$^{II}$ catalyst to form a carbocation, which then eliminates a proton creating an unsaturated end group. This reaction can occur in hydrocarbon solvents. On the other hand, Lazzari [Lazzari, M.; Chiantore, O.; Mendichi, R.; Lopez-Quintela, M. A. *Macromolecular Chemistry and Physics* 2005, 206, 1382-1388] proposed the reduction of the styryl radical by reaction with a proton source forms anionic intermediates that can result in dead polymer chains. Furthermore, there are also side reactions associated with the acrylonitrile radical that have to be considered. According to previous studies an acrylonitrile radical can easily react with copper$^I$ complex to form a carboanion and copper$^{II}$. The carboanion is a very unstable and undergoes chain transfer termination. Additionally the copper center can coordinated with either the monomer or polymer chain through the cyano group resulting in its deactivation or lowering its effective concentration. Nevertheless on the base of copolymerization parameters calculated by Baumann et al [Baumann, M.; Roland, A.-I.; Schmidt-Naake, G.; Fischer, H. *Macromolecular Materials and Engineering* 2000, 280/281, 1-6] it is the styryl radical which is predominately present in the active state ($r_S$=0.47±0.05, $r_{AN}$=0.03±0.03) and side reactions typical for that radical are thought to be the main reason for chain deactivation. Probably all aforementioned reactions can occur to carious degrees leading to less then ideal living behavior.

Figure 19:
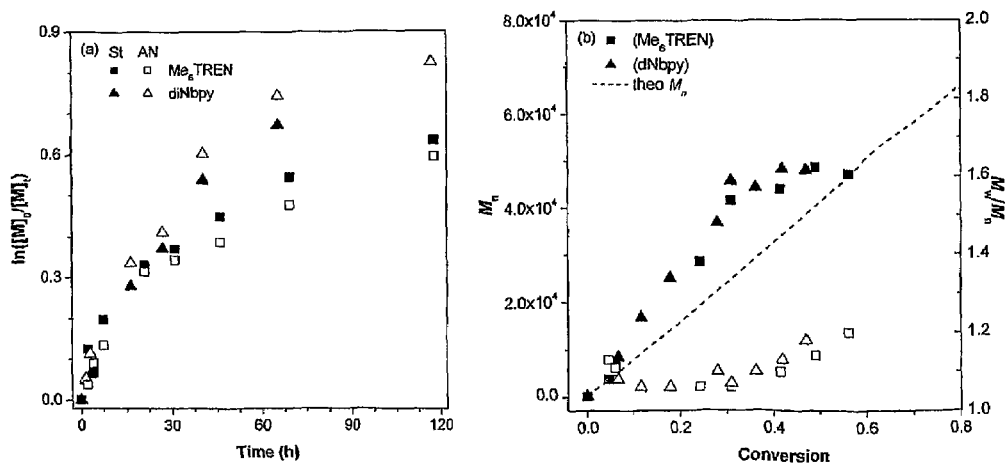
FIG. 19 are graphs of the kinetic data for an embodiment of an ARGET ATRP of styrene and acrylonitrile with 10 ppm, 30 ppm, and 50 ppm of copper, under the following polymerization conditions St/AN/EBiB/Me$_6$TREN/Sn(EH)$_2$=600/390/ 1/0.5/0.5, in anisole at 80° C.
Figure 20:
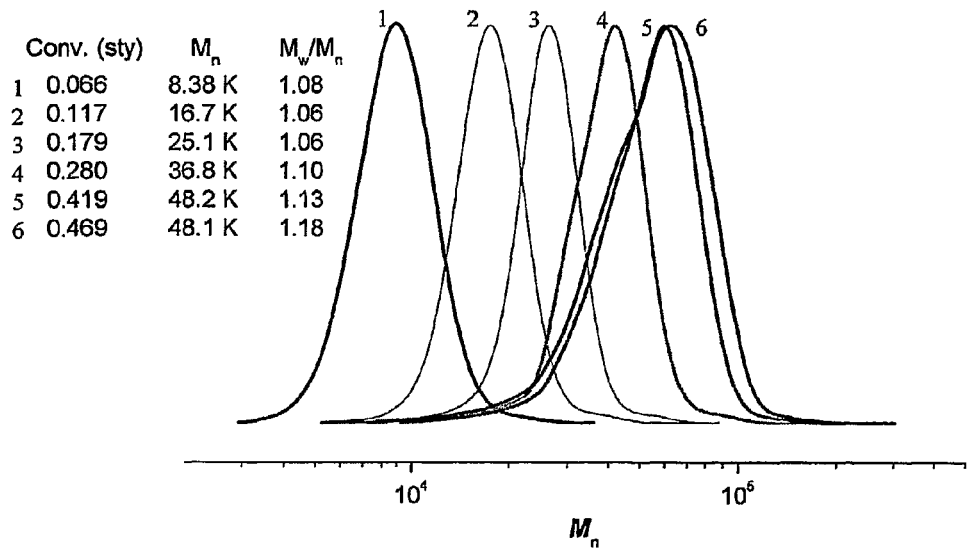
FIG. 20 is a graph of the molecular weight and molecular weight distribution as a function of conversion in ARGET ATRP of styrene and acrylonitrile with 10 ppm, 30 ppm, and 50 ppm of copper, under the following polymerization conditions St/AN/EBiB/Me$_6$TREN/Sn(EH)$_2$=600/390/1/0.5/ 0.5, in anisole at 80° C.

The experimental data for the copolymerizations are presented in Table 13a and Table 13b and FIG. 19 presents the semilogarithmic kinetic plot for polymerization of SAN with dNbpy and Me$_6$TREN/Cu$^I$ catalysts. It appears that neither dNbpy nor Me$_6$TREN provide a constant number of growing radicals during the ATRP polymerization as severe deviations from the straight line can be observed, (FIG. 19). Monomer conversion stopped at around 50% and 60% respectively, showing the deactivation of the active species. However the overall polydispersity of the polymer for both catalytic systems was low, especially at the moderate stages of the copolymerization, indicating good control over certain aspects of the reaction. The deactivation of active species for both catalytic systems is clearly seen from the shape of SEC traces (FIG. 20). The initial narrow symmetrical peaks lose their regularity and a significant low molecular weight shoulder becomes visible. The tail and irregular shape of the curves were sustained as the molecular weight increases. However it has to be pointed out, the overall level of control remained satisfactory.

TABLE 13a

Experimental conditions and properties of SAN copolymers prepared by ATRP$^a$

| Entry | Sty/AN | EBiB | CuBr | CuBr$_2$ | Ligand | time (h) | conv (%) | M$_n$ (×10$^{-3}$) | M$_w$/M$_n$ |
|---|---|---|---|---|---|---|---|---|---|
| 1 | 600/390 | 1 | 0.5 | 0.05 | 0.055 (Me$_6$TREN) | 117.6 | 56.0 | 48.1 | 1.18 |

TABLE 13a-continued

Experimental conditions and properties of SAN copolymers prepared by ATRP[a]

| Entry | Sty/AN | EBiB | CuBr | CuBr$_2$ | Ligand | time (h) | conv (%) | M$_n$ (×10$^{-3}$) | M$_w$/M$_n$ |
|---|---|---|---|---|---|---|---|---|---|
| 2 | 600/390 | 1 | 4 | — | 8 (dNbpy) | 117.6 | 46.9 | 47.1 | 1.20 |

[a]The reactions were conducted in anisole at 80° C. [Sty] = 3.17 M.

TABLE 13b

Experimental Conditions and Properties of SAN copolymers prepared by ARGET ATRP

| | | molar ratio | | | Cu | | time | conv | M$_{n\,GPC}$ | |
|---|---|---|---|---|---|---|---|---|---|---|
| entry | St/AN | EBiB | CuCl$_2$ | Me$_6$TREN/Sn(EH)$_2$ | (ppm) | Conc. of Sty (M) | (h) | (%) | (×10$^{-3}$) | M$_w$/M$_n$ |
| 3 | 600/390 | 1 | 0.01 | 0.5/0.5 | 10 | 3.17 | 164 | 76.5 | 88.5 | 1.19 |
| 4 | 600/390 | 1 | 0.03 | 0.5/0.5 | 30 | 3.17 | 67.0 | 80.6 | 70.9 | 1.18 |
| 5 | 600/390 | 1 | 0.05 | 0.5/0.5 | 50 | 3.17 | 21.7 | 71.1 | 99.3 | 1.22 |
| 6 | 1000/650 | 1 | 0.05 | 0.5/0.5 | 30 | 3.17 | 116.0 | 58.0 | 78.1 | 1.23 |
| 7 | 2000/1300 | 1 | 0.165 | 1.0/1.0 | 50 | 3.17 | 91.3 | 48.5 | 126.1 | 1.23 |
| 8 | 2000/1300 | 1 | 0.10 | 1.0/1.0 | 30 | 3.17 | 69.4 | 41.7 | 100.3 | 1.23 |
| 9 | 2000/1300 | 1 | 0.10 | 1.0/1.0 | 30 | 5.07 | 46.4 | 69.6 | 211.8 | 1.42 |
| 10 | 2000/1300 | 1 | 0.03 | 0.5/0.5 | 10 | 5.07 | 92.2 | 60.0 | 166.2 | 1.26 |
| 11 | 600/390 | 0.5 (di-) | 0.03 | 0.5/0.5 | 30 | 3.17 | 18.7 | 77.5 | 157.0 | 1.28 |
| 12 | 600/390 | 0.33 (tri) | 0.03 | 0.5/0.5 | 30 | 3.17 | 18.3 | 63.9 | 188.8 | 1.25 |
| 13 | 2000/1300 | 1 | 0.1 | 1.0/1.0 | 30 | 3.17 | 23.9 | 24.7 | 100.8 | 1.19 |

It appeared that it was not possible to suppress the side reactions by accelerating the reaction rate through addition of an increased amount of Me$_6$TREN/Cu$^I$. Indeed, the reaction rate was initially significantly faster, but at the same time the rate of irreversible termination of growing radicals was also enhanced. The reaction stopped at low conversion with very low initiation efficiency.

Figure 21:
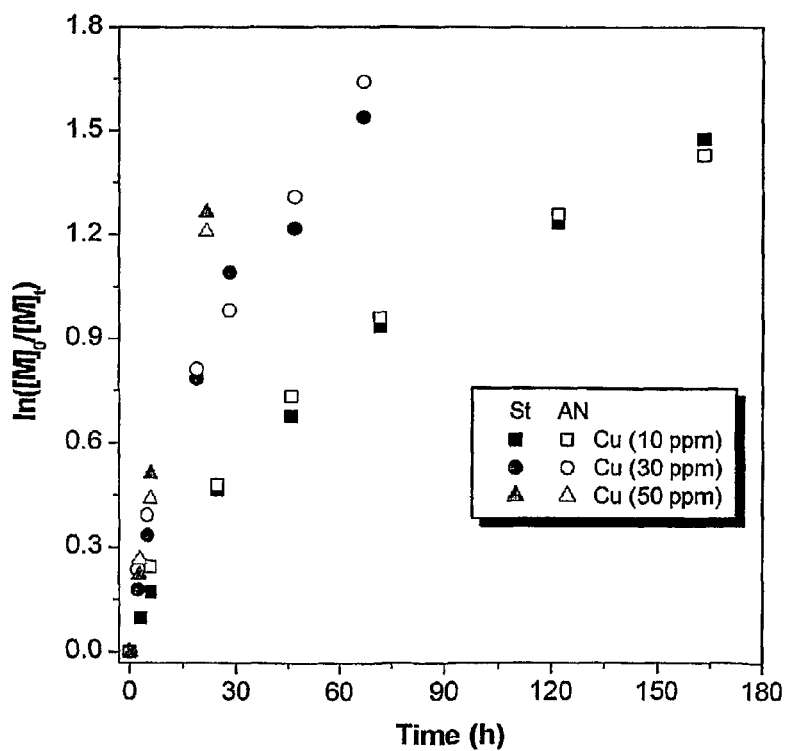
FIG. 21 is a graph of the evolution of molecular weight distribution during ARGET ATRP of styrene and acrylonitrile with 30 ppm of copper, under the following polymerization conditions: St/AN/EBiB/CuCl$_2$/Me$_6$TREN/Sn(EH)$_2$=600/ 390/1/0.03/0.5/0.5, in anisole at 80° C.
Figure 22:
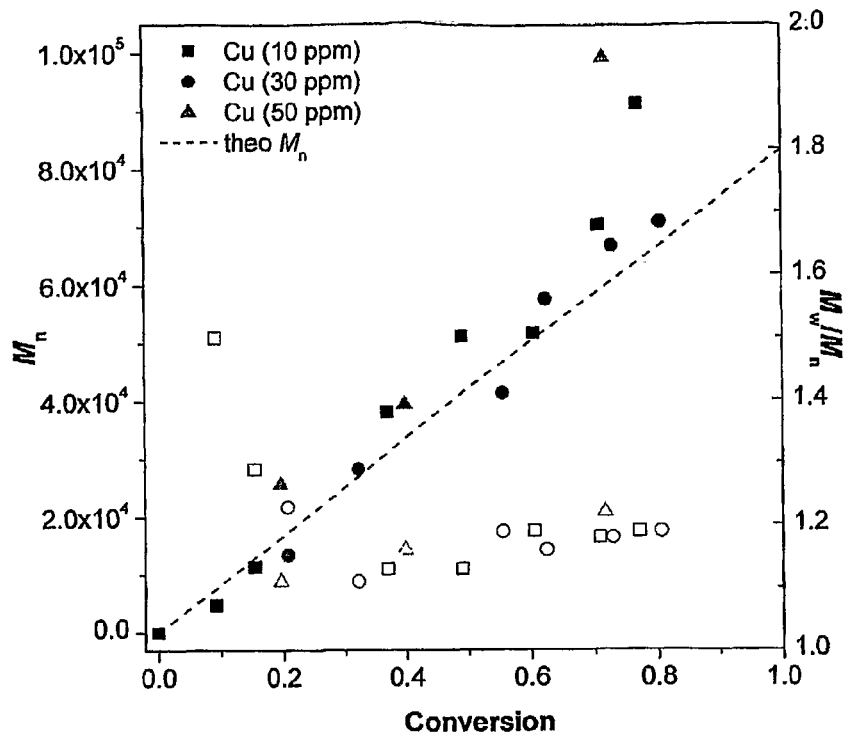
FIG. 22 is graphs of the kinetic data and molecular weight and molecular weight distribution as a function of conversion for ARGET ATRP of styrene and acrylonitrile with 30 ppm of copper, under the following polymerization conditions: St/AN/EBiB/CuCl$_2$/Me$_6$TREN/Sn(EH)$_2$=1000/650/1/0.05/ 0.5/0.5, in anisole.
Figure 23:
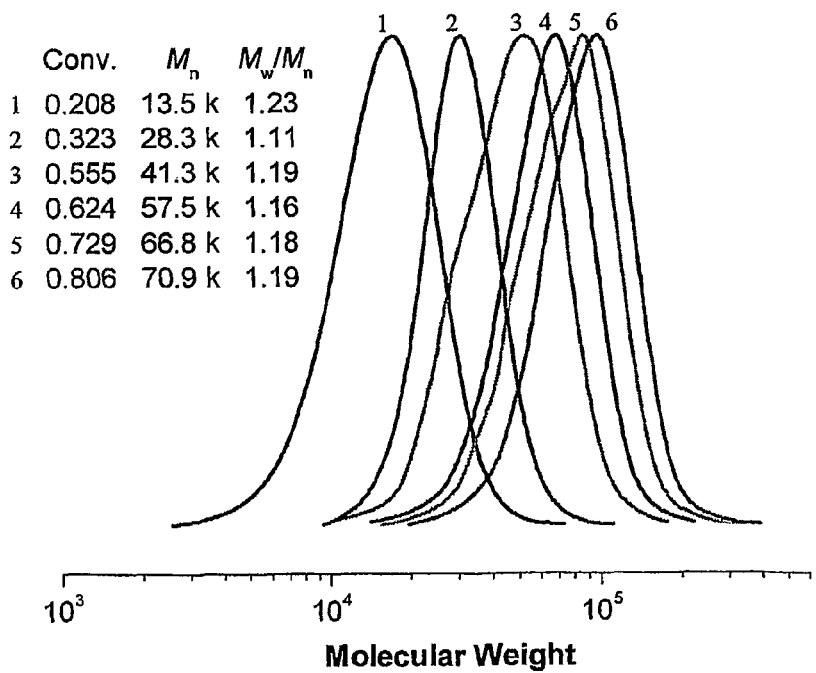
FIG. 23 is a graph of the evolution of molecular weight distribution during ARGET ATRP of styrene and acrylonitrile with 30 ppm of copper, under the following polymerization conditions: St/AN/EBiB/CuCl$_2$/Me$_6$TREN/Sn(EH)$_2$=600/ 390/1/0.03/0.5/0.5, in anisole at 80° C.

Synthesis of SAN by ATRP:

The main advantage of ARGET ATRP is that the system comprises continuous reactivation of a small amount of catalyst to maintain control. In most systems this means that catalyst solubility problems and purification issues are easily overcome. ARGET ATRP of styrene and acrylonitrile was conducted with ethyl 2-bromoisobutyrate (EBiB) as an initiator and Me$_6$TREN/Cu as the catalyst. Experimental conditions and properties of the SAN copolymers prepared by ARGET ATRP are shown in Table 13b. In order to optimize the amount of copper three different concentrations of catalyst were evaluated: 10, 30 and 50 ppm versus monomer (Table 13b, entries 3-5). The amount of the reducing agent, Sn(EH)$_2$ was kept constant at 50 mol % of the initiator. Kinetic plots for all aforementioned reactions with different copper concentrations are presented in FIG. 21. As expected the rate of polymerization increased significantly as the copper concentration increased (FIG. 22). A slight deviance from the straight line kinetic plots is visible which means that the number of radicals present in the system changed, to some extent, during the reaction but control was maintained. The theoretical molecular weight of the copolymer samples did not vary significantly from values obtained from GPC analysis. These results are significantly different than the results from the normal ATRP when the same monomer to initiator molar ratio was used. FIG. 23 shows a smooth shift of the entire molecular weight distribution toward higher molecular weight for the system containing 30 ppm of catalyst: c.f. FIG. 21.

Figure 24:
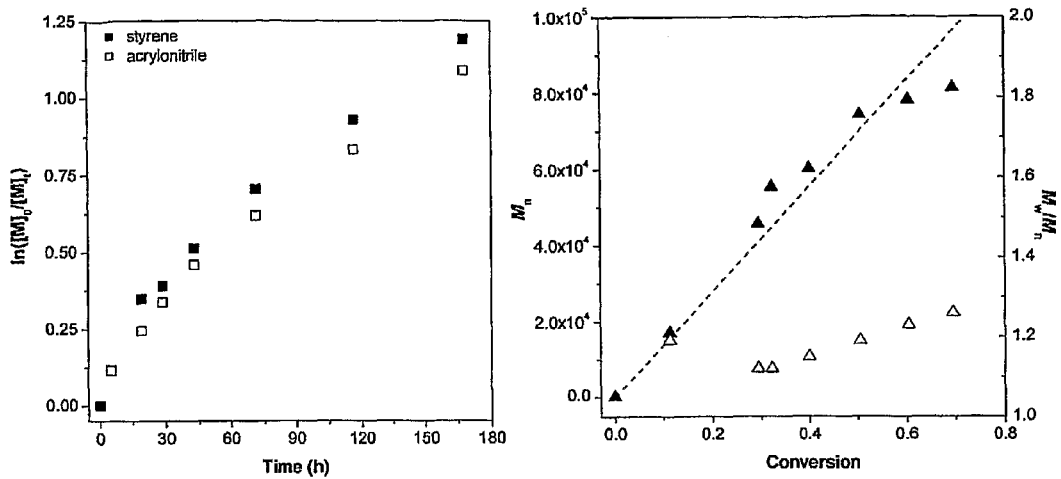
FIG. 24 is graphs of the kinetic data, molecular weight and molecular weight distribution as a function of conversion for ARGET ATRP of styrene and acrylonitrile with 30 ppm of copper, under the following polymerization conditions: St/AN/EBiB/CuCl$_2$/Me$_6$TREN/Sn(EH)$_2$=1000/650/1/0.05/ 0.5/0.5, in anisole.
Figure 25:
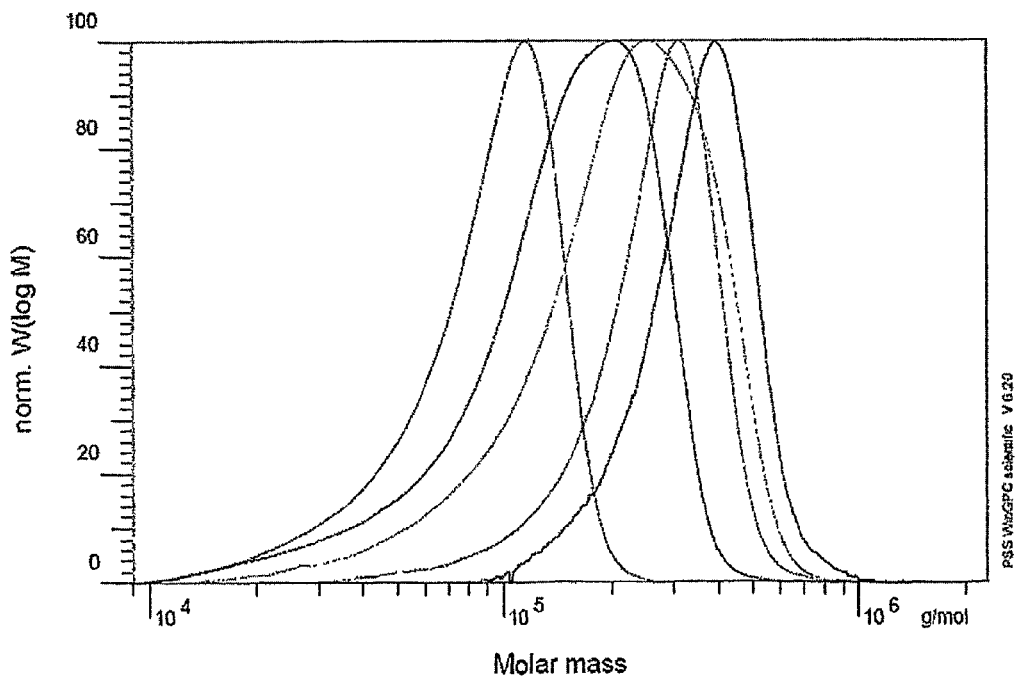
FIG. 25 is graphs of the GPC traces for samples taken during the preparation of high molecular weight polyacrylonitrile.

When a higher DP was targeted, (DP$_n$=1650), polymerization was slower. FIG. 24 presents the kinetic plots for the copolymerization of styrene and acrylonitrile with 30 ppm of copper versus monomer, as well as the molecular weight and polydispersities of the polymers formed in this system. Although the kinetic plot showed a very small deviation from linear characteristics and the molecular weight was only slightly different from theoretical, a constant increase of molecular weight distribution with conversion was observed. The increase in polydispersity was visible on the SEC traces with tailing to the low molecular weight species which means formation of dead chains from various termination reactions cannot be completely neglected and high monomer conversion cannot be attained with good control over polymerization under these conditions (FIG. 25).

Similar behavior was observed for the reaction where the targeted DP was even higher, DP$_n$=3300. In this reaction a higher concentrations of copper catalyst (50 ppm versus monomer) and reducing agent were used due to the very high dilution of initiator in the reaction media but an even more significant deviation from the straight line on the kinetic plots was observed even though differences between theoretical molecular weight and that obtained from GPC measurements were negligible but again an increase in molecular weight distribution was observed when monomer conversion was still relatively low.

The amount of solvent was reduced in order to increase the rate of monomer conversion and retain control over the reaction, (Table 13b, entries 8-9). The actual concentration of monomers equaled 3.17 M and 5.07 M respectively and 30 ppm catalyst was used in these examples. Significant differences in the reactions rate were observed when the kinetic plots of the reactions were compared. At higher monomer concentration, 5.07 M, monomer conversion reached 70%, and while high molecular weight polymer was obtained M$_n$=211,800 the molecular weight distribution was broader than desired, M$_w$/M$_n$>1.4, but still within the range expected from a controlled reaction. Some deviance from theoretical molecular weight was also detected indicating some deactivation of radicals through side reactions with catalyst.

When the amount of copper was decreased to 10 ppm, keeping monomer concentration at the same level 5.07 M, the kinetic plot was linear, indicating a constant number of growing radicals, (Table 13b, entry 10). Deviation from theoretical molecular weight was also smaller and molecular weight distribution was as low as 1.26 for SAN with molecular weight equals 166,200.

The high molecular weight SAN copolymer was obtained in a controlled radical polymerization, which leads to the conclusion that the very low concentration of catalyst used in this example significantly suppresses the side reactions of growing radicals with copper species leading to the preparation of well defined high molecular weight linear copolymers.

Copolymerization of SAN from a Macroinitiator:

A macroinitiator was also used for the copolymerization of styrene and acrylonitrile. The macroinitiator used was a poly(ethylene oxide) based macroinitiator containing a terminal 2-bromoisobutyrate group. The reaction conditions are shown in Table 13b, entry 13. The linear character of the kinetic plot indicates a constant number of growing species in the reaction medium, up to 20% of monomer conversion after which the rate of monomer consumption was reduced. Slight discrepancies between theoretical molecular weight and that determined by GPC was observed only the early stage of the polymerization, due to the presence of the macroinitiator, and the molecular weight with distribution remained low at each stage of the polymerization pointing to the high degree of control over the process.

Synthesis of SAN from Di- and Trifunctional Initiators:

The reaction conditions developed using a monofunctional initiator (EtBriBu) and PEO-macroinitiator were employed in a series of reactions with multifunctional initiators. Identical concentrations of catalyst and initiator were used in each system which should provide the same number of growing radicals. The rate of polymerization was the same with all the initiators, indicating that each initiating site was independently participating in the polymerizations. However when the concentration of active species was kept constant for initiators with different functionality, the monomer-to-initiator ratio changes for each system which results in different rates of change of absolute molecular weight during polymerizations. Noticeable deviations from theoretical values were observed only at higher molecular weight in case of SAN synthesized from di- and trifunctional initiating species. However the polydispersity of the polymer remained low $M_w/M_n<1.3$, throughout the reactions indicating good control during each stage of the reaction. Using triple detector SEC, the absolute molecular weights of (branched) PSAN and PEO block polymers were measured. The value dn/dc of the polymer was determined using a known concentration of linear PSAN solution in THF. The value of dn/dc for a copolymer of SAN with certain composition (styrene=60%) is known and is equal to 0.157. The block polymer of $PEO_{5000}$-b-PSAN contains less than 5 wt % of PEO moiety so that the results obtained from 3D-SEC were still reliable. In addition, the number-average intrinsic viscosity was also given by the instrument. Table 12 compares the data measured by normal GPC and 3D-SEC.

TABLE 12

Relative and absolute molecular weight data for SAN copolymers prepared from mono-, di-, and trifunctional initiators as well as PEO based macroinitiator

| initiator | $M_n$ | | $[\eta]_n^c$ (dL/g) |
|---|---|---|---|
| | $SEC^a$ | $3D-SEC^b$ | |
| EBiB | 100 100 | 116 900 | 0.633 |
| EBiB | 211 000 | 216 600 | 1.013 |

TABLE 12-continued

Relative and absolute molecular weight data for SAN copolymers prepared from mono-, di-, and trifunctional initiators as well as PEO based macroinitiator

| initiator | $M_n$ | | $[\eta]_n^c$ (dL/g) |
|---|---|---|---|
| | $SEC^a$ | $3D-SEC^b$ | |
| di-BriBu | 98 100 | 92 100 | 0.569 |
| di-BriBu | 157 000 | 160 400 | 0.846 |
| tri-BriBu | 98 400 | 126 000 | 0.602 |
| tri-BriBu | 188 800 | 203 700 | 0.790 |
| $PEO_{5000}$-BriBu | 100 800 | 98 900 | 0.641 |

$^a$Measured by SEC with linear polystyrene standard.
$^b$Measured by triple detection SEC and the dn/dc value of SAN copolymer (60% styrene) is determined as 0.157 mL/g.
$^c$Number-average intrinsic viscosity determined by 3D-SEC.

There was no significant difference between standard GPC and 3D-SEC for any of the copolymers, meaning the results obtained from standard GPC are reliable. Changes of the number-average intrinsic viscosity measured using the on-line viscometer corresponds to the expected trend for linear and star polymers: a star polymer has a lower viscosity than linear one with a similar molecular weight.

ARGET ATRP allows a significant reduction in the amount of catalyst complex employed in the reaction and it was possible to synthesize high molecular weight polymer due to significant suppression of side reactions through reduction of the absolute concentration of the copper species in the system. Side reactions between the growing radicals and the catalyst were avoided to a significant extent. The amount of copper species present in the system can be as low as 10 ppm without loss of control making this process very useful for industrial scale production. Polymerization with mono-, di- and trifunctional initiators low molecular weight initiators and a macroinitiator resulted in the formation of well-defined polymers with controlled architecture.

Synthesis of $SiO_2$-PSAN:

$SiO_2$—Br (20 nm):Sty/AN/$SiO_2$—Br/$CuCl_2$/$Me_6$TREN/ Sn(EH)$_2$ =2000:1300:1:0.10:1.0:1.0 in anisole (1 vol equiv of monomer) at 80° C. Cu: 30 ppm. The SEC trace of the sample taken at 42.4 h was symmetric with low polydispersity, indicating that there was no coupling reaction during the polymerization. From our previous experience, the initiator efficiency for polymerization of SAN on small silica particles is around 30%. The conversion at 42.4 h was estimated about 14% providing tethered chains with a molecular weight of 127,000 and PDI of 1.3 (measured from cleaved polymer). However as is common with multifunctional initiators in solution polymerization when the reaction was driven to higher conversion the polydispersity increased and some insoluble gel was observed, indicating some crosslinking had occurred. Composite structures can be prepared by ARGET ATRP processes.

As disclosed in other patent applications the use of miniemulsion ATRP allows for compartmentalization of multifunctional initiators in the well dispersed droplets and reduces crosslinking as a consequence of low instantaneous concentration of radicals in a given droplet.

HEMA-TMS by ARGET ATRP:

Several polymerizations of HEMA-TMS were conducted targeting a high molecular weight polymer suitable as a backbone for a grafting from polymerization. In the past when targeting very high molecular weight p(HEMA-TMS) RAFT was selected as the appropriate CRP. In this series of runs the ratio of monomer to initiator was 10,000 to 1 and the amount of catalyst, tin and solvent were varied to find the best conditions. The best conditions were HEMA-TMS:EBiB:CuCl$_2$:Me$_6$TREN:Sn(EH)$_2$=10,000:1:2:25:25. in 50% anisole at 50° C. The final polymer had M$_n$=2.45×10$^6$ and M$_w$=5.27×10$^6$ with a PDI of 1.63.

It is probable that early in the reaction there was some initial initiator/initiator termination reactions resulting a higher actual molecular weight than targeted for the selected level of conversion. As disclosed below, this phenomenon can be avoided by a sequential addition of the reducing agent which allows a slower activation/initiation procedure followed by an increased rate of polymerization.

High Molecular Weight Polyacrylonitrile (PAN) by ATRP

PAN is not soluble in monomer and most organic solvents such as THF, anisole, methanol, acetone. Generally when targeting high Mn one also attains high PDI and there is a non-linear first order kinetic plot of monomer consumption (ln(M$_0$/M) vs. t) and inadequate characterization of Mn by GPC (DMF). The broader PDI can be attributed to side reactions.

Side reaction 2: too fast activation (~10 times faster than standard ATRP Initiator EBiB)→too much termination.
Side reaction 2: reduction of the radical to an anion by copper$^I$: R*+Cu$^I$→R$^-$ resulting in loss of chain end.
Side reaction 3: Cu center coordinating to cyano groups on monomers or polymers resulting in loss of catalyst: P—Br+R—CN→P—CN—R The following variables were examined and the best reagents are highlighted in bold font.
Solvent: DMF, EC, DMSO
Initiator: BPN, CPN, BAN, CAN
Reducing agent: Sn(EH)$_2$, ascorbic acid, glucose, phenylhydrazine
Temperature: 65, 55, 40, 25° C.
Amount of Cu$^{II}$Cl$_2$: 100, 75, 50, 25, 10 ppm Initially the ARGET polymerization of acrylonitrile was slow therefore the reaction was examined with the addition of ascorbic acid and at higher temperature. Addition of ascorbic acid led to a fast reaction while higher temperature had no significant advantage. The use of Sn(EH)$_2$ at 55° C. resulted in the production of a polymer with an acceptable PDI. The broader PDI was caused by the presence of a long tail in the GPC curve which was attributed to fast increase of initial molecular weight. The initiation was slowed down by using ClPN with Sn(EH)2 and later ClPN/BrAN with glucose at 25 ppm Cu but this resulted in a slower reaction with worse control!

A series of experiments were run with glucose as reducing agent.

The best results were obtained at 40-65° C. in DMSO as solvent. The mole ratio reagents used in such a reaction were:
AN:BrPN:CuCl2:TPMA:glucose=4000:1:0.2:2.2:2 in DMSO (2.5 vol equiv of monomer) at 40° C.

This is the equivalent of 50 ppm Cu in the reaction. It is noteworthy that both the reaction medium and product were colorless. Conversion was estimated by NMR to be ~69% after 166 hours reaction. GPC indicates that measured Mn/3 is close to theoretical molecular weight based on conversion data. The clean shift of the GPC traces for this run can be seen in FIG. 18. This example indicates that the reducing agent should be matched with the ligand and monomer(s). The Mn/3 of the sample was 135,000 and the polymer had a PDI of 1.18 indicating that there was almost no termination during the polymerization because when the reaction temperature is decreased, the chain transfer reaction rate is also decreased to a significant degree.

PBA-b-PSAN by ARGET ATRP
PBA-Br:Sty:AN:CuCl$_2$:Me$_6$TREN:Sn(EH)$_2$=1:2000:1300:0.1:1:1 in anisole (1 vol equiv of monomers) at 80° C. Mn 250,000 PDI 1.22.

Example 14

Polymerization of Monomers Bearing Additional Functional Groups

Preparation of AMPSA$_{27}$BA$_{468}$AMPSA$_{27}$ by AGET ATRP:
AMPSA based block copolymers are desired as templating agents for the preparation of flexible conductive polymers however their preparation by standard ATRP techniques have met with a limitation on the MW of the AMPSA block. The following example was run under conditions developed for the preparation of AMPSA$_{27}$BA$_{486}$AMPSA$_{27}$ in a standard ATRP reaction. The conditions for this AGET ATRP are similar to those used in the 'regular' ATRP polymerization of AMPSA, with the addition of a proportion of ascorbic acid in addition to the other components. In this type of reaction the role of the added reducing agent is to reactivate any excess Cu$^{II}$ formed by termination reactions.

Scheme 2. Chain extension of a difunctional macroinitiator by AMPSA

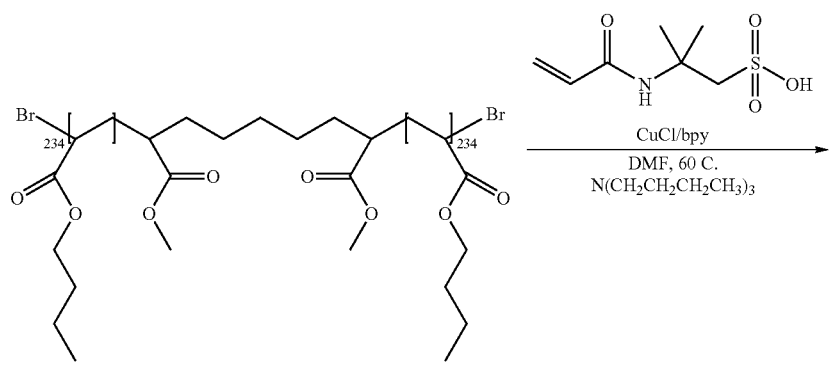

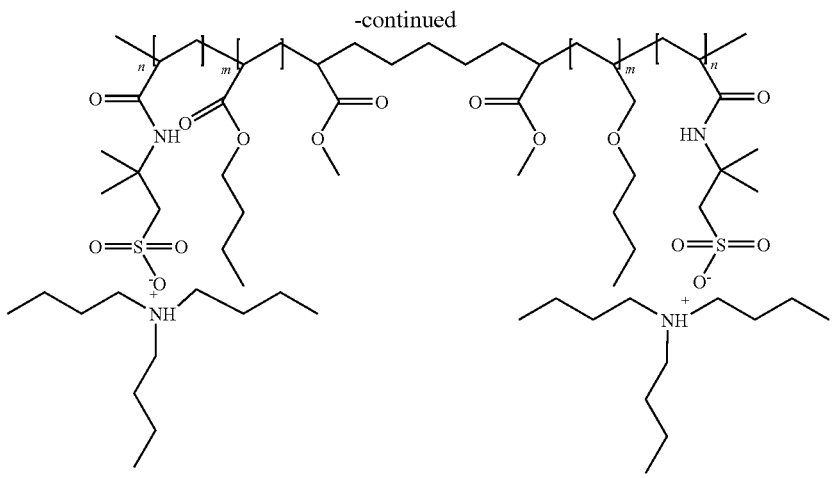
-continued

General Procedure:

AMPSA (16.6 g) was added to a Schlenk flask, along with 8.2 g of PBA macroinitiator (MW 60,000 g/mol) and degassed for 30 minutes. Degassed tributylamine (19.2 mL) and degassed DMF (48 mL) were then added, followed by stirring until the AMPSA and PBA dissolved, then another 20 minutes of degassing. Copper chloride (79.2 mg), ascorbic acid (47 mg) and bpy (87.6 mg) were added to a separate Schlenk flask, and oxygen was removed by 3 cycles of vacuum pumping and nitrogen purging. Degassed DMF (3 mL) was then added to this mixture, and it was stirred for 10 minutes to allow the copper complex to form. A portion of the copper complex solution (1 mL) was then added to the reaction flask, followed by degassing for several minutes. The flask was lowered into a 60° C. oil bath, and the reaction was allowed to run overnight. The reaction was quenched by addition of DMF and exposure to air. The DMF/polymer solution was poured slowly into water, and the resultant micellar solution was purified by dialysis for two days. According to DMF GPC analysis of file resultant product, the difunctional macroinitiator was chain extended with polyAMPSA. After passing the polymer through a Dowex ion exchange column, the molecular weight decreased (elution volume increased) due to loss of the tributylammonium counter-ion. The molecular weight of the macroinitiator was 60,000 g/mol by DMF GPC, while the final acid-containing block copolymer had a molecular weight of 82,000 g/mol, with a PDI of 1.13. According to elemental analysis this polymer is 27 wt % AMPSA, with a DP of $AMPSA_{53}BA_{468}AMPSA_{53}$, i.e. slightly less than twice the amount of AMPSA present in polymers prepared by conventional ATRP.

Again this novel activation procedure reduces side reactions and provides materials with higher AMPSA content suitable for use in preparing templated conducting polymers with good mechanical properties.

AGET ATRP of NIPAAm:

TPMA has been found to be an effective ligand for AGET ATRP of NIPAAm in water when using a solvent such as 2-propanol. The polymerization can be driven to >90% conversion and low polydispersity polymers can be obtained. When a ratio of NIPAAm (200), methylchloropropionate (1), TPMA (1), CuCl2 (1), ascorbic acid (0.5) in 2-propoanol, 91% conversion was reached with Mn=20,000 and PDI=1.16. In an attempt to obtain higher molecular weight polymer the molar ratio of NIPAAm to the other reagents was increased to 500. 1.0 grams of NIPAAm was used with 1.7 mL of 2-propoanol and 0.3 mL of water to help dissolve the ascorbic acid. The NIPAAm, $CuCl_2$, and TPMA were vacuum dried for 20 minutes. 1.2 mL of 2-propanol and MCP were added. This was bubbled with nitrogen for 40 minutes. In a separate flask, ascorbic acid was dried under vacuum and mixed with 0.5 mL 2-propanol and 0.3 mL of water and bubbled with nitrogen for 40 minutes. The flasks were combined to start the reaction. A molecular weight of 42,000 was obtained after 5 hours and the polymer displayed a PDI of 1.10.

AGET ATRP of OEOMA 475 in Water, Targeting DP=1000:

The AGET ATRP of OEOMA 475 using a bromine functionalized PEO5000 initiator was investigated targeting high molecular weight polymer, i.e. DP=1000. In the first set of experiments, the amount of reducing agent (ascorbic acid) was varied from 10 to 30 mol % of $CuBr_2$. The results are summarized in the following table entries 1-3. Increasing the amount of ascorbic acid led to higher conversion. When ascorbic acid was added at only 10 mol % or 15 mol % of $Cu^{II}$ the reaction reached limited conversion as evidenced by the plateau on the first order kinetic plots. Molecular weight linearly increased with conversion, and narrow polydispersity and monomodal distribution were observed. However, with 30% of ascorbic acid, although higher conversion was achieved, polydispersity was broader and a shoulder was observed on GPC traces.

TABLE 13a

AGET ATRP of OEOMA 475 in water at 30° C.

| Exp. | [CuBr$_2$] (mM) | [Asc. Ac.] (mM) | [Asc Ac]$_0$/[CuBr$_2$]$_0$ (%) | time min. | conversion (%) | $M_{n,th}$ (g/mol) | $M_{n,exp}$ (g/mol) | PDI |
|---|---|---|---|---|---|---|---|---|
| 1 | 0.32 | 0.032 | 10 | 30 | 38 | 186000 | 135000 | 1.24 |
| 2 | 0.32 | 0.048 | 15 | 60 | 47 | 228400 | 170000 | 1.24 |
| 3 | 0.32 | 0.096 | 30 | 90 | 86 | 414000 | 364000 | 1.86 |

Reaction conditions: [OEOMA 475]/[PEO5000-Br]/[CuBr$_2$]/[TPMA] = 1000/1/0.5/0.5.
Water/monomer ratio (v/v) = 2.5 for all experiments.

In a second set of experiments, the water to monomer ratio (v/v) was decreased thereby increasing the concentration of catalyst in the medium. The molar ratio of ascorbic acid to $CuBr_2$ was chosen as 15%, since this condition seemed to provide a good balance between rate of polymerization and control among the previous experiments. Results are summarized as entries 4-6 in the table below. Decreasing the water to monomer ratio (v/v) led to higher conversion. First order kinetic plots were linear but a plateau was still observed. Molecular weight linearly increased with conversion, monomodal distributions were observed and polydispersities remained quite low even at high conversion.

TABLE 15b

AGET ATRP of OEOMA 475 in water at 30° C.

| Exp. | [CuBr$_2$] (mM) | [Asc. Ac.] (mM) | Water/Monomer (v/v) | time (min.) | conversion (%) | $M_{n,th}$ (g/mol) | $M_{n,exp}$ (g/mol) | PDI |
|---|---|---|---|---|---|---|---|---|
| 4 | 0.444 | 0.067 | 1.5 | 60 | 66 | 319000 | 196000 | 1.3 |
| 5 | 0.368 | 0.0553 | 2 | 60 | 70 | 338000 | 223000 | 1.37 |
| 6 | 0.32 | 0.048 | 2.5 | 60 | 47 | 228400 | 170000 | 1.24 |

Reaction conditions: [OEOMA 475]/[PEO5000-Br]/[CuBr$_2$]/[TPMA] = 1000/1/0.5/0.5.
[Asc Ac]$_0$/[CuBr$_2$]$_0$ = 15% for all experiments.

In a third set of experiments, sequential addition of the reducing agent was performed. Ascorbic acid was added at zero time and at regular time intervals during the polymerization. Results are summarized in the Table 15c, entries 7-9. Since the reaction reached limited conversion after 30 minutes when ascorbic acid was added at 15 mol % of $CuBr_2$ to start the polymerization, the same quantity was added every 30 minutes. As expected, the first order kinetic plot was linear and 76% conversion was achieved within 2 hours. Molecular weight increased linearly with conversion, and monomodal molecular weight distribution was observed and while polydispersity increased to 1.49 the GPC curve was still quite narrow and symmetrical.

When the water to monomer ratio was decreased from 2.5 to 2.0 by volume, keeping the same conditions, the first order kinetic plot was still linear but bimodality was observed in the GPC traces.

or ARGET ATRP at room temperature in the presence of a limited amount of air in a dish (e.g. Petri dish) which can be just simply covered and insulated with parafilm. In the first experiment a Petri dish was used, covered and insulated with parafilm. The polymerization did not occur even after degassing all the reagents with $N_2$ and adding a higher amount of reducing agent Sn(EH)$_2$.

The next set of experiments were performed in a weighing dish, which is equipped with ground cover and is deeper than a Petri dish. This type of flask allows ready access to the contents but can be filled close to the top with liquids then sealed in a similar manner to a commercial reactor. The conditions for the reaction, run WJ-04-71, and results are shown below.

| Conditions for the reaction | | | | | | |
|---|---|---|---|---|---|---|
| Sample | Monomer | Initiator | Cu$^{II}$ | Ligand | Reducing agent | T [° C.] |
| WJ-04-71 | nBA (DP = 600) | EtBrIB (1 eq.) | CuCl$_2$ (1 eq.) | Me$_6$TREN (1 eq.) | Sn(EH)$_2$ (0.5 eq.) | r.t. |

Solvent: anisole/acetone 0.05/0.05 volume equivalents vs. M.
1.5 equivalents of Sn(EH)$_2$ was added after 49.5 h.

TABLE 15c

AGET ATRP of OEOMA 475 in water at 30° C.

| Exp. | [CuBr$_2$] (mM) | [Asc. Ac.] (mM) | [Asc Ac]$_0$/[CuBr$_2$]$_0$ (%) | time (min.) | conversion (%) | $M_{n,th}$ (g/mol) | $M_{n,exp}$ (g/mol) | PDI |
|---|---|---|---|---|---|---|---|---|
| 7 | 0.32 | 0.048 | 15 | 60 | 47 | 228400 | 170000 | 1.24 |
| 8 | 0.32 | 0.048 | 4 × 15 | 120 | 76 | 367000 | 280000 | 1.49 |
| 9 | 0.368 | 0.0553 | 3 × 15 | 90 | 75 | 361000 | 230000 | 1.47 |

Reaction conditions: [OEOMA 475]/[PEO5000-Br]/[CuBr$_2$]/[TPMA]/[Asc Ac]$_0$ = 1000/1/0.5/0.5/0.075.

Sequential or gradual addition of the reducing agent therefore does allow one to control the rate of reduction and hence the ratio of Cu$^I$ to Cu$^{II}$ throughout the reaction and attain higher molecular weight materials.

Example 15

Development of a Simple Procedure for "Grafting from" Flat Surfaces

The main goal of this example is to define and demonstrate a very simple procedure for grafting from flat surfaces with different monomers. The initial target was to perform AGET All the reagents were mixed together in a weighing dish and bubbled with $N_2$ for 20 min. Next, the initial sample was taken and then the reducing agent was added and reactor was sealed. After 49.5 h reactor was opened and a test sample was taken. (Time zero sample in Table 16) To check if polymerization can be continued the reaction mixture was bubbled with $N_2$ again and an extra amount of Sn(EH)$_2$ was added. Reaction was stopped after 95 h and the molecular weight of the tethered polymer had increased while PDI remained low thereby showing that two sequential controlled ARGET ATRP polymerizations had been conducted.

TABLE 16

Results

| Name of sample | time | Mw (GPC) | Mw theor. | Conv. nBA | PDI |
|---|---|---|---|---|---|
| WJ-04-71 | 0 | 0 | 0 | 0 | 0 |
|  | 2910 | 6400 | 9400 | 0.12 | 1.31 |
|  | 5700 | 8700 | 12300 | 0.16 | 1.28 |

← + Sn(EH)$_2$

Each opening of the reactor in Example 15 resulted in addition of air, which can consume catalyst and reducing agent, however, the molecular weight of the polymer moved to higher molecular weight without any sign of tailing. The polymerizations were well controlled, molecular weights were close to theoretical values and low PDI (1.28) was observed. This example does show that an ATRP can be conducted from a solid flat surface and that the initial presence of a small amount of air can be compensated for by addition of excess reducing agent.

Further the successive reactivation of the tethered chains shows that tethered block copolymers can be prepared by this procedure and/or the terminal functionality can be modified to attaché additional responsive functionality.

Example 16

Non-Acid Forming Reduction Reactions

A consequence of the examination of a broader spectrum of reducing agents suggests that it would be advantageous in certain circumstances to conduct the reduction with an agent that does not release an acid upon oxidation. Examples of such reducing agents are viologens and sulfites. The reducing properties of viologens, which undergo electron transfer rather than hydrogen transfer seen with of ascorbic acid, 2,3-dimethoxy-5-methyl-1,4-hydroquinone, and the vitamin E analog Trolox, are easily adjusted by changing the substituents on the molecule. This would modify Scheme 1 in that the X atom or group no longer results in the formation of an acid which should reduce the side reactions associated with acid forming reducing agents and allow the reaction to be conducted in the absence of excess ligand as demonstrated in ICAR ATRP.

The invention claimed is:

1. A polymerization process, comprising:
   polymerizing free radically (co)polymerizable monomers in a polymerization medium comprising:
   one or more radically (co)polymerizable monomers,
   a transition metal catalyst complex capable of participating in a one electron redox reaction with an ATRP initiator;
   a free radical initiator; and
   an ATRP initiator; wherein the concentration of transition metal in the polymerization medium is less than 100 ppm.

2. The polymerization process of claim 1, wherein the concentration of transition metal in the polymerization medium is less than 50 ppm.

3. The polymerization process of claim 1, wherein the concentration of transition metal in the polymerization medium is less than 10 ppm.

4. The polymerization process of claim 1, wherein the transition metal catalyst complex is a (pseudo)halogen transfer agent.

5. The polymerization process of claim 1, wherein the radically polymerizable monomers are selected from the group consisting of monomer(s) of the formula:

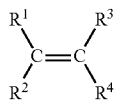

wherein $R^1$ and $R^2$ are independently selected from the group consisting of H, halogen, CN, $CF_3$, straight or branched alkyl of from 1 to 20 carbon atoms, unsaturated straight or branched alkenyl or alkynyl of 2 to 10 carbon atoms, unsaturated straight or branched alkenyl of 2 to 6 carbon atoms substituted with halogen, $C_3$-$C_8$ cycloalkyl, phenyl which may optionally have from 1 to 5 substituents on the phenyl ring selected from the group consisting of $C_1$-$C_6$ alkyl, $C_1$-$C_6$ alkenyl, $C_1$-$C_6$-alkoxy, halogen, nitro, carboxy, $C_1$-$C_6$ alkoxycarbonyl, hydroxy protected with a $C_1$-$C_6$-acyl, cyano and phenyl, heterocyclyl, $C(=Y)R^5$, $C(=Y)NR^6R^7$, $YCR^6R^7R^8$ and $YC(=Y)R^8$; where Y may be $NR^8$ or O; $R^5$ is alkyl of from 1 to 20 carbon atoms, alkoxy of from 1 to 20 carbon atoms, aryloxy or heterocyclyloxy; $R^6$ and $R^7$ are independently H or alkyl of from 1 to 20 carbon atoms, or $R^6$ and $R^7$ may be joined together to form an alkylene group of from 2 to 5 carbon atoms, thus forming a 3- to 6-membered ring; and $R^8$ is H, straight or branched $C_1$-$C_6$ alkyl or aryl; and $R^3$ and $R^4$ are independently selected from the group consisting of H, halogen, $C_1$-$C_6$ alkyl and $COOR^9$, where $R^9$ is H, an alkali metal, or a $C_1$-$C_6$ alkyl group; or $R^1$ and $R^3$ may be joined to form a group of the formula $(CH_2)_{n'}$ or a group of the formula $C(=O)-Y-C(=O)$, where n' is from 2 to 6, the group $(CH_2)_{n'}$ may be substituted with from 1 to 2n' halogen atoms or $C_1$-$C_4$ alkyl groups, and Y is as defined above; and at least two of $R^1$, $R^2$, $R^3$, and $R^4$ are H or halogen.

6. The polymerization process of claim 1, wherein the radically polymerizable monomers are selected from the group consisting of (meth)acrylate esters of $C_1$-$C_{20}$ alcohols, acrylonitrile, cyanoacrylate esters of $C_1$-$C_{20}$ alcohols, didehydromalonate diesters of $C_1$-$C_6$ alcohols, vinyl pyridines, vinyl N—$C_1$-$C_6$-alkylpyrroles, vinyl oxazoles, vinyl thiazoles, vinyl pyrimidines and vinyl imidazoles, vinyl ketones in which the α-carbon atom of the alkyl group does not bear a hydrogen atom, and styrenes which may bear a $C_1$-$C_6$-alkyl group on the vinyl moiety and from 1 to 5 substituents on the phenyl ring selected from the group consisting of $C_1$-$C_6$ alkyl, $C_1$-$C_6$ alkenyl, $C_1$-$C_6$-alkenyl, $C_1$-$C_6$-alkoxy, halogen, nitro, carboxy, $C_1$-$C_6$-alkoxycarbonyl, hydroxy protected with a $C_1$-$C_6$ acyl, cyano and phenyl, methyl acrylate, methyl methacrylate, butyl acrylate, 2-ethylhexyl acrylate, and styrene.

7. The polymerization process of claim 1, wherein the polymerization medium further comprises a solvent.

8. The polymerization process of claim 1, wherein the polymerization medium further comprises water and the polymerization process is one of a suspension polymerization process, emulsion polymerization process, a miniemulsion polymerization process, or a microemulsion polymerization process.

9. The polymerization process of claim 1, wherein the transition metal catalyst complex comprises a ligand.

10. The polymerization process of claim 9, wherein the stability constant of the transition metal catalyst complex is greater than $10^8$.

11. The polymerization process of claim 10, further comprising forming a polymer comprising a molecular weight distribution of less than 2.0.

12. The polymerization process of claim 9, wherein the stability constant of the transition metal complex is less than $10^8$.

13. The polymerization process of claim 12, further comprising forming a polymer comprising a molecular weight distribution of less than 1.5.

14. The polymerization process of claim 1, wherein the free radical initiator is added to the polymerization process initially, slowly, sequentially, or continuously during the polymerizing.

15. The polymerization process of claim 1, wherein the rate of the polymerization reaction is determined at least in part by the free radical initiator.

16. The process of claim 1, where the value of $K_{atrp}$ for the transition metal catalyst complex is above $10^{-8}$.

* * * * *